US012720451B2

(12) United States Patent
Huang

(10) Patent No.: US 12,720,451 B2
(45) Date of Patent: Aug. 25, 2026

(54) SIGNAL TRANSMISSION METHOD, APPARATUS, TERMINAL DEVICE, NETWORK DEVICE, AND STORAGE MEDIUM

(71) Applicant: DATANG MOBILE COMMUNICATIONS EQUIPMENT CO., LTD., Beijing (CN)

(72) Inventor: Qiuping Huang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 483 days.

(21) Appl. No.: 18/261,825

(22) PCT Filed: Jan. 11, 2022

(86) PCT No.: PCT/CN2022/071180
§ 371 (c)(1),
(2) Date: Jul. 17, 2023

(87) PCT Pub. No.: WO2022/152098
PCT Pub. Date: Jul. 21, 2022

(65) Prior Publication Data

US 2025/0081130 A1 Mar. 6, 2025

(30) Foreign Application Priority Data

Jan. 15, 2021 (CN) ......................... 202110057845.4

(51) Int. Cl.
*H04W 56/00* (2009.01)
*H04W 72/0446* (2023.01)

(52) U.S. Cl.
CPC ..... *H04W 56/001* (2013.01); *H04W 72/0446* (2013.01)

(58) Field of Classification Search
CPC ... H04W 56/00; H04W 56/001; H04W 72/04; H04W 72/044; H04W 72/0446;
(Continued)

(56) References Cited

U.S. PATENT DOCUMENTS

2014/0016475 A1 1/2014 Zhou et al.
2014/0133447 A1 5/2014 Moulsley et al.
(Continued)

FOREIGN PATENT DOCUMENTS

CN 110650001 A 1/2020
WO 2019157681 A1 8/2019
(Continued)

OTHER PUBLICATIONS

Machine Translation WO-2021206382-A1 (Year: 2021).*
(Continued)

*Primary Examiner* — Paul H. Masur
(74) *Attorney, Agent, or Firm* — KILPATRICK TOWNSEND & STOCKTON LLP

(57) ABSTRACT

Provided in embodiments of the present application are a signal transmission method, an apparatus, a terminal device, a network device, and a storage medium. The method includes: receiving triggering signaling for triggering to transmit or receive a signal; and determining transmission location of the signal based on at least one of a priority of the signal, uplink-downlink pattern configuration, minimum time interval requirement between transmission of the triggering signaling and the signal, or time window requirement between transmission of the triggering signaling and the signal. An embodiment of the present application increases signal transmission opportunities, and consequently increases the flexibility of scheduling and transmission of a signal.

18 Claims, 5 Drawing Sheets

Receiving triggering signaling for triggering to transmit or receive a signal — 101

↓

Determining transmission location of the signal based on at least one of a priority of the signal, uplink-downlink pattern configuration, minimum time interval requirement between transmission of the triggering signaling and the signal, or time window requirement between transmission of the triggering signaling and the signal — 102

(58) Field of Classification Search
CPC ... H04W 72/50; H04W 72/56; H04W 72/566; H04W 72/569
See application file for complete search history.

(56) References Cited

U.S. PATENT DOCUMENTS

| | | | | |
|---|---|---|---|---|
| 2019/0229868 | A1 | 7/2019 | Siomina | |
| 2020/0120682 | A1 | 4/2020 | Li et al. | |
| 2020/0382250 | A1 | 12/2020 | Choi et al. | |
| 2020/0382253 | A1 | 12/2020 | Manolakos et al. | |
| 2023/0155770 | A1* | 5/2023 | Go | H04L 5/0053 370/329 |
| 2024/0014972 | A1* | 1/2024 | Matsumura | H04W 72/232 |

FOREIGN PATENT DOCUMENTS

| | | | | |
|---|---|---|---|---|
| WO | 2020143702 | A1 | 7/2020 | |
| WO | WO-2021206382 | A1 * | 10/2021 | H04L 5/0051 |
| WO | WO-2022061733 | A1 * | 3/2022 | H04W 72/04 |

OTHER PUBLICATIONS

Machine Translation of WO-2022061733-A1 (Year: 2022).*
Qualcomm, "Discussion on SRS enhancement", Oct. 26-Nov. 13, 2020, 3GPP TSG-RAN WG1 Meeting #103-e, R1-2009255, pp. 1-31 (Year: 2020).*
Oppo, "Enhancements on SRS flexibility, coverage and capacity", Oct. 26-Nov. 13, 2020, 3GPP TSG RAN WG1 #103-e, R1-2008222, pp. 1-10 (Year: 2020).*
Ericsson, "SRS Performance and Potential Enhancements", Oct. 26-Nov. 13, 2020, 3GPP TSG-RAN WG1 Meeting #103-e, R1-2009211, pp. 1-24 (Year: 2020).*
Vivo,"Discussion on SRS enhancement", 3GPP TSG RAN WG1 #102-e, e-Meeting, Aug. 17-28, 2020, total 17 pages, R1-2005368.
Futurewei,"Enhancements on SRS flexibility, coverage and capacity", 3GPP TSG RAN WG1 #103-e, e-Meeting, Oct. 26-Nov. 13, 2020, total 11 pages, R1-2007544.
InterDigital, Inc.,"Discussion on SRS Enhancements", 3GPP TSG RAN WG1 #103-e, e-Meeting, Oct. 26-Nov. 13, 2020, total 6 pages, R1-2007631.
ZTE,"Enhancements on SRS flexibility, coverage and capacity", 3GPP TSG RAN WG1 Meeting #103-e, e-Meeting, Oct. 26-Nov. 13, 2020, total 13 pages, R1-2007768.
Lenovo et al.,"Enhancements on SRS", 3GPP TSG RAN WG1#103-e, e-Meeting, Oct. 26-Nov. 13, 2020, total 7 pages, R1-2008914.
Intel Corporation,"Discussion on SRS enhancements", 3GPP TSG RAN WG1 Meeting #103-e, e-Meeting, Oct. 26-Nov. 13, 2020, total 15 pages, R1-2008982.
Patent Office of Taiwan, Office Action Issued in Application No. 111101644, Jun. 23, 2023, 13 pages.
European Patent Office, Extended European Search Report Issued in Application No. 22738978.0, May 22, 2024, Germany, 12 pages.

* cited by examiner

| Slot offset of SRS | Slot 0 | Slot 1 | Slot 2 | Slot 3 | Slot 4 |
|---|---|---|---|---|---|
| | D | D | F | U | U |
| 0 | | | PDCCH SRS | | |
| 1 | | | PDCCH | SRS | |
| 1 | | PDCCH | SRS | | |
| 2 | PDCCH | | SRS | | |
| 2 | | PDCCH | | SRS | |
| 2 | | | PDCCH | | SRS |
| 3 | PDCCH | | | SRS | |
| 3 | | PDCCH | | | SRS |
| 4 | PDCCH | | | | SRS |

Determining transmission location of a signal based on at least one of a priority of the signal, uplink-downlink pattern configuration, minimum time interval requirement between transmission of triggering signaling and the signal, or the time window requirement between transmission of the triggering signaling and the signal (301)

↓

Transmitting triggering signaling, where the triggering signaling is a signaling that triggers to transmit or receive the signal, and the triggering signaling is associated with the transmission location of the signal (302)

FIG. 3

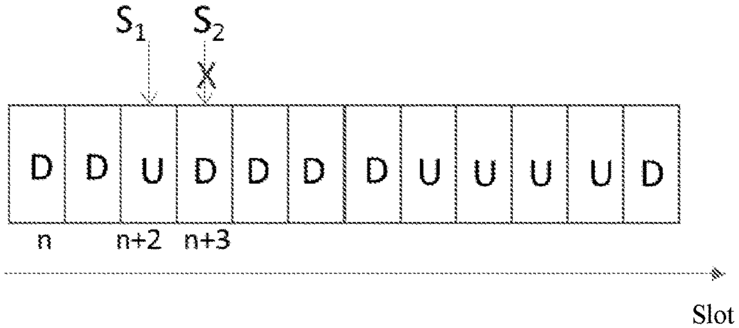

FIG. 4

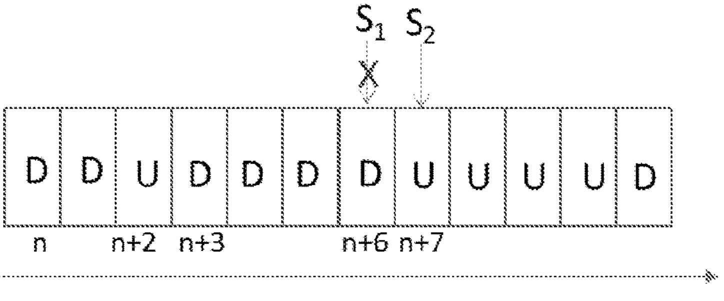

FIG. 5

SIGNAL TRANSMISSION METHOD, APPARATUS, TERMINAL DEVICE, NETWORK DEVICE, AND STORAGE MEDIUM

CROSS-REFERENCE TO RELATED APPLICATION

The present disclosure is a National Stage of International Application No. PCT/CN2022/071180, filed on Jan. 11, 2022, which claims priority to Chinese application No. 2021100578454 filed on Jan. 15, 2021, entitled "Signal Transmission Method, Apparatus, Terminal Device, Network Device and Storage Medium", which are hereby incorporated by reference in their entireties.

FIELD

The present disclosure relates to the field of communication, and particularly relates to a signal transmission method, an apparatus, a terminal device, a network device, and a storage medium.

BACKGROUND

In the current communication system, a reference signal configured by a base station for a terminal does not always exist, and the reference signal under a configurations is transmitted only after being triggered or activated. If the base station configures a reference signal for the terminal and transmits signaling for triggering or activating the reference signal to the terminal, the terminal needs to determine a time for transmitting the reference signal based on a predefined timing relationship between the triggering and transmitting of the reference signal or the timing relationship between the triggering and transmitting of the reference signal instructed by the base station after the terminal receives the signaling.

For example, for the triggering of aperiodic sounding reference signal (SRS) resources in the 3rd generation partnership project new radio (3GPPNR) system, the triggering way and the transmission timing regulations of aperiodic SRS resources limit a time-domain location on which the base station transmits the downlink control information (DCI) for triggering aperiodic SRS resources, which causes the triggering and transmitting of the aperiodic SRS resource inflexible.

SUMMARY

Embodiments of the present application provide a signal transmission method, an apparatus, a terminal device, a network device, and a storage medium to solve the problem of inflexible triggering and transmitting of signals in the prior art.

According to an Aspect of the Present Disclosure, a Signal Transmission Method is Provided, which Includes:

- receiving triggering signaling for triggering to transmit or receive a signal; and
- determining transmission location of the signal based on at least one of a priority of the signal, uplink-downlink pattern configuration, minimum time interval requirement between transmission of the triggering signaling and the signal, or time window requirement between transmission of the triggering signaling and the signal.

In one embodiment, the signal is transmitted at the transmission location.

In One Embodiment, the Determining the Transmission Location of the Signal Based on the Priority of the Signal Includes:

- determining a first transmission location of the signal, where when the first transmission location overlaps with transmission locations of other signals having a higher priority than the signal in time domain, an actual transmission location of the signal is a transmission location where no overlapping occurs in time domain in the first transmission location.

In one embodiment, the determining the transmission location of the signal based on at least one of the priority of the signal, uplink-downlink pattern configuration, the minimum time interval requirement between the transmission of the triggering signaling and the signal, or the time window requirement between transmission of the triggering signaling and the signal, includes:

- determining a first slot based on at least one of the priority of the signal, uplink-downlink pattern configuration, minimum time interval requirement between transmission of the triggering signaling and the signal, or time window requirement between transmission of the triggering signaling and the signal;
- determining the $(t+1)^{th}$ first slot counting from a reference slot as the transmission location of the signal, and t is a non-negative integer.

In one embodiment, the determining the first slot based on the uplink-downlink pattern configuration includes:

- determining that an uplink symbol and/or flexible symbol in the first slot includes the signal resource corresponding to the signal; or
- determining that downlink symbols and/or flexible symbols included in the first slot for the signal resource corresponding to the signal.

In one embodiment, the uplink symbol and/or flexible symbol included in the first slot including the signal resource corresponding to the signal, includes:

- the uplink symbol and/or flexible symbol included in the first slot includes all symbols of all signal resources included in a signal resource set, where the triggering signaling triggers the signal through the signal resource set.

In one embodiment, the uplink symbol and/or flexible symbol included in the first slot includes all symbols of all signal resources included in the signal resource set through which the triggering signaling triggers the signal, includes:

- the uplink symbol and/or flexible symbol included in the first slot includes all symbols of all signal resources included in the signal resource set, where the triggering signaling triggers the signal through the signal resource set.

In one embodiment, the downlink symbol and/or flexible symbol included in the first slot including all symbols of the signal resource corresponding to the signal, includes:

- the downlink symbol and/or flexible symbol included in the first slot includes all symbols of all signal resources included in a signal resource set, where the triggering signaling triggers the signal through the signal resource set.

In one embodiment, the downlink symbols and/or flexible symbols included in the first slot cover all symbols of all signal resources included in the signal resource set through which the triggering signaling triggers the signal, includes:

- the downlink symbols and/or flexible symbols included in the first slot cover all symbols of all signal resources included in all signal resource sets triggered by the triggering signaling.

In One Embodiment, the Determining the First Slot Based on the Uplink-Downlink Pattern Configuration Includes:

determining that the first slot includes at least one symbol indicated by the uplink-downlink pattern configuration as an uplink symbol or a flexible symbol.

In One Embodiment, the Determining the First Slot Based on the Uplink-Downlink Pattern Configuration Includes:

determining that the first slot includes at least one symbol indicated by the uplink-downlink pattern configuration as a downlink symbol or a flexible symbol.

In one embodiment, the minimum time interval requirement is a first minimum timing requirement, and determining the first slot based on the minimum time interval requirement between the transmission of the triggering signaling and the signal includes at least one of the followings:

the first slot satisfies a first time interval condition; the first time interval condition includes: the time interval between a symbol of the channel carrying the triggering signaling and a symbol of the signal resource of the signal satisfies a first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

where the first signal resource set is a signal resource set through which the triggering signaling triggers the signal.

In one embodiment, the time interval between a symbol of the channel carrying the triggering signaling and a symbol of the signal resource in a first signal resource set satisfies the first minimum timing requirement, includes:

a time interval between a symbol of the channel carrying the triggering signaling and a symbol of a signal resource set and/or a signal source triggered by the triggering signaling satisfy the first minimum timing requirement.

In One Embodiment, the Satisfying the First Minimum Timing Requirement Includes One of the Following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

In one embodiment, the determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

where the first signal resource set is a signal resource set through which the triggering signaling triggers the signal.

In One Embodiment, the First Preset Value, the Second Preset Value or the Third Preset Value is Determined Based on at Least One of the Followings:

a value specified in the protocol;

a value indicated by a network device;

a slot offset configured by signaling for the signal resource set through which the triggering signaling triggers the signal;

uplink-downlink pattern configuration;

a value determined by the usage type of the signal resource set through which the triggering signaling triggers the signal;

the numerology of the bandwidth part (BWP) at which the triggering signaling is located; or a value determined by the numerology of the bandwidth part (BWP) at which the signal resource set, through which the triggering signaling triggers the signal, is transmitted.

In One Embodiment, the Determining the First Slot Based on the Priority of the Signal Includes at Least One of the Followings:

a signal in the first slot that at least partially overlaps with a time-domain symbol of the signal has a priority being equal to or lower than that of the signal; or a signal in the first slot that at least partially overlaps with a time-domain symbol of a signal corresponding to the first signal resource set has a priority being equal to or lower than that of a signal corresponding to the first signal resource set; where the first signal resource set is a signal resource set through which the triggering signaling triggers the signal;

a signal in the first slot has a priority being equal to or lower than that of the signal.

In One Embodiment, the Priority of the Signal is Determined Through at Least One of the Following Ways:

determining the priority of the signal based on the usage type of the signal resource set triggered by the triggering signaling;

determining the priority of the signal based on the slot offset configured by radio resource control (RRC) signaling for the signal resource set triggered by the triggering signaling;

determining the priority of the signal based on the priority indication signaling of a network device;

determining the priority of the signal based on the number of symbols of the signal resource triggered by the triggering signaling;

determining the priority of the signal based on the number of symbols of the signal resource set triggered by the triggering signaling.

In One Embodiment, the Signal Resource is a Signal Resource in the Carrier or Cell in Which the Signal is Located; and/or the signal resource set is a signal resource set in the carrier or cell in which the signal is located.

In One Embodiment, the Reference Slot Includes at Least One of the Followings:

a slot at which the triggering signaling is located;

a slot determined based on the slot at which the triggering signaling is located and a slot offset configured by the network device for the signal resource set triggered by the triggering signaling through radio resource control (RRC) signaling;

a slot determined based on the slot offset indicated by medium access control-control element (MAC-CE); or a slot determined based on the slot offset indicated by the triggering signaling.

In One Embodiment, the t or t+1 is Determined Through at Least One of the Following Ways:

determining the t or t+1 based on a dedicated information field in the triggering signaling;

determining the t or t+1 based on the information field of triggering an aperiodic signal in the triggering signaling; or determining the t or t+1 based on a triggering state of the aperiodic signal indicated by the triggering signaling.

In one embodiment, the method further includes: determining the t or t+1 based on indication information included in the triggering signaling, where the indication information is used to select one or more values from a group of candidate values indicated by MAC-CE and/or RRC signaling.

In One Embodiment, the Method Includes: Determining the t or t+1 Based on the Information Field of Triggering an Aperiodic Signal in the Triggering Signaling Includes:

determining the t based on the value of the information field that triggers the signal in the triggering signaling and an association relationship between t indicated by the MAC-CE and/or RRC signaling and the value of the information field that triggers the signal in the triggering signaling; or determining the t+1 based on the value of the information field that triggers the signal in the triggering signaling and an association relationship between t+1 indicated by the MAC-CE and/or RRC signaling and the value of the information field that triggers the signal in the triggering signaling; or determining the t based on an association relationship between t indicated by the MAC-CE and/or RRC signaling and the triggering state indicated by the information field that triggers the signal in the triggering signaling and the triggering state; or determining the t+1 based on an association relationship between t+1 indicated by the MAC-CE and/or RRC signaling and the triggering state indicated by the information field that triggers the signal in the triggering signaling and the triggering state.

In One Embodiment, the Signal Transmission Method Further Includes:

determining the t based on an association relationship between a type of the signal resource set triggered by the triggering signaling and t, or determining the t+1 based on an association relationship between a type of the signal resource set triggered by the triggering signaling and t+1; and/or determining the t or t+1 based on a slot offset selected by the triggering signaling from multiple slot offset indicated by the MAC-CE and/or RRC signaling and another slot offset indicated by the triggering signaling.

In One Embodiment, the t or t+1 is Indicated Through at Least One of the Following Ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

According to a Second Aspect of the Present Application, a Signal Transmission Method is Provided, which Includes:

determining transmission location of a signal based on at least one of a priority of the signal, uplink-downlink pattern configuration, minimum time interval requirement between transmission of triggering signaling and the signal, or the time window requirement between transmission of the triggering signaling and the signal;

transmitting triggering signaling, and the triggering signaling is a signaling that triggers to transmit or receive the signal, and the triggering signaling is associated with the transmission location of the signal.

In one embodiment, the signal is transmitted at the transmission location.

In one embodiment, the transmission location of the triggering signaling is associated with the transmission location of the signal.

In one embodiment, the content carried in the triggering signaling is associated with the transmission location of the signal.

In One Embodiment, the Determining the Transmission Location of the Signal Based on the Priority of the Signal Includes:

determining a first transmission location of the signal, and when the first transmission location overlaps with transmission locations of other signals having a higher priority than the signal in time domain, an actual transmission location of the signal is a transmission location where no overlapping occurs in time domain in the first transmission location.

In one embodiment, the determining transmission location of the signal based on at least one of the priority of the signal, uplink-downlink pattern configuration, minimum time interval requirement between transmission of the triggering signaling and the signal, or time window requirement between transmission of the triggering signaling and the signal, includes:

determining a first slot based on at least one of the priority of the signal, uplink-downlink pattern configuration, minimum time interval requirement between transmission of the triggering signaling and the signal, or time window requirement between transmission of the triggering signaling and the signal;

where the transmission location of the signal is the $(t+1)^{th}$ first slot counting from a reference slot, and t is a non-negative integer.

In One Embodiment, the Determining the First Slot Based on the Uplink-Downlink Pattern Configuration Includes:

determining that an uplink symbol and/or flexible symbol included in the first slot includes all symbols of the signal resource corresponding to the signal; or determining that a downlink symbol and/or flexible symbol included in the first slot includes all symbols of the signal resource corresponding to the signal.

In one embodiment, the uplink symbol and/or flexible symbol included in the first slot including all symbols of the signal resource corresponding to the signal, includes:

the uplink symbol and/or flexible symbol included in the first slot includes all symbols of all signal resources included in a signal resource set, where the triggering signaling triggers the signal through the signal resource set.

In one embodiment, the uplink symbol and/or flexible symbol included in the first slot including all symbols of all signal resources included in the signal resource set through which the triggering signaling triggers the signal, includes:

the uplink symbol and/or flexible symbol included in the first slot includes all symbols of all signal resources included in the signal resource set, where the triggering signaling triggers the signal through the signal resource set.

In One Embodiment, the Downlink Symbol and/or Flexible Symbol Included in the First Slot Including the Signal Resource Corresponding to the Signal, Includes:

the downlink symbol and/or flexible symbol included in the first slot includes all symbols of all signal resources included in a signal resource set, where the triggering signaling triggers the signal through the signal resource set.

In one embodiment, the downlink symbol and/or flexible symbol included in the first slot including all symbols of all signal resources included in the signal resource set through which the triggering signaling triggers the signal, includes:

the downlink symbol and/or flexible symbol included in the first slot includes all symbols of all signal resources included in the signal resource set, where the triggering signaling triggers the signal through the signal resource set.

In One Embodiment, the Determining the First Slot Based on the Uplink-Downlink Pattern Configuration Includes:

determining that the first slot includes at least one symbol indicated by the uplink-downlink pattern configuration as an uplink symbol or a flexible symbol.

In One Embodiment, the Determining the First Slot Based on the Uplink-Downlink Pattern Configuration Includes:

determining that the first slot includes at least one symbol indicated by the uplink-downlink pattern configuration as a downlink symbol or a flexible symbol.

In one embodiment, the minimum time interval requirement is a first minimum timing requirement, and determining the first slot based on the minimum time interval requirement between the transmission of the triggering signaling and the signal includes at least one of the followings:

the first slot satisfies a first time interval condition; the first time interval condition includes: the time interval between a symbol of the channel carrying the triggering signaling and a symbol of the signal resource of the signal satisfies the first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

where the first signal resource set is a signal resource set through which the triggering signaling triggers the signal.

In one embodiment, the time interval between a symbol of the channel carrying the triggering signaling and a symbol of the signal resource in a first signal resource set satisfies the first minimum timing requirement, includes:

time intervals between a symbol of the channel carrying the triggering signaling and a symbol of a signal resource set and/or a signal source triggered by the triggering signaling satisfy the first minimum timing requirement.

In One Embodiment, the Satisfying the First Minimum Timing Requirement Includes One of the Following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

In one embodiment, the determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies the requirement that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

where the first signal resource set is a signal resource set through which the triggering signaling triggers the signal.

In One Embodiment, the First Preset Value, the Second Preset Value or the Third Preset Value is Associated with at Least One of the Following Information:

a value specified in the protocol;

a value indicated to the terminal device;

a slot offset configured for the signal resource set through which the triggering signaling triggers the signal;

uplink-downlink pattern configuration;

usage type of the signal resource set through which the triggering signaling triggers the signal;

the numerology of the bandwidth part (BWP) at which the triggering signaling is located;

a value determined by the numerology of the bandwidth part (BWP) at which the signal resource set, through which the triggering signaling triggers the signal, is transmitted.

In One Embodiment, the Determining the First Slot Based on the Priority of the Signal Includes at Least One of the Followings:

a signal in the first slot that at least partially overlaps with a time-domain symbol of the signal has a priority being equal to or lower than that of the signal;

a signal in the first slot that at least partially overlaps with a time-domain symbol of a signal corresponding to the first signal resource set has a priority being equal to or lower than that of a signal corresponding to the first signal resource set; where the first signal resource set is a signal resource set through which the triggering signaling triggers the signal; or a signal in the first slot has a priority being equal to or lower than that of the signal.

In One Embodiment, the Priority of the Signal is Determined Through at Least One of the Following Ways:

determining the priority of the signal based on the usage type of the signal resource set triggered by the triggering signaling;

determining the priority of the signal based on the slot offset configured by radio resource control (RRC) signaling for the signal resource set triggered by the triggering signaling;

determining the priority of the signal based on the priority indication signaling transmitted to the terminal device;

determining the priority of the signal based on the number of symbols of the signal resource triggered by the triggering signaling;

determining the priority of the signal based on the number of symbols of the signal resource set triggered by the triggering signaling.

In One Embodiment, the Signal Resource is a Signal Resource in the Carrier or Cell in Which the Signal is Located; and/or the signal resource set is a signal resource set in the carrier or cell in which the signal is located.

In One Embodiment, the Reference Slot Includes at Least One of the Followings:

a slot at which the triggering signaling is located;

a slot at which the triggering signaling is located and the slot indicated by the slot offset configured for the signal resource set triggered by the triggering signaling through the radio resource control (RRC) signaling;

a slot indicated by the slot offset indicated by the medium access control-control element (MAC-CE); or a slot indicated by the slot offset indicated by the triggering signaling.

In One Embodiment, the t or t+1 is Indicated Through at Least One of the Following Ways:

indicating the t or t+1 through a dedicated information field in the triggering signaling;

indicate the t or t+1 through the information field of the trigger aperiodic signal in the triggering signaling; or indicating the t or t+1 through a triggering state of the aperiodic signal indicated by the triggering signaling.

In one embodiment, the method further includes: indicating the t or t+1 through indication information included in the triggering signaling, and the indication information is used to select one or more values from a group of candidate values indicated by MAC-CE and/or RRC signaling.

In one embodiment, the indicating the t or t+1 through the information field of triggering the aperiodic signal in the triggering signaling includes:

indicating the t or t+1 through the value of the information field that triggers the signal in the triggering signaling and an association relationship between t or t+1 indicated by the MAC-CE and/or RRC signaling and the value of the information field that triggers the signal in the triggering signaling; or indicating the t or t+1 through an association relationship between t or t+1 indicated by the MAC-CE and/or RRC signaling and the triggering state indicated by the information field that triggers the signal in the triggering signaling and the triggering state.

In One Embodiment, the Signal Transmission Method Further Includes:

indicating the t or t+1 through an association relationship between a type of the signal resource set triggered by the triggering signaling and t or t+1; and/or indicating the t or t+1 through a slot offset selected by the triggering signaling from multiple slot offset indicated by the MAC-CE and/or RRC signaling and another slot offset indicated by the triggering signaling.

In One Embodiment, the t or t+1 is Indicated Through at Least One of the Following Ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

According to a Third Aspect of the Present Application, a Signal Transmission Device Applied to a Terminal Device is Provided, which Includes:

a receiving device, configured to receive triggering signaling for triggering to transmit or receive a signal;

a determining device, configured to determine transmission location of the signal based on at least one of a priority of the signal, uplink-downlink pattern configuration, minimum time interval requirement between transmission of the triggering signaling and the signal, or time window requirement between transmission of the triggering signaling and the signal.

In one embodiment, the signal is transmitted at the transmission location.

In One Embodiment, the Determining the Transmission Location of the Signal Based on the Priority of the Signal Includes:

determining a first transmission location of the signal, where when the first transmission location overlaps with transmission locations of other signals having a higher priority than the signal in time domain, an actual transmission location of the signal is a transmission location where no overlapping occurs in time domain in the first transmission location.

In one embodiment, the determining the transmission location of the signal based on at least one of the priority of the signal, uplink-downlink pattern configuration, the minimum time interval requirement between the transmission of the triggering signaling and the signal, or the time window requirement between transmission of the triggering signaling and the signal, includes:

determining the first slot based on at least one of the priority of the signal, uplink-downlink pattern configuration, minimum time interval requirement between transmission of the triggering signaling and the signal, or time window requirement between transmission of the triggering signaling and the signal;

determining the $(t+1)^{th}$ first slot counting from a reference slot as the transmission location of the signal, where t is a non-negative integer.

In One Embodiment, the Determining the First Slot Based on the Uplink-Downlink Pattern Configuration Includes:

determining that the uplink symbol and/or flexible symbols included in the first slot includes all symbols of the signal resource corresponding to the signal; or determining that the downlink symbol and/or flexible symbol included in the first slot includes all symbols of the signal resource corresponding to the signal.

In one embodiment, the uplink symbols and/or flexible symbols included in the first slot includes all symbols of the signal resource corresponding to the signal, includes:

the uplink symbol and/or flexible symbol included in the first slot includes all symbols of all signal resources included in a signal resource set, where the triggering signaling triggers the signal through the signal resource set.

In one embodiment, the uplink symbol and/or flexible symbol included in the first slot includes all symbols of all signal resources included in the signal resource set through which the triggering signaling triggers the signal, includes:

the uplink symbol and/or flexible symbol included in the first slot includes all symbols of all signal resources included in the signal resource set, where the triggering signaling triggers the signal through the signal resource set.

In one embodiment, the downlink symbol and/or flexible symbol included in the first slot includes the signal resource corresponding to the signal, includes:

the downlink symbol and/or flexible symbol included in the first slot includes all symbols of all signal resources included in a signal resource set, where the triggering signaling triggers the signal through the signal resource set.

In one embodiment, the downlink symbol and/or flexible symbol included in the first slot including all symbols of all signal resources included in the signal resource set through which the triggering signaling triggers the signal, includes:

the downlink symbol and/or flexible symbol included in the first slot includes all symbols of all signal resources included in the signal resource set, where the triggering signaling triggers the signal through the signal resource set.

In One Embodiment, the Determining the First Slot Based on the Uplink-Downlink Pattern Configuration Includes:

determining that the first slot includes at least one symbol indicated by the uplink-downlink pattern configuration as an uplink symbol or a flexible symbol.

In One Embodiment, the Determining the First Slot Based on the Uplink-Downlink Pattern Configuration Includes:

determining that the first slot includes at least one symbol indicated by the uplink-downlink pattern configuration as a downlink symbol or a flexible symbol.

In one embodiment, the minimum time interval requirement is a first minimum timing requirement, and determining the first slot based on the minimum time interval requirement between the transmission of the triggering signaling and the signal includes at least one of the followings:

the first slot satisfies a first time interval condition; the first time interval condition includes: the time interval between the symbol of the channel carrying the triggering signaling and the symbol of the signal resource of the signal satisfies a first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

where the first signal resource set is a signal resource set through which the triggering signaling triggers the signal.

In one embodiment, the time interval between a symbol of the channel carrying the triggering signaling and a symbol of the signal resource in a first signal resource set satisfies the first minimum timing requirement, includes:

time intervals between a symbol of the channel carrying the triggering signaling and a symbol of a signal resource set and/or a signal source triggered by the triggering signaling satisfy the first minimum timing requirement.

In One Embodiment, the Satisfying the First Minimum Timing Requirement Includes One of the Following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

In one embodiment, the determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

where the first signal resource set is a signal resource set through which the triggering signaling triggers the signal.

In One Embodiment, the First Preset Value, the Second Preset Value or the Third Preset Value is Determined Based on at Least One of the Followings:

- a value specified in the protocol;
- a value indicated by a network device;
- a slot offset configured by signaling for the signal resource set through which the triggering signaling triggers the signal;
- uplink-downlink pattern configuration;
- a value determined by the usage type of the signal resource set through which the triggering signaling triggers the signal;
- the numerology of the bandwidth part (BWP) at which the triggering signaling is located;
- a value determined by the numerology of the bandwidth part (BWP) at which the signal resource set, through which the triggering signaling triggers the signal, is transmitted.

In One Embodiment, the Determining the First Slot Based on the Priority of the Signal Includes at Least One of the Followings:

- a signal in the first slot that at least partially overlaps with a time-domain symbol of the signal has a priority being equal to or lower than that of the signal;
- a signal in the first slot that at least partially overlaps with a time-domain symbol of a signal corresponding to the first signal resource set has a priority being equal to or lower than that of a signal corresponding to the first signal resource set; where the first signal resource set is a signal resource set through which the triggering signaling triggers the signal; or
- a signal in the first slot has a priority being equal to or lower than that of the signal.

In One Embodiment, the Priority of the Signal is Determined Through at Least One of the Following Ways:

- determining the priority of the signal based on the usage type of the signal resource set triggered by the triggering signaling;
- determining the priority of the signal based on the slot offset configured by radio resource control (RRC) signaling for the signal resource set triggered by the triggering signaling;
- determining the priority of the signal based on the priority indication signaling of a network device;
- determining the priority of the signal based on the number of symbols of the signal resource triggered by the triggering signaling;
- determining the priority of the signal based on the number of symbols of the signal resource set triggered by the triggering signaling.

In One Embodiment, the Signal Resource is a Signal Resource in the Carrier or Cell in Which the Signal is Located; and/or

- the signal resource set is a signal resource set in the carrier or cell in which the signal is located.

In One Embodiment, the Reference Slot Includes at Least One of the Followings:

- a slot at which the triggering signaling is located;
- a slot determined based on the slot at which the triggering signaling is located and the slot offset configured by the network device for the signal resource set triggered by the triggering signaling through radio resource control (RRC) signaling; or
- a slot determined based on the slot offset indicated by the medium access control device MAC-CE;
- a slot determined based on the slot offset indicated by the triggering signaling.

In One Embodiment, the t or t+1 is Determined Through at Least One of the Following Ways:

- determining the t or t+1 based on a dedicated information field in the triggering signaling;
- determining the t or t+1 based on the information field of triggering an aperiodic signal in the triggering signaling; or
- determining the t or t+1 based on a triggering state of the aperiodic signal indicated by the triggering signaling.

In one embodiment, the device is further configured to: determine the t+1 based on the value of the information field that triggers the signal in the triggering signaling and an association relationship between t+1 indicated by the MAC-CE and/or RRC signaling and the value of the information field that triggers the signal in the triggering signaling.

In one embodiment, the device is further configured to determine the t or t+1 based on the information field of triggering an aperiodic signal in the triggering signaling, includes:

- determining the t based on an association relationship between t indicated by the MAC-CE and/or RRC signaling and the triggering state indicated by the information field that triggers the signal in the triggering signaling and the triggering state; or determining the t+1 based on the value of the information field that triggers the signal in the triggering signaling and an association relationship between t+1 indicated by the MAC-CE and/or RRC signaling and the value of the information field that triggers the signal in the triggering signaling; or
- determining the t based on an association relationship between t indicated by the MAC-CE and/or RRC signaling and the triggering state indicated by the information field that triggers the signal in the triggering signaling and the triggering state; or determining the t+1 based on an association relationship between t+1 indicated by the MAC-CE and/or RRC signaling and the triggering state indicated by the information field that triggers the signal in the triggering signaling and the triggering state.

In One Embodiment, the Device is Further Configured to:

- determine the t based on an association relationship between a type of the signal resource set triggered by the triggering signaling and t, or determine the t+1 based on an association relationship between a type of the signal resource set triggered by the triggering signaling and t+1; and/or
- determine the t or t+1 based on a slot offset selected by the triggering signaling from multiple slot offset indicated by the MAC-CE and/or RRC signaling and another slot offset indicated by the triggering signaling.

In One Embodiment, the t or t+1 is Indicated Through at Least One of the Following Ways:

- independently indicating t or t+1 of different signal resources triggered by the triggering signaling
- jointly indicating t or t+1 of different signal resources triggered by the triggering signaling;
- t or t+1 corresponding to respective signal resources in the same signal resource set triggered by the triggering signaling being the same; or
- t or t+1 corresponding to respective signal resource sets or signal resources triggered by the same triggering signaling being the same.

According to a Fourth Aspect of the Present Application, a Signal Transmission Device Applied to Network Device is Provided, which Includes:

a processing device, configured to determine the transmission location of the signal based on at least one of the priority of the signal, uplink-downlink pattern configuration, minimum time interval requirement between transmission of triggering signaling and the signal, or the time window requirement between transmission of the triggering signaling and the signal;

a transmitting device, configured to transmit triggering signaling; the triggering signaling is a signaling that triggers to transmit or receive the signal, and the triggering signaling is associated with a transmission location of the signal.

In one embodiment, the signal is transmitted at the transmission location.

In one embodiment, the transmission location of the triggering signaling is associated with the transmission location of the signal.

In one embodiment, the content carried in the triggering signaling is associated with the transmission location of the signal.

In One Embodiment, the Determining the Transmission Location of the Signal Based on the Priority of the Signal Includes:

determining a first transmission location of the signal, where when the first transmission location overlaps with transmission locations of other signals having a higher priority than the signal in time domain, an actual transmission location of the signal is a transmission location where no overlapping occurs in time domain in the first transmission location.

In one embodiment, the determining transmission location of the signal based on at least one of the priority of the signal, uplink-downlink pattern configuration, minimum time interval requirement between transmission of the triggering signaling and the signal, or time window requirement between transmission of the triggering signaling and the signal, includes:

determining a first slot based on at least one of the priority of the signal, uplink-downlink pattern configuration, minimum time interval requirement between transmission of the triggering signaling and the signal, or time window requirement between transmission of the triggering signaling and the signal;

where the transmission location of the signal is the $(t+1)^{th}$ first slot counting from a reference slot, and t is a non-negative integer.

In One Embodiment, the Determining the First Slot Based on the Uplink-Downlink Pattern Configuration Includes:

determining that an uplink symbol and/or flexible symbol included in the first slot includes all symbols of the signal resource corresponding to the signal; or determining that a downlink symbol and/or flexible symbol included in the first slot includes all symbols of the signal resource corresponding to the signal.

In one embodiment, the uplink symbol and/or flexible symbol included in the first slot including all symbols of the signal resource corresponding to the signal, includes:

the uplink symbol and/or flexible symbol included in the first slot includes all symbols of all signal resources included in a signal resource set, where the triggering signaling triggers the signal through the signal resource set.

In one embodiment, the uplink symbol and/or flexible symbol included in the first slot including all symbols of all signal resources included in the signal resource set through which the triggering signaling triggers the signal, includes:

the uplink symbol and/or flexible symbol included in the first slot includes all symbols of all signal resources included in the signal resource set, where the triggering signaling triggers the signal through the signal resource set.

In one embodiment, the downlink symbol and/or flexible symbol included in the first slot including all symbols of the signal resource corresponding to the signal, includes:

the downlink symbol and/or flexible symbol included in the first slot includes all symbols of all signal resources included in a signal resource set, where the triggering signaling triggers the signal through the signal resource set.

In one embodiment, the downlink symbol and/or flexible symbol included in the first slot including all symbols of all signal resources included in the signal resource set through which the triggering signaling triggers the signal, includes:

the downlink symbol and/or flexible symbol included in the first slot includes all symbols of all signal resources included in the signal resource set, where the triggering signaling triggers the signal through the signal resource set.

In One Embodiment, the Determining the First Slot Based on the Uplink-Downlink Pattern Configuration Includes:

determining that the first slot includes at least one symbol indicated by the uplink-downlink pattern configuration as an uplink symbol or a flexible symbol.

In One Embodiment, the Determining the First Slot Based on the Uplink-Downlink Pattern Configuration Includes:

determining that the first slot includes at least one symbol indicated by the uplink-downlink pattern configuration as a downlink symbol or a flexible symbol.

In one embodiment, the minimum time interval requirement is a first minimum timing requirement, and determining the first slot based on the minimum time interval requirement between the transmission of the triggering signaling and the signal includes at least one of the followings:

the first slot satisfies a first time interval condition; the first time interval condition includes: the time interval between the symbol of the channel carrying the triggering signaling and the symbol of the signal resource of the signal satisfies a first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

where the first signal resource set is a signal resource set through which the triggering signaling triggers the signal.

In one embodiment, the time interval between a symbol of the channel carrying the triggering signaling and a symbol of the signal resource in a first signal resource set satisfies the first minimum timing requirement, includes:

a time interval between a symbol of the channel carrying the triggering signaling and a symbol of a signal resource set and/or a signal source triggered by the triggering signaling satisfies the first minimum timing requirement.

In One Embodiment, the Satisfying the First Minimum Timing Requirement Includes One of the Following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

In one embodiment, the determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

where the first signal resource set is a signal resource set through which the triggering signaling triggers the signal.

In one embodiment, the first preset value, the second preset value or the third preset value is associated with at least one of the following information:

a value specified in the protocol;

a value indicated to the terminal device;

a slot offset configured for the signal resource set through which the triggering signaling triggers the signal;

uplink-downlink pattern configuration;

usage type of the signal resource set through which the triggering signaling triggers the signal;

the numerology of the bandwidth part (BWP) at which the triggering signaling is located;

a value determined by the numerology of the bandwidth part (BWP) at which the signal resource set, through which the triggering signaling triggers the signal, is transmitted.

In One Embodiment, the Determining the First Slot Based on the Priority of the Signal Includes at Least One of the Followings:

a signal in the first slot that at least partially overlaps with a time-domain symbol of the signal has a priority being equal to or lower than that of the signal;

a signal in the first slot that at least partially overlaps with a time-domain symbol of a signal corresponding to the first signal resource set has a priority being equal to or lower than that of a signal corresponding to the first signal resource set; where the first signal resource set is a signal resource set through which the triggering signaling triggers the signal; or a signal in the first slot has a priority being equal to or lower than that of the signal.

In One Embodiment, the Priority of the Signal is Determined Through at Least One of the Following Ways:

determining the priority of the signal based on the usage type of the signal resource set triggered by the triggering signaling;

determining the priority of the signal based on the slot offset configured by radio resource control (RRC) signaling for the signal resource set triggered by the triggering signaling;

determining the priority of the signal based on the priority indication signaling transmitted to the terminal device;

determining the priority of the signal based on the number of symbols of the signal resource triggered by the triggering signaling;

determining the priority of the signal based on the number of symbols of the signal resource set triggered by the triggering signaling.

In One Embodiment, the Signal Resource is a Signal Resource in the Carrier or Cell in Which the Signal is Located; and/or the signal resource set is a signal resource set in the carrier or cell in which the signal is located.

In One Embodiment, the Reference Slot Includes at Least One of the Followings:

a slot at which the triggering signaling is located;

a slot at which the triggering signaling is located and the slot indicated by the slot offset configured for the signal resource set triggered by the triggering signaling through the radio resource control (RRC) signaling;

a slot indicated by the slot offset indicated by the medium access control-control element (MAC-CE); or a slot indicated by the slot offset indicated by the triggering signaling.

In One Embodiment, the t or t+1 is Indicated Through at Least One of the Following Ways:

indicating the t or t+1 through a dedicated information field in the triggering signaling;

indicate the t or t+1 through the information field of the trigger aperiodic signal in the triggering signaling; or indicating the t or t+1 through a triggering state of the aperiodic signal indicated by the triggering signaling.

In one embodiment, the device is further configured to: indicate the t or t+1 through indication information included in the triggering signaling, and the indication information is used to select one or more values from a group of candidate values indicated by MAC-CE and/or RRC signaling.

In one embodiment, the device is configured to: indicate the t or t+1 through the information field of triggering the aperiodic signal in the triggering signaling, includes:

indicating the t or t+1 through the value of the information field that triggers the signal in the triggering signaling and an association relationship between t or t+1 indicated by the MAC-CE and/or RRC signaling and the value of the information field that triggers the signal in the triggering signaling; or indicating the t or t+1 through an association relationship between t or t+1 indicated by the MAC-CE and/or RRC signaling and the triggering state indicated by the information field that triggers the signal in the triggering signaling and the triggering state.

In One Embodiment, the Device is Further Configured to:

indicate the t or t+1 through an association relationship between a type of the signal resource set triggered by the triggering signaling and t or t+1; and/or indicate the t or t+1 through a slot offset selected by the triggering signaling from multiple slot offset indicated by the MAC-CE and/or RRC signaling and another slot offset indicated by the triggering signaling.

In One Embodiment, the t or t+1 is Indicated Through at Least One of the Following Ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

According to a fifth aspect of the present application, a terminal device is provided, which includes a memory storing a computer program, and a processor, where the computer program, when executed by the processor, performs the following steps:

receiving triggering signaling for triggering to transmit or receive a signal;

determining transmission location of the signal based on at least one of a priority of the signal, uplink-downlink pattern configuration, triggering signaling and minimum time interval requirement between the signal transmission, or time window requirement between transmission of the triggering signaling and the signal.

In one embodiment, the signal is transmitted at the transmission location.

In One Embodiment, the Determining the Transmission Location of the Signal Based on the Priority of the Signal Includes:

determining a first transmission location of the signal, where when the first transmission location overlaps with transmission locations of other signals having a higher priority than the signal in time domain, an actual transmission location of the signal is a transmission location where no overlapping occurs in time domain in the first transmission location.

In one embodiment, the determining the transmission location of the signal based on at least one of the priority of the signal, uplink-downlink pattern configuration, the minimum time interval requirement between the transmission of the triggering signaling and the signal, or the time window requirement between transmission of the triggering signaling and the signal, includes:

determining the first slot based on at least one of the priority of the signal, uplink-downlink pattern configuration, minimum time interval requirement between transmission of the triggering signaling and the signal, or time window requirement between transmission of the triggering signaling and the signal;

determining the $(t+1)^{th}$ first slot counting from a reference slot as the transmission location of the signal, where t is a non-negative integer.

In One Embodiment, the Determining the First Slot Based on the Uplink-Downlink Pattern Configuration Includes:

determining that an uplink symbol and/or flexible symbol included in the first slot includes all symbols of the signal resource corresponding to the signal; or determining that a downlink symbol and/or flexible symbol included in the first slot includes all symbols of the signal resource corresponding to the signal.

In one embodiment, the uplink symbol and/or flexible symbol included in the first slot including all symbols of the signal resource corresponding to the signal, includes:

the uplink symbol and/or flexible symbol included in the first slot includes all symbols of all signal resources included in a signal resource set, where the triggering signaling triggers the signal through the signal resource set.

In one embodiment, the uplink symbol and/or flexible symbol included in the first slot including all symbols of all signal resources included in the signal resource set through which the triggering signaling triggers the signal, includes:

the uplink symbol and/or flexible symbol included in the first slot includes all symbols of all signal resources included in the signal resource set, where the triggering signaling triggers the signal through the signal resource set.

In one embodiment, the downlink symbol and/or flexible symbol included in the first slot including all symbols of the signal resource corresponding to the signal, includes:

the downlink symbol and/or flexible symbol included in the first slot includes all symbols of all signal resources included in the signal resource set, where the triggering signaling triggers the signal through the signal resource set.

In one embodiment, the downlink symbol and/or flexible symbol included in the first slot including all symbols of all signal resources included in the signal resource set through which the triggering signaling triggers the signal, includes:

the downlink symbol and/or flexible symbol included in the first slot includes all symbols of all signal resources included in the signal resource set, where the triggering signaling triggers the signal through the signal resource set.

In One Embodiment, the Determining the First Slot Based on the Uplink-Downlink Pattern Configuration Includes:

determining that the first slot includes at least one symbol indicated by the uplink-downlink pattern configuration as an uplink symbol or a flexible symbol.

In One Embodiment, the Determining the First Slot Based on the Uplink-Downlink Pattern Configuration Includes:

determining that the first slot includes at least one symbol indicated by the uplink-downlink pattern configuration as a downlink symbol or a flexible symbol.

In one embodiment, the minimum time interval requirement is a first minimum timing requirement, and determining the first slot based on the minimum time interval requirement between the transmission of the triggering signaling and the signal includes at least one of the followings:

the first slot satisfies a first time interval condition; the first time interval condition includes: the time interval between the symbol of the channel carrying the triggering signaling and the symbol of the signal resource of the signal satisfies a first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

where the first signal resource set is a signal resource set through which the triggering signaling triggers the signal.

In one embodiment, the time interval between the symbol of the channel carrying the triggering signaling and the symbol of the signal resource in the first signal resource set satisfies the first minimum timing requirement, includes:

a time interval between a symbol of the channel carrying the triggering signaling and a symbol of a signal resource set and/or a signal source triggered by the triggering signaling satisfy the first minimum timing requirement.

In One Embodiment, the Satisfying the First Minimum Timing Requirement Includes One of the Following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

In one embodiment, the determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

where the first signal resource set is a signal resource set through which the triggering signaling triggers the signal.

In One Embodiment, the First Preset Value, the Second Preset Value or the Third Preset Value is Determined Based on at Least One of the Followings:

a value specified in the protocol;

a value indicated by a network device;

a slot offset configured by signaling for the signal resource set through which the triggering signaling triggers the signal;

uplink-downlink pattern configuration;

a value determined by the usage type of the signal resource set through which the triggering signaling triggers the signal;

the numerology of the bandwidth part (BWP) at which the triggering signaling is located;

a value determined by the numerology of the bandwidth part (BWP) at which the signal resource set, through which the triggering signaling triggers the signal, is transmitted.

In One Embodiment, the Determining the First Slot Based on the Priority of the Signal Includes at Least One of the Followings:

a signal in the first slot that at least partially overlaps with a time-domain symbol of the signal has a priority being equal to or lower than that of the signal;

a signal in the first slot that at least partially overlaps with a time-domain symbol of a signal corresponding to the first signal resource set has a priority being equal to or lower than that of a signal corresponding to the first signal resource set; where the first signal resource set is a signal resource set through which the triggering signaling triggers the signal; or a signal in the first slot has a priority being equal to or lower than that of the signal.

In One Embodiment, the Priority of the Signal is Determined Through at Least One of the Following Ways:

determining the priority of the signal based on the usage type of the signal resource set triggered by the triggering signaling;

determining the priority of the signal based on the slot offset configured by radio resource control (RRC) signaling for the signal resource set triggered by the triggering signaling;

determining the priority of the signal based on the priority indication signaling of a network device;

determining the priority of the signal based on the number of symbols of the signal resource triggered by the triggering signaling;

determining the priority of the signal based on the number of symbols of the signal resource set triggered by the triggering signaling.

In One Embodiment, the Signal Resource is a Signal Resource in the Carrier or Cell in Which the Signal is Located; and/or the signal resource set is a signal resource set in the carrier or cell in which the signal is located.

In One Embodiment, the Reference Slot Includes at Least One of the Followings:

a slot at which the triggering signaling is located;

a slot determined based on the slot at which the triggering signaling is located and a slot offset configured by the network device for the signal resource set triggered by the triggering signaling through radio resource control (RRC) signaling;

a slot determined based on the slot offset indicated by medium access control-control element (MAC-CE); or a slot determined based on the slot offset indicated by the triggering signaling.

In One Embodiment, the t or t+1 is Determined Through at Least One of the Following Ways:

determining the t or t+1 based on a dedicated information field in the triggering signaling;

determining the t or t+1 based on the information field of triggering an aperiodic signal in the triggering signaling; or determining the t or t+1 based on a triggering state of the aperiodic signal indicated by the triggering signaling.

In one embodiment, the computer program, when executed by the processor, further performs the following steps: determining the t or t+1 based on indication information included in the triggering signaling, where the indication information is used to select one or more values from a group of candidate values indicated by MAC-CE and/or RRC signaling.

In one embodiment, the computer program, when executed by the processor, further performs the following steps: determining the t or t+1 based on the information field of triggering an aperiodic signal in the triggering signaling, includes:

determining the t based on the value of the information field that triggers the signal in the triggering signaling and an association relationship between t indicated by the MAC-CE and/or RRC signaling and the value of the information field that triggers the signal in the triggering signaling; or determining the t+1 based on the value of the information field that triggers the signal in the triggering signaling and an association relationship between t+1 indicated by the MAC-CE and/or RRC signaling and the value of the information field that triggers the signal in the triggering signaling; or determining the t based on an association relationship between t indicated by the MAC-CE and/or RRC signaling and the triggering state indicated by the information field that triggers the signal in the triggering signaling and the triggering state; or determining the t+1 based on an association relationship between t+1 indicated by the MAC-CE and/or RRC signaling and the triggering state indicated by the information field that triggers the signal in the triggering signaling and the triggering state.

In One Embodiment, the Computer Program, when Executed by the Processor, Further Performs the Following Steps:

determining the t based on an association relationship between a type of the signal resource set triggered by the triggering signaling and t, or determining the t+1 based on an association relationship between a type of the signal resource set triggered by the triggering signaling and t+1; and/or determining the t or t+1 based on a slot offset selected by the triggering signaling from multiple slot offset indicated by the MAC-CE and/or RRC signaling and another slot offset indicated by the triggering signaling.

In One Embodiment, the t or t+1 is Indicated Through at Least One of the Following Ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

According to a sixth aspect of the present application, a network device is provided, which includes a memory storing a computer program, and a processor, where the computer program, when executed by the processor, performs the following steps:

determining the transmission location of the signal based on at least one of the priority of the signal, uplink-downlink pattern configuration, the triggering signaling and the minimum time interval requirement between the signal transmission, or the time window requirement between transmission of the triggering signaling and the signal;

transmitting triggering signaling; the triggering signaling is a signaling that triggers to transmit or receive the signal, and the triggering signaling is associated with the transmission location of the signal.

In one embodiment, the signal is transmitted at the transmission location.

In one embodiment, the transmission location of the triggering signaling is associated with the transmission location of the signal.

In one embodiment, the content carried in the triggering signaling is associated with the transmission location of the signal.

In One Embodiment, the Determining the Transmission Location of the Signal Based on the Priority of the Signal Includes:

determining a first transmission location of the signal, where when the first transmission location overlaps with transmission locations of other signals having a higher priority than the signal in time domain, an actual transmission location of the signal is a transmission location where no overlapping occurs in time domain in the first transmission location.

In one embodiment, the determining the transmission location of the signal based on at least one of the priority of the signal, uplink-downlink pattern configuration, the minimum time interval requirement between the transmission of the triggering signaling and the signal, or the time window requirement between transmission of the triggering signaling and the signal, includes:

determining the first slot based on at least one of the priority of the signal, uplink-downlink pattern configuration, minimum time interval requirement between transmission of the triggering signaling and the signal, or time window requirement between transmission of the triggering signaling and the signal;

where the transmission location of the signal is the $(t+1)^{th}$ first slot counting from a reference slot, and t is a non-negative integer.

In One Embodiment, the Determining the First Slot Based on the Uplink-Downlink Pattern Configuration Includes:

determining that an uplink symbol and/or flexible symbol included in the first slot includes all symbols of the signal resource corresponding to the signal; or determining that a downlink symbols and/or flexible symbols included in the first slot cover all symbols of the signal resource corresponding to the signal.

In one embodiment, the uplink symbol and/or flexible symbol included in the first slot including all symbols of the signal resource corresponding to the signal, includes:

the uplink symbol and/or flexible symbol included in the first slot includes all symbols of all signal resources included in a signal resource set, where the triggering signaling triggers the signal through the signal resource set.

In one embodiment, the uplink symbol and/or flexible symbol included in the first slot including all symbols of all signal resources included in the signal resource set through which the triggering signaling triggers the signal, includes:

the uplink symbol and/or flexible symbol included in the first slot includes all symbols of all signal resources included in the signal resource set, where the triggering signaling triggers the signal through the signal resource set.

In one embodiment, the downlink symbol and/or flexible symbol included in the first slot including all symbols of the signal resource corresponding to the signal, includes:

the downlink symbol and/or flexible symbol included in the first slot includes all symbols of all signal resources included in a signal resource set, where the triggering signaling triggers the signal through the signal resource set.

In one embodiment, the downlink symbol and/or flexible symbol included in the first slot including all symbols of all signal resources included in the signal resource set through which the triggering signaling triggers the signal, includes:

the downlink symbol and/or flexible symbol included in the first slot includes all symbols of all signal resources included in the signal resource set, where the triggering signaling triggers the signal through the signal resource set.

In One Embodiment, the Determining the First Slot Based on the Uplink-Downlink Pattern Configuration Includes:

determining that the first slot includes at least one symbol indicated by the uplink-downlink pattern configuration as an uplink symbol or a flexible symbol.

In One Embodiment, the Determining the First Slot Based on the Uplink-Downlink Pattern Configuration Includes:

determining that the first slot includes at least one symbol indicated by the uplink-downlink pattern configuration as a downlink symbol or a flexible symbol.

In one embodiment, the minimum time interval requirement is a first minimum timing requirement, and determining the first slot based on the minimum time interval requirement between the transmission of the triggering signaling and the signal includes at least one of the followings:

the first slot satisfies a first time interval condition; the first time interval condition includes: the time interval between the symbol of the channel carrying the triggering signaling and the symbol of the signal resource of the signal satisfies a first minimum timing requirement;

the first slot satisfies the second time interval condition; the second time interval condition includes: the time interval between a symbol of the channel carrying the triggering signaling and a symbol of the signal resource in a first signal resource set satisfies the first minimum timing requirement;

where the first signal resource set is a signal resource set through which the triggering signaling triggers the signal.

In one embodiment, the time interval between a symbol of the channel carrying the triggering signaling and a symbol of the signal resource in a first signal resource set satisfies the first minimum timing requirement, includes:

time intervals between a symbol of the channel carrying the triggering signaling and a symbol of a signal resource set and/or a signal source triggered by the triggering signaling satisfy the first minimum timing requirement.

In One Embodiment, the Satisfying the First Minimum Timing Requirement Includes One of the Following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

In one embodiment, the determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

where the first signal resource set is a signal resource set through which the triggering signaling triggers the signal.

In one embodiment, the first preset value, the second preset value or the third preset value is associated with at least one of the following information:

a value specified in the protocol;

a value indicated to the terminal device;

a slot offset configured for the signal resource set through which the triggering signaling triggers the signal;

uplink-downlink pattern configuration;

usage type of the signal resource set through which the triggering signaling triggers the signal;

the numerology of the bandwidth part (BWP) at which the triggering signaling is located;

a value determined by the numerology of the bandwidth part (BWP) at which the signal resource set, through which the triggering signaling triggers the signal, is transmitted.

In one embodiment, the determining the first slot based on the priority of the signal includes at least one of the followings:

a signal in the first slot that at least partially overlaps with a time-domain symbol of the signal has a priority being equal to or lower than that of the signal;

a signal in the first slot that at least partially overlaps with a time-domain symbol of a signal corresponding to the first signal resource set has a priority being equal to or lower than that of a signal corresponding to the first signal resource set; where the first signal resource set is a signal resource set through which the triggering signaling triggers the signal; or a signal in the first slot has a priority being equal to or lower than that of the signal.

In One Embodiment, the Priority of the Signal is Determined Through at Least One of the Following Ways:

determining the priority of the signal based on the usage type of the signal resource set triggered by the triggering signaling;

determining the priority of the signal based on the slot offset configured by radio resource control (RRC) signaling for the signal resource set triggered by the triggering signaling;

determining the priority of the signal based on the priority indication signaling transmitted to the terminal device;

determining the priority of the signal based on the number of symbols of the signal resource triggered by the triggering signaling;

determining the priority of the signal based on the number of symbols of the signal resource set triggered by the triggering signaling.

In One Embodiment, the Signal Resource is a Signal Resource in the Carrier or Cell in Which the Signal is Located; and/or the signal resource set is a signal resource set in the carrier or cell in which the signal is located.

In One Embodiment, the Reference Slot Includes at Least One of the Followings:

a slot at which the triggering signaling is located;

a slot at which the triggering signaling is located and a slot indicated by the slot offset configured for the signal resource set triggered by the triggering signaling through the radio resource control (RRC) signaling;

a slot indicated by the slot offset indicated by the medium access control-control element (MAC-CE); or a slot indicated by the slot offset indicated by the triggering signaling.

In One Embodiment, the t or t+1 is Indicated Through at Least One of the Following Ways:

indicating the t or t+1 through a dedicated information field in the triggering signaling;

indicate the t or t+1 through the information field of the trigger aperiodic signal in the triggering signaling; or indicating the t or t+1 through a triggering state of the aperiodic signal indicated by the triggering signaling.

In one embodiment, the computer program, when executed by the processor, further performs the following step: indicating the t or t+1 through indication information included in the triggering signaling, and the indication information is used to select one or more values from a group of candidate values indicated by MAC-CE and/or RRC signaling.

In one embodiment, the computer program, when executed by the processor, further performs the following step: indicating t or t+1 through the information field of triggering an aperiodic signal in the triggering signaling, which includes:

indicating the t or t+1 through the value of the information field that triggers the signal in the triggering signaling and an association relationship between t or t+1 indicated by the MAC-CE and/or RRC signaling and the value of the information field that triggers the signal in the triggering signaling; or indicating the t or t+1 through an association relationship between t or t+1 indicated by the MAC-CE and/or RRC signaling and the triggering state indicated by the information field that triggers the signal in the triggering signaling and the triggering state.

In One Embodiment, the Computer Program, when Executed by the Processor, Further Performs the Following Step:

indicating the t or t+1 through an association relationship between a type of the signal resource set triggered by the triggering signaling and t or t+1; and/or indicating the t or t+1 through a slot offset selected by the triggering signaling from multiple slot offset indicated by the MAC-CE and/or RRC signaling and another slot offset indicated by the triggering signaling.

In One Embodiment, the t or t+1 is Indicated Through at Least One of the Following Ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

According to a seventh aspect of the present application, a processor-readable storage medium is provided, on which a computer program is stored. When the program is executed by the processor, the signal transmission method as described in the first aspect are performed, or the signal transmission method as described in the second aspect are performed.

The signal transmission method, apparatus, terminal device, network device, and storage medium are provided in the embodiments of the present application. The method includes: receiving triggering signaling for triggering to transmit or receive a signal, and determining transmission location of the signal based on at least one of a priority of the signal, uplink-downlink pattern configuration, minimum time interval requirement between transmission of the triggering signaling and the signal, or time window requirement between transmission of the triggering signaling and the signal. The embodiment of the present application increases the opportunity for signal transmission, to increase the flexibility of signal scheduling and transmission.

BRIEF DESCRIPTION OF THE DRAWINGS

In order to more clearly illustrate the embodiments of the present application or the prior art, the following will briefly introduce the drawings that need to be used in the description of the embodiments or the prior art. Obviously, the accompanying drawings in the following description. These are some embodiments of the present application.

FIG. 3 is a flowchart of a signal transmission method applied to a base station according to an embodiment of the present application;

FIG. 4 is a first schematic diagram of the UE determining the transmission slot of the SRS resource set $S_k$ according to an embodiment of the present application;

FIG. 5 is a second schematic diagram of the UE determining the transmission slot of the SRS resource set $S_k$ according to an embodiment of the present application;

DETAILED DESCRIPTION

The embodiments of the present application will be clearly and completely described below in conjunction with the accompanying drawings in the embodiments of the present application. Obviously, the described embodiments are only some of the embodiments of the present application, not all of them.

As mentioned in the BACKGROUND, in the existing communication system, the reference signal configured by the base station for the terminal does not always exist, and the reference signal under various configurations (for example, configured as an aperiodic or semi-persistent reference signal) can be transmitted only after being triggered or activated. If the base station configures a reference signal for the terminal and transmits signaling for triggering or activating the reference signal to the terminal, the terminal needs to determine a time for transmitting the reference signal based on a predefined timing relationship between the triggering and transmitting of the reference signal or the timing relationship between the triggering and transmitting of the reference signal instructed by the base station after the terminal receives the signaling.

The reference signal being as the SRS is taken as an example. In the $3^{rd}$ Generation Partnership Project New Radio (3GPP NR) system, a base station configures aperiodic SRS (or channel state information reference signal (CSI-RS)) resource set and aperiodic SRS (/CSI-RS) resources for user equipment (UE) through radio resource control (RRC) signaling, and triggers to transmit aperiodic SRS (/CSI-RS) resources through the SRS request field (/CSI request field) in the DCI. When configuring the aperiodic SRS (/CSI-RS) resource set through RRC, the RRC signaling slotOffset (/aperiodicTriggeringOffset) is used to configure a triggering offset value of the SRS (/CSI-RS) in the aperiodic SRS (/CSI-RS) resource set. When the base station triggers an aperiodic SRS (/CSI-RS) resource set through the SRS request field (/CSI reporting field/CSI request field) in DCI within a slot n, the SRS (/CSI-RS) all SRS (/CSI-RS) resources in the SRS (/CSI-RS) resource set are transmitted within a slot $$\left\lfloor n\cdot\frac{2^{\mu}SRS}{2^{\mu}PDCCH}\right\rfloor+k,$$

where k is a triggering slot offset corresponding to slotOffset (/aperiodicTriggeringOffset), $\mu_{SRS}$ and $\mu_{PDCCH}$ are subcarrier spacing values of the triggered SRS and PDCCH carrying triggering signaling, respectively.

Figures 1, 2:
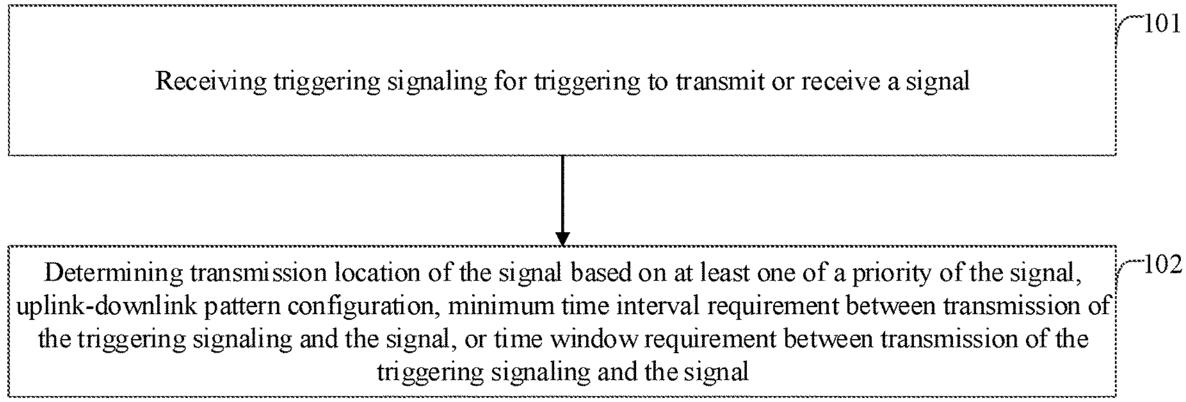
FIG. 1 illustrates a schematic diagram of all possible locations of PDCCH and SRS when transmitting the PDSCH triggering the aperiodic SRS and transmitting the aperiodic SRS within five slots in a case that the uplink and downlink slots are configured as DDFUU every five slots in the prior art.
FIG. 2 is a flowchart of a signal transmission method applied to a terminal device according to an embodiment of the present application.

Since the configuration of the RRC signaling is semi-static, it causes the triggering of the SRS inflexible by configuring the triggering offset value of the aperiodic SRS through the RRC signaling. In addition, in TDD mode, if slot $n+n_{offset}$ is a downlink slot (/uplink slot), then the slot $n+n_{offset}$ cannot perform SRS (/CSI-RS) transmission, and the UE will no longer perform the SRS (/CSI-RS) RS) transmission. In order to prevent SRS (/CSI-RS) from being unable to be transmitted, it will limit time-domain location where the base station transmits DCI, to reduce the flexibility of triggering SRS (/CSI-RS) transmission through DCI. FIG. 1 illustrates all possible locations of PDCCH and SRS when transmitting the PDSCH triggering the aperiodic SRS and transmitting the aperiodic SRS within five slots in a case that the uplink and downlink slots are configured as DDFUU every five slots (where D represents a downlink slot, U represents an uplink slot, and F represents a flexible slot). Each row represents a transmission location of a PDCCH and SRS under an SRS slot offset, and each vertical column represents a slot. As shown in FIG. 1, when the trigger slot offset is 1, the PDCCH used to trigger aperiodic SRS can only be transmitted in slot 1 or slot 2, and cannot be transmitted in other slots, and SRS can only be transmitted in slot 2 and slot 3. As can be seen, the way of triggering SRS resources and the transmitting timing regulation of aperiodic SRS resources limit the time-domain location on which the base station transmits the downlink control information (DCI) for triggering aperiodic SRS resources, which causes the triggering and transmitting of the aperiodic SRS resource inflexible. In order to solve this problem, embodiments of the application provides a signal transmission method, an apparatus, a terminal device, a network device and a storage medium, the signal transmission method, apparatus, terminal device, network device and storage media provided by the application will be described in detail below through specific embodiments Equipment and storage media.

It should be noted that in the following description, since the method and the device are based on the same application concept, and the principles of the method and the device to solve the problem are similar, the implementations of the device and the method can refer to each other, and the repetition will not be repeated.

In addition, it should be noted that the embodiments of the present application can be applied to various systems, including but not limited to 5G systems (such as NR systems), 6G systems or other OFDM systems, DFT-S-OFDM systems, and so on. For example, the applicable system may include a global system of mobile communication (GSM) system, a code division multiple access (CDMA) system, a wideband code division multiple access (WCDMA) general packet radio service (GPRS) system, a long term evolution (LTE) system, a LTE frequency division duplex (FDD) system, a LTE time division duplex (TDD) system, a Long term evolution advanced (LTE-A) system, a universal mobile telecommunications system (UMTS), a worldwide interoperability for microwave access (WiMAX) system, a 5G New Radio (NR) system, and the like. These various systems include a user equipment and a network device. The system may also include a core network part, such as an evolved packet system (EPS), a 5G system (5GS), and the like.

The terminal device involved in this embodiment of the present application may be a device that provides voice and/or data connectivity to users, a handheld device having a wireless connection function, or other processing devices connected to a wireless modem. In different systems, the names of the terminal device may be different. For example, in a 5G system, the terminal device may be called a user equipment (UE). The wireless terminal device can communicate with one or more core networks (CN) via the radio access network (RAN), and the wireless terminal device can be a mobile terminal device, such as a mobile phone (or called a "cellular" telephone) and a computer having a mobile terminal device. For example, it may be portable, pocket, hand-held, computer built-in or vehicle-mounted mobile devices, which exchange language and/or data with the radio access network, such as, personal communication service (PCS) telephone, cordless telephone, session initiated protocol (SIP) telephone, wireless local loop (WLL) station, personal digital assistant (PDA) and other devices. Wireless terminal device may also be called a system, a subscriber unit, a subscriber station, a mobile station, a mobile, a remote station, an access point, a remote terminal, an access terminal, a user terminal, a user agent, and a user device, which are not limited in this embodiment of the present application.

Since the terminal device and other network devices (such as core network devices and access network devices (i.e., base stations)) together constitute a communication-capable network, in this application, the terminal device is also regarded as a kind of network device.

The network device involved in this embodiment of the present application may be a base station, and the base station may include multiple cells providing services for terminals, or may be a centralized unit (CU) or a distributed unit (DU). Depending on different applications, the network device may also be called an access point, or it may be a device in the access network that communicates with the wireless terminal device through one or more sectors (or other names) on the air interface. The network device may be used to interchange received air frames with internet protocol (IP) packets and act as a router between the wireless terminal device and the rest of the access network, which can include the internet protocol (IP) communication network. Network devices may also coordinate attribute management for the air interface. For example, the network device involved in the embodiment of the present application may be a base transceiver station (BTS) in global system for mobile communications (GSM) or code division multiple access (CDMA), and it can also be a NodeB in wide-band code division multiple access (WCDMA), an evolutional Node B (eNB or e-NodeB) in a long term evolution (LTE) system, a gNB in the 5G network architecture (next generation system), a home evolved Node B (HeNB), a relay node, a femto, a pico base station (pico), and the like, but not limited in this embodiment of the present application. In some network structures, a network device may include a centralized unit (CU) node and a distributed unit (distributed unit, DU) node, and the centralized unit and the distributed unit may also be arranged geographically separately.

In addition, it should be understood that the term "and/or" in the embodiments of the present application describes the association relationship of associated objects, which includes three types of relationships. For example, A and/or B may indicate: A exists alone, A and B exist simultaneously, B exists alone. The character "/" generally indicates that the pre and post objects have an "or" relationship.

Reference throughout this specification to "one embodiment" or "an embodiment" means that a particular feature, structure, or characteristic related to the embodiment is included in at least one embodiment of the present application. Thus, appearances of "in one embodiment" or "in an embodiment" in various places throughout the specification are not necessarily referring to the same embodiment. Furthermore, the particular features, structures or characteristics may be combined in one or more embodiments in any suitable manner.

The present application will be described in detail below.

As shown in FIG. 2, it is a flowchart of the signal transmission method applied to the terminal device according to an embodiment of the present application. The method includes the following steps:

Step 101: receiving triggering signaling for triggering to transmit or receive a signal;

Step 102: determining transmission location of the signal based on at least one of a priority of the signal, uplink-downlink pattern configuration, minimum time interval requirement between transmission of the triggering signaling and the signal, or time window requirement between transmission of the triggering signaling and the signal.

In one embodiment, the signal is transmitted at the transmission location.

In one embodiment, the determining the transmission location of the signal includes: determining a slot for transmitting the signal.

In this embodiment, it can be understood that a network device, such as a base station, transmits a triggering signaling to a UE to transmit or receive a signal, and after receiving the triggering signaling, the UE determines a transmission location of the triggering signaling based on the triggering signaling. In this embodiment, it is given a manner of determining transmission location of the signal based on one or more of a priority of the signal, uplink-downlink pattern configuration, minimum time interval requirement between transmission of the triggering signaling and the signal, or time window requirement between transmission of the triggering signaling and the signal. It may increase the opportunity of signal transmission, to increase the flexibility of signal scheduling and transmission.

In this embodiment, it can be understood that after determining the transmission location of the signal, the UE may transmit the signal at the transmission location or receive the signal at the transmission location. When the signal is an uplink signal, the UE transmits the signal at the transmission location. When the signal is a downlink signal, the UE receives the signal at the transmission location.

In one embodiment, the signal is an uplink signal and a downlink symbol overlaps with a transmission location of the signal, the UE does not transmit the signal at the transmission location.

In one embodiment, the signal is an uplink signal and the transmission location of the downlink symbol overlaps with the signal, the UE discards the overlapping part of the signal and the downlink symbol, and only transmits the signal on a symbol that is not the downlink symbol at the transmission location.

In one embodiment, the signal is an uplink signal and a downlink symbol overlaps with a transmission location of a signal resource included in the signal resource set of the signal in a slot, the UE does not transmit a signal corresponding to the signal resource set in the slot.

In one embodiment, the signal is an uplink signal and a downlink symbol overlaps with a transmission location of a signal resource included in a signal resource set of the signal in a slot, the UE discards the overlapping part of the signal resource set and the downlink symbol in the slot, and only transmits the signal corresponding to the signal resource set on a symbol that is not the downlink symbol at the transmission location.

In one embodiment, the signal is an uplink signal and a downlink symbol overlaps with a transmission location of a signal resource included in an uplink signal resource set triggered by the triggering signaling in a slot, the UE does not transmit the signal triggered by the triggering signaling in the slot.

In one embodiment, the signal is an uplink signal and a downlink symbol overlaps with a transmission location of a signal resource included in an uplink signal resource set triggered by the triggering signaling, the UE discards the overlapping part of the uplink signal resource set triggered by the triggering signaling and the downlink symbol in the slot, and only transmits the signal triggered by the triggering signaling on a symbol that is not the downlink symbols at the transmission location.

In one embodiment, the signal is a downlink signal and an uplink symbol overlaps with a transmission location of the signal, the UE receives the signal at the transmission location.

In one embodiment, the signal is a downlink signal and an uplink symbol overlaps with a transmission location of the signal, the UE discards the overlapping part of the signal and the uplink symbol, and only receives the signal on a symbol that is not an uplink symbol at the transmission location.

In one embodiment, the signal is a downlink signal and an uplink symbol overlaps with a transmission location of a signal resource included in the signal resource set of the signal in a slot, the UE does not receive the signal corresponding to the signal resource set in the slot.

In one embodiment, the signal is a downlink signal and an uplink symbol overlaps with a transmission location of a signal resource included in a signal resource set of the signal in a slot, the UE discards the overlapping part of the signal resource set and the uplink symbol in the slot, and only receives the signal corresponding to the signal resources set on a symbol that is non the uplink symbol at the transmission location.

In one embodiment, the signal is a downlink signal and an uplink symbol overlaps with a transmission location of a signal resource included in the downlink signal resource set triggered by the triggering signaling in a slot, the UE does not receive the signal triggered by the triggering signaling in the slot.

In one embodiment, the signal is a downlink signal and an uplink symbol overlaps with a transmission location of a signal resource included in the downlink signal resource set triggered by the triggering signaling in a slot, the UE discards the overlapping part of the downlink signal resource set triggered by the triggering signaling and the uplink symbol in the slot, and only receives the signal triggered by the triggering signaling on a symbol that is not the uplink symbol at the transmission location.

It should be noted that this embodiment is applicable to aperiodic uplink signals (such as sounding reference signal (SRS)), aperiodic downlink signals (such as channel state information reference signal (CSI-RS)), channel state information interference measurement (CSI-IM) reference signal, etc.), semi-persistent uplink signal, semi-persistent downlink signal, etc. To make the description more intuitive, subsequent embodiments of the present application will be described through aperiodic SRS. It can be seen that this embodiment can solve the problem of inflexible triggering and transmitting of aperiodic signal resources in a wireless communication system.

In one embodiment, the determining the transmission location of the signal based on the uplink-downlink pattern configuration includes: determining the transmission location of the signal based on whether the signal is configured in a frequency division duplex (FDD) frequency band. In this case, it may be regarded as a special configuration of uplink-downlink pattern that the signal is configured in the FDD frequency band, and the FDD frequency band may be regarded as a configuration of all uplink symbols or all downlink symbols.

The signal transmission method according to an embodiment of the present application includes: receiving triggering signaling for triggering to transmit or receive a signal; and determining transmission location of the signal based on at least one of a priority of the signal, uplink-downlink pattern configuration, minimum time interval requirement between transmission of the triggering signaling and the signal, or time window requirement between transmission of the triggering signaling and the signal. The embodiment of the present application increases the opportunity of signal transmission, to increase the flexibility of signal scheduling and transmission According to contents of any of the above embodiments, in this embodiment, the determining transmission location of the signal based on at least one of the priority of the signal, uplink-downlink pattern configuration, minimum time interval requirement between transmission of the triggering signaling and the signal, or time window requirement between transmission of the triggering signaling and the signal, includes:

- determining a first slot based on at least one of the priority of the signal, uplink-downlink pattern configuration, minimum time interval requirement between transmission of the triggering signaling and the signal, or time window requirement between transmission of the triggering signaling and the signal;
- determining the $(t+1)^{th}$ first slot counting from a reference slot as the transmission location of the signal, where t is a non-negative integer.

In this embodiment, the uplink-downlink pattern configuration may be uplink-downlink pattern configuration that the network device configures for the terminal device through at least one of RRC signaling, MAC-CE, and DCI signaling. The uplink-downlink pattern configuration may also be uplink-downlink pattern configuration of a carrier or cell in which the signal is located that the network device configures for the terminal device.

In this embodiment, a first slot may be first determined based on at least one of a priority of the signal, uplink-downlink pattern configuration, minimum time interval requirement between transmission of the triggering signaling and the signal, or time window requirement between transmission of the triggering signaling and the signal. Then the $(t+1)^{th}$ first slot counting from the reference slot is determined as the transmission location of the signal, and t is a non-negative integer. It should be noted that when the first slot is determined based on at least one of a priority of the signal, uplink-downlink pattern configuration, minimum time interval requirement between transmission of the triggering signaling and the signal, or time window requirement between transmission of the triggering signaling and the signal, it may make determination based on one or more of the following: ① uplink-downlink pattern configuration; ② time interval between the transmission of triggering signaling and the transmission of the signal; ③ time window requirement between transmission of the triggering signaling and transmission of the signal; ④ the priority of the signal. In addition, it can be understood that each item of ①-④ has multiple implementations in subsequent embodiments, and the implementations under each item of ①-④ may be freely combined and used.

For example, the example of making determination based on ① uplink-downlink pattern configuration is as follows:

If a slot includes at least one uplink or flexible symbol configured by higher layer signaling, the slot is the first slot.

As another example, the example of making determination based on ① uplink-downlink pattern configuration and ② time interval between the transmission of triggering signaling and the transmission of the signal is as follows:

If a slot includes at least one uplink or flexible symbol configured by higher layer signaling and satisfies the first timing requirement, then the slot is the first slot, and the first timing requirement is as follows: the time interval between a symbol of the channel carrying the triggering signaling and a symbol of the first signal resource is not less than the first minimum timing requirement; or the time interval between a symbol of the channel carrying the triggering signaling and a symbol of the first signal resource is greater than the first minimum timing requirement.

The free combination and use of the implementations under the items ①-④ will be described in the subsequent embodiments, which are not described in detail here.

In this embodiment, the way of determining the reference slot includes at least one of the followings: ① a slot at which the triggering signaling is located; ② a slot determined based on the slot at which the triggering signaling is located and a slot offset configured by the network device for the signal resource set triggered by the triggering signaling through radio resource control (RRC) signaling; ③ a slot determined based on the slot offset indicated by medium access control-control element (MAC-CE); ④ a slot determined based on the slot offset indicated by the triggering signaling. Subsequent embodiments will describe the reference slot in more detail, and for the detailed contents, it may refer to subsequent embodiments.

In this embodiment, the t or t+1 is determined through at least one of the following ways: ① determining t or t+1 based on a dedicated information field in the triggering signaling; ② determining the t or t+1 based on the information field of triggering the aperiodic signal in the triggering signaling; ③ determining the t or t+1 based on a triggering state of the aperiodic signal indicated by the triggering signaling. Subsequent embodiments will describe the t in more detail, and for detailed contents, it may refer to subsequent embodiments.

As can be seen, in this embodiment, the first slot is determined based on at least one of a priority of the signal, uplink-downlink pattern configuration, minimum time interval requirement between transmission of the triggering signaling and the signal, or time window requirement between transmission of the triggering signaling and the signal, and then the $(t+1)^{th}$ first slot counting from a reference slot is determined as the transmission location of the signal. It may increase the opportunity of signal transmission, to increase the flexibility of signal scheduling and transmission.

Based on contents of any of the above embodiments, in this embodiment, the determining the first slot based on the uplink-downlink pattern configuration includes:

determining that an uplink symbol and/or flexible symbol included in the first slot includes all symbols of the signal resource corresponding to the signal; or determining that a downlink symbol and/or flexible symbol included in the first slot includes all symbols of the signal resource corresponding to the signal.

In this embodiment, it can be understood that when the first slot is determined based on uplink-downlink pattern configuration, it has two situations of uplink and downlink: A, when the signal is an uplink signal, the uplink symbols and/or the flexible symbol included in the first slot satisfy condition A, and the condition A is: covering all symbols of the signal resource corresponding to the signal; when the signal is an uplink signal, the slot at which the transmission opportunity that satisfies the transmission condition is located includes the uplink symbols and/or flexible symbols included in the first slot at which the transmission opportunity satisfying the transmission condition is located cover all the symbols that are configured for the signal resource configuring the signal.

B, when the signal is a downlink signal, the downlink symbol and/or flexible symbol included in the first slot includes all symbols of the signal resource corresponding to the signal. In one embodiment, when the signal is a downlink signal, the downlink symbols and/or flexible symbols included in the slot at which the transmission opportunity that satisfies the transmission condition is located cover all the symbols configured by the signal resource configuring the signal.

Based on contents of any of the above embodiments, in this embodiment, the uplink symbols and/or flexible symbols included in the first slot satisfy condition A, includes:

the uplink symbol and/or flexible symbol included in the first slot includes all symbols of all signal resources included in a signal resource set, where the triggering signaling triggers the signal through the signal resource set.

In this embodiment, the triggering signaling may be downlink control information (DCI).

Based on contents of any of the above embodiments, in this embodiment, the uplink symbol and/or flexible symbol included in the first slot including all symbols of all signal resources included in the signal resource set through which the triggering signaling triggers the signal, includes:

the uplink symbol and/or flexible symbol included in the first slot includes all symbols of all signal resources included in the signal resource set triggered by the triggering signaling.

Based on contents of any of the above embodiments, in this embodiment, the downlink symbol and/or flexible symbol included in the first slot including all symbols of the signal resource corresponding to the signal, includes:

the downlink symbol and/or flexible symbol included in the first slot includes all symbols of all signal resources included in a signal resource set, where the triggering signaling triggers the signal through the signal resource set.

Based on contents of any of the above embodiments, in this embodiment, the downlink symbol and/or flexible symbol included in the first slot including all symbols of all signal resources included in the signal resource set through which the triggering signaling triggers the signal, includes:

the downlink symbol and/or flexible symbol included in the first slot includes all symbols of all signal resources included in the signal resource set, where the triggering signaling triggers the signal through the signal resource set.

Based on contents of any of the above embodiments, in this embodiment, the determining the first slot based on the uplink-downlink pattern configuration includes:

determining that the first slot includes at least one symbol indicated by the uplink-downlink pattern configuration as an uplink symbol or a flexible symbol.

Based on contents of any of the above embodiments, in this embodiment, the determining the first slot based on the uplink-downlink pattern configuration includes:

determining that the first slot includes at least one symbol indicated by the uplink-downlink pattern configuration as a downlink symbol or a flexible symbol.

For the above several embodiments, the determining the first slot based on uplink-downlink pattern configuration may have at least the following implementations:

if a slot includes at least one uplink or flexible symbol configured by higher layer signaling, the slot is the first slot. It should be noted that the transmission location of the signal in this implementation is no longer a fixed number of slots, but it is related to the configuration of uplink and downlink slots, and the flexibility of triggering and transmitting the signal and opportunities of transmitting the signal can be increased. For example, assumed that the time-domain symbols configured for the signal resources of the signal are the last two symbols in the slot, if the last two symbols included in a slot are both uplink symbols, this slot is a slot that satisfies the first condition. For another example, the time-domain symbols configured for the signal resources of the signal are the last two symbols in the slot, if one of the last two symbols included in a slot is an uplink symbol and the other one is a flexible symbol, this slot is a slot that satisfies the first condition. For another yet example, the time-domain symbols configured for the signal resources of the signal are the last two symbols in the slot, if the last two symbols included in a slot include a downlink symbol, this slot is not a slot that satisfies the first condition;

If the uplink and/or flexible symbols included in a slot cover the time-domain symbols of all signal resources in the signal resource set through which the triggering signaling triggers the signal, the slot is the first slot. It should be noted that the transmission location of the signal in this implementation is no longer a fixed number of slots, but it is related to the configuration of the uplink and downlink slots and the uplink symbols and flexible symbols included in the slots. It may increase opportunity of the signal successfully transmitting at the $(t+1)^{th}$ (or $t^{th}$) first slot, to increase the flexibility of triggering and transmitting the signal. For example, assumed that the triggering signaling triggers the signal through signal resource set 1, this signal resource set includes the signal resource (which may be marked as signal resource 1) and another signal resource (which may be marked as signal resource 2) of the signal. Assumed that the time-domain symbols configured for signal resource 1 are the last two symbols in the slot, and the time-domain symbols configured for signal resource 2 are the last three symbols in the slot. If the last three symbols included in a slot are all uplink symbols, this slot is a slot that satisfies the first condition; but if the third from last symbol included in a slot is a downlink symbol and the last two symbols are uplink symbol, this slot is not a slot that satisfies the first condition;

If the uplink and/or flexible symbols included in a slot cover the time-domain symbols configured for all SRS resources in the first SRS resource set, the slot is the first slot. It should be noted that in this implementation, the transmission location of the signal is no longer a fixed number of slots, but it is related to the configuration of the uplink and downlink slots and the uplink symbols and flexible symbols included in the slots. It may increase opportunity of the signal successfully transmitting at the $(t+1)^{th}$ (or $t^{th}$) first slot, to increase the flexibility of triggering and transmitting the signal. In addition, in this implementation, all signal resources in a signal resource set are determined in the same way for the first slot, which can ensure that all signal resources in a signal resource set are transmitted in the same slot, to reduce the complexity of base station scheduling.

If the uplink and/or flexible symbols included in a slot cover the time-domain symbols configured for all SRS resources in all resource sets triggered by the DCI, the slot is the first slot. It should be noted that, in this implementation, the transmission location of the signal is no longer a fixed number of slots, but it is related to the configuration of the uplink and downlink slots and the uplink symbols and flexible symbols included in the slots. It may increase opportunity of the signal successfully transmitting at the $(t+1)^{th}$ (or $t^{th}$) first slot, to increase the flexibility of triggering and transmitting the signal. In addition, in this implementation, all signal resources of all signal resource sets in a CC (carrier) triggered by triggering signaling are determined in the same way for the first slot, which can ensure the relative relationship of transmission locations of the signal resource set triggered by triggering signaling, to reduce the complexity of base station scheduling.

Based on contents of any of the above-mentioned embodiments, in this embodiment, the minimum time interval requirement is the first minimum timing requirement, and the determining the first slot based on the minimum time interval requirement between the transmission of the triggering signaling and the signal includes at least one of the followings:

the first slot satisfies a first time interval condition; the first time interval condition includes: the time interval between the symbol of the channel carrying the triggering signaling and the symbol of the signal resource of the signal satisfies a first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

where the first signal resource set is a signal resource set through which the triggering signaling triggers the signal.

Based on contents of any of the above embodiments, in this embodiment, the time interval between the symbol of the channel carrying the triggering signaling and the symbol of the signal resource in the first signal resource set satisfies the first minimum timing requirement, includes:

a time interval between a symbol of the channel carrying the triggering signaling and a symbol of a signal resource set and/or a signal source triggered by the triggering signaling satisfies the first minimum timing requirement.

The determining the first slot based on the minimum time interval requirement between the transmission of the triggering signaling and the signal includes the first slot satisfying a first time interval condition, and the first time interval condition includes the time interval between the symbol of the channel carrying the triggering signaling and the symbol of the signal resource of the signal satisfying the first minimum timing requirement; the determining the first slot based on the minimum time interval requirement between the transmission of the triggering signaling and the signal includes:

for a slot, determining whether the time interval between the symbol of the channel carrying the triggering signaling and the symbol of the signal resource of the signal satisfies the first minimum timing requirement. If the first minimum timing requirement is not satisfied, the slot is not the first slot; if the first minimum timing requirement is satisfied, the slot is the first slot.

For example, assumed that the triggering signaling is DCI, the channel carrying the DCI is PDCCH, the signal is an SRS, and the symbol occupied by the corresponding SRS resource is the last symbol in the slot. Assumed that the PDCCH is transmitted in slot n, then for slot k, determining whether the time interval between the last symbol of slot k and the last symbol of the PDCCH satisfies the first minimum timing requirement, and if so, then slot k is the first slot, otherwise slot k is not the first slot.

The determining the first slot based on the minimum time interval requirement between the transmission of the triggering signaling and the signal includes the first slot satisfying a first time interval condition, and the first time interval condition includes the time interval between the symbol of the channel carrying the triggering signaling and the symbol of the signal resource of the signal satisfying the first minimum timing requirement; the determining the first slot based on the minimum time interval requirement between the transmission of the triggering signaling and the signal includes:

for a slot, determining whether the time interval between the symbol of the channel carrying the triggering signaling and the symbol of the signal resource of the signal satisfies the first minimum timing requirement. If the first minimum timing requirement is not satisfied, the slot is not the first slot; if the first minimum timing requirement is satisfied, and the slot also needs to satisfy other conditions that need to be satisfied, then the slot is the first slot.

For example, it is assumed that the first slot needs to satisfy the following conditions: the uplink symbols and/or flexible symbols included in the first slot cover all signal resources included in the signal resource set through which the triggering signaling triggers the signal; and the time interval between the symbol of the channel carrying the triggering signaling and the signal resource of the signal satisfies the first minimum timing requirement. It is then assumed that the triggering signaling is DCI, the channel carrying the DCI is PDCCH, the signal is an SRS, and the symbol occupied by the corresponding SRS resource is the last symbol in the slot. Assumed that the PDCCH is transmitted in slot n, then for slot k, it is determined whether the time interval between the last symbol of slot k and the last symbol of the PDCCH satisfies the first minimum timing requirement; and if so, it further needs that the slot k satisfies that the uplink symbol and/or flexible symbol included in the slot k includes all symbols of all SRS resources included in the SRS resource set (which may be regarded as SRS resource set 1) through which the SRS is triggered. It is assumed that uplink symbols and/or flexible symbols included in slot k are the $10^{th}$ to $14^{th}$ symbols. The SRS resource set 1 includes two SRS resources, one of the two SRS resources is the SRS resource of the signal, and the other one of the two SRS resources occupies a symbol that is the $9^{th}$ symbol in the slot. Since the uplink symbols and/or flexible symbols included in the slot k cannot cover the symbols of all the SRS resources included in the SRS resource set 1, the slot k is not a first slot. For slot m, if the uplink symbols and/or flexible symbols included in slot m are the $9^{th}$ to $14^{th}$ symbols, the time interval between the last symbol of slot m (the symbol of the signal resource of the signal) and the PDCCH satisfies the first minimum timing requirement, and the slot m can cover symbols of all SRS resources included in the SRS resource set 1, then the slot m is a first slot.

The determining the first slot based on the minimum time interval requirement between the transmission of the triggering signaling and the signal includes the first slot satisfying a second time interval condition, and the second time interval condition includes the time intervals between a symbol of the channel carrying the triggering signaling and a symbol of all signal resources included in a first signal resource set satisfying the first minimum timing requirement; the determining the first slot based on the minimum time interval requirement between the transmission of the triggering signaling and the signal includes:

for a slot, determining whether the time interval between a symbol of the channel carrying the triggering signaling and a symbol of all signal resources in the first signal resource set satisfies the first minimum timing requirement. If there is a situation that does not satisfy the first minimum timing requirement, the slot is not the first slot; if the first minimum timing requirement is satisfied, then the slot is the first slot.

The determining the first slot based on the minimum time interval requirement between the transmission of the triggering signaling and the signal includes the first slot satisfying a second time interval condition, and the second time interval condition includes the time intervals between a symbol of the channel carrying the triggering signaling and a symbol of all signal resources included in a first signal resource set satisfying the first minimum timing requirement; the determining the first slot based on the minimum time interval requirement between the transmission of the triggering signaling and the signal includes:

for a slot, determining whether the time interval between a symbol of the channel carrying the triggering signaling and a symbol of all signal resources in the first signal resource set satisfies the first minimum timing requirement. If there is a situation that does not satisfy the first minimum timing requirement, the slot is not the first slot; if the first minimum timing requirement is satisfied, and the slot also needs to satisfy other conditions that need to be satisfied, then the slot is the first slot.

For example, it is assumed that the first slot needs to satisfy the following conditions: the uplink symbols and/or flexible symbols included in the first slot cover all signal resources included in the signal resource set through which the triggering signaling triggers the signal, and time intervals between symbols of the channel carrying the triggering signaling and all signal resources in the first signal resource set satisfy the first minimum timing requirement. It is then assumed that the triggering signaling is DCI, the channel carrying the DCI is PDCCH, the signal is an SRS, and the corresponding first signal resource set includes two SRS resources, and the symbols occupied by the two SRS resources are the last two symbols. Assumed that the PDCCH is transmitted in slot n, then for slot k, it is determined whether the time interval between the last two symbols of slot k and the last symbol of the PDCCH satisfies the first minimum timing requirement. If so, it is also required that the slot k satisfies that the uplink symbol and/or flexible symbol included in the slot k includes all symbols of the SRS resources included in the SRS resource set (which may be regarded as SRS resource set 1) through which the SRS is triggered. It is assumed that uplink symbols and/or flexible symbols included in slot k are the $10^{th}$ to $14^{th}$ symbols. Since the uplink symbols and/or flexible symbols included in the slot k can cover symbols of all SRS resources included in the first signal resource set, the slot k is a first slot. In this embodiment, it can be understood that the minimum time interval requirement can reduce the probability that the SRS cannot be transmitted, increase the flexibility of scheduling, and avoid waste of triggering signaling resources. In this embodiment, the determining the first slot based on the minimum time interval between the transmission of the triggering signaling and the signal can be achieved in at least the following ways:

If a slot satisfies the following requirements, the slot is the first slot: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;

If a slot satisfies the following conditions, the slot is the first slot: the time intervals between the symbol of the channel carrying the triggering signaling and the transmission symbol corresponding to all signal resources in the first signal resource set satisfy the first minimum timing requirement;

If a slot satisfies the following conditions, the slot is the first slot: the time interval between the last symbol of the channel carrying the triggering signaling and the first symbol among symbols of all signal resources included in the first signal resource set satisfies the first minimum timing requirement;

If a slot satisfies the following conditions, the time intervals between transmissions of the channel carrying the triggering signaling and transmissions of signals corresponding to all signal resource sets or all signal resources triggered by the triggering signaling satisfy the first minimum timing requirement;

If a slot satisfies the following conditions, the slot is the first slot: the time interval between the last symbol of the channel carrying the triggering signaling and the first symbols of the symbols of all signal resource sets or signal resources triggered by the triggering signaling satisfies the first minimum timing requirement.

Based on contents of any of the above embodiments, in this embodiment, the satisfying the first minimum timing requirement includes one of the following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

In this embodiment, for example, the first minimum timing requirement may be greater than the pre-agreed value between the base station and the UE;

In one embodiment, the first minimum timing requirements corresponding to different signal resources may be different; for example, the triggering signaling triggers N signal resources, respectively expressed as $S_1, \ldots, S_N$, and their corresponding minimum timing requirements are not less than $k_1, \ldots, k_N$, that is, the minimum timing requirement corresponding to the signal resource $S_m$ is not less than $k_m$, $m \in \{1, \ldots, N\}$, then the first minimum timing requirement corresponding to the signal resource $S_m$ is not less than $k_m$, $m \in \{1, \ldots, N\}$.

In one embodiment, the first minimum timing requirements corresponding to different signal resource sets are different; for example, triggering signaling triggers N signal resource sets, respectively expressed as $S_1, \ldots, S_N$, and their corresponding minimum timing requirements are not less than $k_1, \ldots, k_N$, that is, the minimum timing requirement corresponding to the signal resource set $S_m$ is not less than $k_m$, $m \in \{1, \ldots, N\}$. Then the first minimum timing requirement corresponding to the signal triggered by the signal configured in the signal resource set $S_m$ is not less than $k_m$, $m \in \{1, \ldots, N\}$. In one embodiment, the first minimum timing requirement is not less than the maximum value in the first time interval corresponding to all signal resources triggered by the triggering signaling.

For example, the triggering signaling triggers N signal resources, respectively expressed as $S_1, \ldots, S_N$, and their corresponding first time intervals are: $k_1, \ldots, k_N$, that is, the minimum time interval corresponding to $S_m$ is $k_m$, $m \in \{1, \ldots, N\}$. Then the first minimum timing requirement is not less than $\max\{k_1, \ldots, k_N\}$, that is, not less than the maximum value among $k_1, \ldots, k_N$. In one embodiment, the first time interval corresponding to a signal resource is the minimum time interval between the last symbol of the PDCCH carrying the triggering signaling that triggers the signal resource and the first symbol of the signal resource; a first time interval corresponding to the signal resource is pre-agreed by the base station and the terminal. In one embodiment, the first minimum timing requirement is not less than the maximum value in the first time interval corresponding to all signal resource sets triggered by the triggering signaling. For example, the triggering signaling triggers N signal resource sets, expressed as $S_1, \ldots, S_N$, and their corresponding minimum time intervals are $k_1, \ldots, k_N$, that is, the first time interval corresponding to $S_m$ is $k_m$, $m \in \{1, \ldots, N\}$. Then the first minimum timing requirement is not less than $\max\{k_1, \ldots, k_N\}$, that is, not less than the maximum value among $k_1, \ldots, k_N$. In one embodiment, the first time interval corresponding to a signal resource set is the minimum time interval between the last symbol of the channel carrying the triggering signaling that triggers the signal resource set and the first symbol of all signal resource symbols in the signal resource set. In one embodiment, the first time interval corresponding to a signal resource set is pre-agreed between the base station and the terminal. In one embodiment, the first minimum timing requirement is the maximum value in the first time interval corresponding to the usage type of all the first signal resource sets triggered by the triggering signaling. For example, the triggering signaling triggers N signal resource sets, respectively expressed as $S_1, \ldots, S_N$, there are U kinds of usage types corresponding to these signal resource sets, and the first time intervals corresponding to these U usage types are respectively $k_1, \ldots, k_U$, then the first minimum timing requirement is not less than $\max\{k_1, \ldots, k_U\}$, that is, not less than the maximum value among $k_1, \ldots, k_U$. In one embodiment, the first time interval corresponding to a type of signal resource set is pre-agreed between the base station and the terminal.

Based on contents of any of the above embodiments, in this embodiment, the determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal a second preset value specified in the time window requirement between the transmission of the triggering signaling and the signal. For example, the first slot satisfies that the time interval between the last symbol of the channel carrying the triggering signaling and the last symbol of the signal resource of the signal is less than or equal to a second preset value specified in the time window requirement between the transmission of the triggering signaling and the signal;

the first slot satisfies that the time interval between the symbol of the channel carrying the triggering signaling and the symbol of the first signal resource is less than or equal to a third preset value specified in the time window requirement between the transmission of the triggering signaling and the signal; for example, the first slot satisfies that the time interval between the last symbol of the channel carrying the triggering signaling and the last symbol of the first signal resource is less than or equal to a third preset value specified in the transmission time window requirement between the transmission of the triggering signaling and the signal;

where the first signal resource set is a signal resource set through which the triggering signaling triggers the signal.

In this embodiment, it should be noted that the time window requirement may avoid signal transmission timeout and waste of resources.

The time window requirement may be agreed in a protocol, may also be indicated by the network device to the terminal device, or may be reported by the terminal device to the network device through signaling.

Specifically, the Time Window Requirement can be:

the time interval between the last symbol of the PDCCH carrying the triggering signaling and the last symbol of the first signal resource is not greater than a given value; or the time interval between the slot and the slot at which the triggering signaling is located is not greater than the given value. In one embodiment, the given value is a fixed value, for example, which may be agreed in a protocol or indicated by a base station. The given value may be a slot value, or a symbol value, etc. In one embodiment, the given value is a function of a slot offset/symbol offset value configured by the base station for the first signal resource set through signaling. The signaling may be RRC signaling, MAC-CE, triggering signaling or a slot offset/symbol offset value obtained based on their combination. In one embodiment, the given value is determined based on the uplink-downlink ratio configuration of the UE (for example, determined based on dl-UL-TransmissionPeriodicity in RRC signaling TDD-UL-DL-Pattern). In one embodiment, when the UE is configured with multiple TDD-UL-DL-Patterns on a carrier, it is determined based on the maximum value of dl-UL-TransmissionPeriodicity in multiple TDD-UL-DL-Patterns.

Based on contents of any of the above embodiments, in this embodiment, the first preset value, the second preset value or the third preset value may be determined based on at least one of the followings:

a value specified in the protocol;

a value indicated by a network device;

a slot offset configured by signaling for the signal resource set through which the triggering signaling triggers the signal; for example, the first preset value, the second preset value, or the third preset value is determined through the slot offset of all signal resources triggered for the triggering signaling;

uplink-downlink pattern configuration;

a value determined by the usage type of the signal resource set through which the triggering signaling triggers the signal; for example, the first preset value, the second preset value, or the third preset value is determined through the usage type of all signal resources triggered by the triggering signaling;

the numerology of the bandwidth part (BWP) at which the triggering signaling is located;

a value determined by the numerology of the bandwidth part (BWP) at which the signal resource set, through which the triggering signaling triggers the signal, is transmitted.

Based on contents of any of the above embodiments, in this embodiment, the first slot may be determined based on the priority of the signal includes at least one of the following ①-③:

① The priority of the signal at least partially overlapping with the time-domain symbol of the signal in the first slot is equal to or less than that of the signal (that is, there is no signal with a higher priority than the signal in the first slot overlapping with the time-domain symbol of the signal). In one embodiment, the overlapping includes partial overlapping and/or full overlapping. In one embodiment, if the time-domain symbols of the signal in a slot include a symbol on which a signal with a higher priority than that of the signal is located, the slot is not a first slot; where the signal that at least partially overlaps with the time-domain symbols of the signal is a signal different from the signal.

② A signal in the first slot that at least partially overlaps with a time-domain symbol of a signal corresponding to the first signal resource set has a priority being equal to or lower than that of a signal corresponding to the first signal resource set (that is, there is no signal with a higher priority than the signal corresponding to the first signal resource set in the first slot overlapping with the time-domain symbol of the signal resource included in the first signal resource set), where the first signal resource set is a signal resource set through which the triggering signaling triggers the signal, where the signal that at least partially overlaps with the time-domain symbols of the signal corresponding to the first signal resource set is a signal different from the signal corresponding to the first signal resource set.

③ The signal in the first slot has a priority being equal to or lower than that of the signal (that is, there is no signal with a higher priority than the signal in the first slot); where this signal whose priority is equal to or less than that of the signal is a signal different from the signal.

Based on contents of any of the above embodiments, in this embodiment, the priority of the signal may be determined through at least one of the following ①-⑤.

① determining the priority of the signal based on the usage type of the signal resource set triggered by the triggering signaling; for example, the triggering signaling is DCI, and the signal is SRS, for example, the priority of the signal of the SRS resource set whose usage type is the codebook is higher than that the SRS resource set whose usage type is beamManagement;

② determining the priority of the signal based on the slot offset configured by radio resource control (RRC) signaling for the signal resource set triggered by the triggering signaling; for example, the triggering signaling is DCI, and the signal is SRS, for example, the signal resource set with a smaller slot offset configured by RRC signaling has a higher priority. For another example, the signal resource set with a larger slot offset configured by RRC signaling has a higher priority;

③ determining the priority of the signal based on the priority indication signaling of a network device;

④ determining the priority of the signal based on the number of symbols of the signal resource triggered by the triggering signaling; the signal resource set with a small number of symbols has a higher priority. In one embodiment, a signal resource set with a larger number of symbols has a higher priority;

⑤ determining the priority of the signal based on the number of symbols of the signal resource set triggered by the triggering signaling.

Based on contents of any of the above embodiments, in this embodiment, the signal resource is a signal resource in the carrier or cell in which the signal is located; and/or the signal resource set is a signal resource set in the carrier or cell in which the signal is located.

In one embodiment, the method of this embodiment is applicable to signal resources and/or signal resource sets in the same carrier or cell; as such, if the two SRS resource sets are signals of two cells, a partial of the method of this embodiment is not applicable.

Based on contents of any of the above embodiments, in this embodiment, the reference slot includes at least one of the following ① to ④:

① a slot at which the triggering signaling is located;

② a slot determined based on the slot at which the triggering signaling is located and a slot offset configured by the network device for the signal resource set triggered by the triggering signaling through radio resource control (RRC) signaling; a slot determined based on the slot at which the triggering signaling is located and a slot offset configured by the network device for the signal resource set through which the triggering signaling triggers the signal through radio resource control (RRC) signaling;

③ a slot determined based on the slot offset indicated by medium access control-control element (MAC-CE); the reference slot is a slot after the slot at which the trigger signaling is located being offset by the slot offset of slots, where the slot offset is configured by MAC-CE for the signal resource set through which the trigger signaling triggers the signal. In one embodiment, the reference slot is a slot after the slot at which the trigger signaling is located being offset by the slot offset of first slot, where the slot offset is configured by MAC-CE for the signal resource set through which the trigger signaling triggers the signal.

④ a slot determined based on the slot offset indicated by the triggering signaling; it may also be the slot offset indicated by other dynamic signaling (DCI, dynamic signaling other than the triggering signaling that transmits the signal).

In this embodiment, it should be noted that the reference slot may be a slot determined based on the slot offset indicated by a network device through the MAC-CE. The advantage of this manner is that the base station can more flexibly indicate the reference slot, to make the determination of the transmission slot of the signal much flexible, and the triggering of the signal much flexible. In addition, the reference slot can also be a slot determined based on the slot offset indicated by a network device through the triggering signaling. This triggering signaling can be the triggering signaling or other triggering signaling. The advantage of the manner is that the base station can indicate the reference slot much flexibly, and the determination of the signal transmission slot is much flexible, and the triggering of the signal is much flexible.

Based on contents of any of the above embodiments, in this embodiment, the way of determining t or t+1 includes at least one of the following ①-③:

① determining the t or t+1 based on a dedicated information field in the triggering signaling. For example, the triggering signaling is DCI, and the DCI includes a dedicated information field (such as a slot offset field), and this information field is used to indicate the t or t+1. For another example, the triggering signaling is DCI, and the DCI includes a dedicated information field (such as a slot offset field), and this information field is associated with an information field (such as an SRS request field) used to trigger the signal in the DCI, the terminal determines the t or t+1 based on the association relationship and the value of the dedicated information field;

② determining the t or t+1 based on the information field of triggering an aperiodic signal in the triggering signaling. For example, when the signal is an SRS signal, t or t+1 is determined based on the value of the SRS request information field in the DCI that triggers the signal. For another example, when the signal is a CSI-RS signal, t is determined based on the value of the CSI request information field in the DCI that triggers the signal;

③ determining the t or t+1 based on a triggering state of the aperiodic signal indicated by the triggering signaling. For example, when the signal is an SRS signal, t or t+1 is determined based on a triggering state corresponding to the value of the SRS request information field in the DCI that triggers the signal. For another example, when the signal is a CSI-RS signal, t or t+1 is determined based on a triggering state corresponding to the value of the CSI request information field in the DCI that triggers the signal.

Based on contents of any of the above embodiments, in this embodiment, the method further includes: determining the t or t+1 based on indication information included in the triggering signaling, where the indication information is used to select one or more values from a group of candidate values indicated by MAC-CE and/or RRC signaling.

Based on contents of any of the above embodiments, in this embodiment, the method includes: determining the t or t+1 based on the information field of triggering an aperiodic signal in the triggering signaling, which includes:

determining the t based on the value of the information field that triggers the signal in the triggering signaling and an association relationship between t indicated by the MAC-CE and/or RRC signaling and the value of the information field that triggers the signal in the triggering signaling; or determining the t+1 based on an the value of the information field that triggers the signal in the triggering signaling and association relationship between t+1 indicated by the MAC-CE and/or RRC signaling and the value of the information field that triggers the signal in the triggering signaling; or determining the t based on an association relationship between t indicated by the MAC-CE and/or RRC signaling and the triggering state indicated by the information field that triggers the signal in the triggering signaling and the triggering state; or determining the t+1 based on an association relationship between t+1 indicated by the MAC-CE and/or RRC signaling and the triggering state indicated by the information field that triggers the signal in the triggering signaling and the triggering state.

Based on Contents of any of the Above Embodiments, in this Embodiment, the Signal Transmission Method Further Includes:

determining the t based on an association relationship between a type of the signal resource set triggered by the triggering signaling and t, or determining the t+1 based on an association relationship between a type of the signal resource set triggered by the triggering signaling and t+1; and/or determining the t or t+1 based on a slot offset selected by the triggering signaling from multiple slot offset indicated by the MAC-CE and/or RRC signaling and another slot offset indicated by the triggering signaling.

In one embodiment, the terminal device determines t or t+1 based on the RRC signaling transmitted by the network device and the triggering signaling. That is, the RRC signaling indicates a slot offset for the signal resource set corresponding to the signal, and the triggering signaling indicates another slot offset for the signal resource set corresponding to the signal, and the terminal device determines t or t+1 based on the above two slot offset. For example, the RRC signaling indicates a slot offset of $t_1$ for the signal resource set corresponding to the signal, and the triggering signaling indicates a slot offset of $t_2$ for the signal resource set corresponding to the signal, then the terminal determines that t corresponding to the signal is $t=t_1+t_2$.

In one embodiment, the terminal device determines t or t+1 based on the RRC signaling transmitted by the network device and the triggering signaling. That is, the RRC signaling indicates multiple slot offset for the signal resource set corresponding to the signal. The triggering signaling selects a slot offset from multiple slot offset indicated by RRC signaling for the signal resource set corresponding to the signal and indicates another slot offset. Then the terminal device determines t or t+1 based on the slot offset selected by the triggering signaling and another slot offset indicated by the triggering signaling. For example, the triggering signaling selects a slot offset of $t_1$ from the slot offset indicated by the RRC signaling for the signal resource set corresponding to the signal. The triggering signaling indicates another slot offset of $t_2$ for the signal resource set corresponding to the signal, and the terminal determines that t corresponding to the signal is $t=t_1+t_2$.

In one embodiment, the terminal device determines t or t+1 based on the MAC-CE transmitted by the network device and the triggering signaling. That is, the MAC-CE indicates a slot offset for the signal resource set corresponding to the signal, and the triggering signaling indicates another slot offset for the signal resource set corresponding to the signal, and the terminal device determines t or t+1 based on the above two slot offset. For example, the slot offset indicated by the MAC-CE for the signal resource set corresponding to the signal is $t_1$, and the slot offset indicated by the triggering signaling for the signal resource set corresponding to the signal is $t_2$, then the terminal determines that t corresponding to the signal is $t=t_1+t_2$.

In one embodiment, the terminal device determines t or t+1 based on the MAC-CE transmitted by the network device and the triggering signaling. That is, the MAC-CE indicates multiple slot offset for the signal resource set corresponding to the signal, and the triggering signaling selects a slot offset from the multiple slot offset indicated by the MAC-CE for the signal resource set corresponding to the signal and indicates another slot offset, and then the terminal device determines t or t+1 based on the slot offset selected by the triggering signaling and another slot offset indicated by the triggering signaling. For example, the triggering signaling selects a slot offset of $t_1$ from the slot offset indicated by the RRC signaling for the signal resource set corresponding to the signal, and the triggering signaling indicates another slot offset of $t_2$ for the signal resource set corresponding to the signal, and then the terminal determines that t corresponding to the signal is $t=t_1+t_2$.

In this Embodiment, Another Slot Offset Indicated by the Triggering Signaling May be Determined in at Least One of the Following Ways:

determining based on a dedicated information field in the triggering signaling;

determining based on the information field of the trigger aperiodic signal in the triggering signaling;

determining based on the triggering state of the aperiodic signal indicated by the triggering signaling.

In this embodiment, another slot offset indicated by the triggering signaling may be a value that is same for all signal resource sets triggered by the triggering signaling.

It can be seen that the above-mentioned embodiment provides a variety of different ways of determining the t or t+1, which are now summarized as follows:

In this embodiment, it should be noted that determining the t or t+1 based on a dedicated information field in the triggering signaling may include: adding a new information field to the triggering signaling for indicating the t or t+1. In one embodiment, the adding a new information field to the triggering signaling for indicating the t or t+1 has one or more of the following situations:

the number of bits in the information field is fixed;

the bit width of the information field is configured by the network device through the signaling;

when a triggering state corresponding to a triggering signaling is not to trigger an aperiodic signal (for example, the state of the SRS request field in DCI is "00"), the terminal device does not consider (that is, ignore) the content indicated by the new information field;

when the terminal device determines t or t+1 based on the MAC-CE transmitted by the network device and the triggering signaling, the MAC-CE indicates a set of candidate values for t or t+1, and the new information field is used to select t from the set of candidate values;

when the terminal device determines t or t+1 based on the RRC signaling and triggering signaling transmitted by the network device, the RRC signaling indicates a set of candidate values for t or t+1, and the new information field is used to select t from the set of candidate values.

In this embodiment, it should be noted that when t or t+1 is indicated through the information field of triggering an aperiodic signal in the triggering signaling, one or more of the following situations exist:

different values of the information field correspond to the same or different t or t+1;

the bit width of the information field that triggers the aperiodic signal in the triggering signaling is increased, for example, up to 3/4/5/6/7 bits.

when the terminal device determines t or t+1 based on the MAC-CE transmitted by the base station and the triggering signaling, the MAC-CE indicates an association relationship between t or t+1 and the value of the information field that triggers the aperiodic signal in the triggering signaling, the terminal device determines t or t+1 based on the association relationship and the value of the information field that triggers the aperiodic signal;

when the terminal device determines t or t+1 based on the RRC signaling and triggering signaling transmitted by the base station, the RRC signaling indicates an association relationship between t or t+1 and the value of the information field that triggers the aperiodic signal in the triggering signaling, the terminal device determines t or t+1 based on the association relationship and the value of the information field that triggers the aperiodic signal;

the t or t+1 is indicated by using the parameter information of the channel carrying the triggering signaling;

the association relationship between channel parameter information and t or t+1 is indicated through RRC signaling or MAC-CE.

In this embodiment, it should be noted that when indicating the t or t+1 through a triggering state of the aperiodic signal indicated by the triggering signaling, one or more of the following situations exist:

when the terminal device determines t or t+1 based on the MAC-CE transmitted by the base station and the triggering signaling, the MAC-CE indicates an association relationship between t or t+1 and the triggering state, and the terminal device determines t or t+1 based on the association relationship and the corresponding triggering state when the first signal is triggered;

when the terminal device determines t or t+1 based on the RRC signaling and triggering signaling transmitted by the base station, the RRC signaling indicates an association relationship between t or t+1 and the triggering state, and the terminal device determines t or t+1 based on the association relationship and the corresponding triggering state when the first signal is triggered.

In this embodiment, the determining t or t+1 based on the configuration parameters of the first signal resource set includes any one of the following: the base station indicates an association relationship between the type of the signal resource set and the t or t+1 through RRC signaling or MAC-CE;

t corresponding to different usage types of signal resource sets is indicated in the triggering signaling.

In this embodiment, the triggering signaling directly indicates t or t+1 corresponding to different usage types of SRS resource sets. The following table 1 is an example: the SRS delay offset field in the triggering signaling is used to indicate the t corresponding to the different usage types of SRS resource sets.

TABLE 1

| SRS delay offset field | Delayed slots of SRS(1$^{st}$ usage, 2$^{nd}$ usage, 3$^{rd}$ usage, 4$^{th}$ usage) |
|---|---|
| 00 | 0, 0, 0, 0 |
| 01 | 0, 0, 1, 1 |
| 10 | 1, 1, 0, 0 |
| 11 | 1, 1, 1, 1 |

where the value "00" of the SRS delay offset field in the specific domain indicates that t corresponding to the SRS resource set whose usage type is 1$^{st}$ usage is 0, t corresponding to the SRS resource set whose usage type is 2$^{nd}$ usage is 0, and t corresponding to the SRS resource set whose usage type is 3$^{rd}$ usage is 0, and t corresponding to the SRS resource set whose usage type is 4$^{th}$ usage is 0;

"01" indicates that t corresponding to the SRS resource set whose usage type is 1$^{st}$ usage is 0, t corresponding to the SRS resource set whose usage type is 2$^{nd}$ usage is 0, t corresponding to the SRS resource set whose usage type is 3$^{rd}$ usage is 1, and t corresponding to the SRS resource set whose usage type is 4$^{th}$ usage is 1;

"10" indicates that t corresponding to the SRS resource set whose usage type is 1$^{st}$ usage is 1, t corresponding to the SRS resource set whose usage type is 2$^{nd}$ usage is 1, t corresponding to the SRS resource set whose usage type is 3$^{rd}$ usage is 0, and t corresponding to the SRS resource set whose usage type is 4$^{th}$ usage is 0;

"11" indicates that t corresponding to the SRS resource set whose usage type is 1$^{st}$ usage is 1, t corresponding to the SRS resource set whose usage type is 2$^{nd}$ usage is 1, and t corresponding to the SRS resource set whose usage type is 3$^{rd}$ usage is 1, and t corresponding to the SRS resource set whose usage type is 4$^{th}$ usage is 1.

In this embodiment, it should be noted that the above-mentioned association relationship is independently configured for each signal resource, or is independently configured for each signal resource set, or is a configuration mode that is independent of signal resources and signal resource sets.

Based on contents of any of the above embodiments, in this embodiment, the t or t+1 is indicated through at least one of the following ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

In one embodiment, the triggering signaling is DCI, and the triggering signaling indicates t or t+1, and the t or t+1 is applicable to all signal resource sets triggered by the triggering signaling. For example, when SRS is triggered through DCI, there is also a slot offset information field in the DCI, which indicates a slot offset, and this slot offset is used in all SRS resource sets triggered by the DCI to determine t or t+1 corresponding to themselves (t or t+1 corresponding to the SRS resource is t or t+1 corresponding to the SRS resource set in which it is located). For another example, when SRS is triggered through DCI, the SRS request information field used to trigger SRS in the DCI also indicates a slot offset, and all SRS resource sets triggered by the DCI use this slot offset to determine t or t+1 corresponding to themselves. In one embodiment, the network device triggers a signal (for example, SRS) through a DCI, and transmits another DCI to indicate t or t+1 corresponding to the signal (or signal resource set) triggered by the DCI of the triggering signaling.

In this embodiment, it should be noted that, the network device independently indicates t for each signal resource, and the UE independently determines the t or t+1 for each signal resource; that is, t corresponding to different signal resources or t+1 may be same or different. In one embodiment, t or t+1 of different signal resources are indicated independently; t or t+1 of different signal resources are jointly indicated. For example, the network device indicates a combination of t or t+1 of multiple signal resources. In one embodiment, the network device independently indicates t or t+1 for each signal resource set, and the UE independently determines the t or t+1 for each signal resource set; that is, t corresponding to different signal resource sets may be same or different, t or t+1 corresponding to all signal resources in the same signal resource set are same. In one embodiment, t or t+1 of different signal resource sets are independently indicated; t or t+1 of different signal resource sets are jointly indicated. For example, the network device indicates a combination of t or t+1 of multiple signal resource sets. In one embodiment, the t or t+1 indicated by the network device is not directly related to the signal resource or the signal resource set, and the t or t+1 corresponding to all the signal resource sets/signal resources triggered by the same triggering signaling are same. In one embodiment, the triggering signaling indicates t or t+1 corresponding to the signal when triggering the signal, and the t or t+1 indicated by the triggering signaling is applicable to all signal resources sets triggered by the triggering signaling. For example, the signal is SRS, and the triggering signaling is DCI. When the DCI triggers the SRS, it indicates the t or t+1 corresponding to the SRS, and the t or t+1 corresponding to all the SRS resource sets triggered by the DCI are same.

It can be understood that, as mentioned in the previous embodiments, when the first slot is determined based on at least one of the priority of the signal, uplink-downlink pattern configuration, the minimum time interval between the transmission of the triggering signaling and the signal, or the time window requirement between transmission of the triggering signaling and the signal, it may make determination based on one or more of the following items: ① uplink-downlink pattern configuration; ② time interval between the transmission of triggering signaling and the transmission of the signal; ③ time window requirement between the transmission of the triggering signaling and the signal; ④ priority of the signal. It can be understood that each item ①-④ has multiple implementations in subsequent embodiments, and the implementations under each item ①-④ can be freely combined and used. Some examples will be given below to illustrate individual or combination of the above items:

For Example, the First Slot May be any of the Following:

- If a slot includes at least one uplink or flexible symbol configured by high-layer signaling, the slot is the first slot;
- If the uplink and/or flexible symbols included in a slot include all time-domain symbols configured by the first signal resource in a slot, the slot is the first slot;
- If the uplink and/or flexible symbols included in a slot include time-domain symbols configured for all signal resources in the first signal resource set, the slot is the first slot;
- If the uplink and/or flexible symbols included in a slot include time-domain symbols configured for all signal resources in all resource sets triggered by the triggering signaling, the slot is the first slot;
- If a slot satisfies the first timing requirement, the slot is the first slot; the first timing requirement is: the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;
- If a slot satisfies the following conditions, the slot is the first slot: the time intervals between the symbol of the channel carrying the triggering signaling and the transmission symbol corresponding to all signal resources in the first signal resource set satisfy the first minimum timing requirement;
- If a slot satisfies the following conditions, the slot is the first slot: the time interval between the last symbol of the channel carrying the triggering signaling and the first symbol among symbols of all signal resources included in the first signal resource set satisfies the first minimum timing requirement;
- If a slot satisfies the following conditions, the time intervals between transmissions of the channel carrying the triggering signaling and transmissions of signals corresponding to all signal resource sets or all signal resources triggered by the triggering signaling satisfies the first minimum timing requirement;
- If a slot satisfies the following conditions, the slot is the first slot: the time interval between the last symbol of the channel carrying the triggering signaling and the first symbols among the symbols of all signal resource sets or signal resources triggered by the triggering signaling satisfies the first minimum timing requirement;
- If a slot includes at least one uplink or flexible symbol configured by high-layer signaling and satisfies the first timing requirement, the slot is the first slot; the first timing requirement is: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;
- If a slot includes at least one uplink or flexible symbol configured by high-layer signaling and satisfies the following conditions, the slot is the first slot: the time interval between the symbol of the channel carrying the triggering signaling and the symbol of the signal corresponding to all the signal resources of the first signal resource set satisfies the first minimum timing requirement;
- If a slot includes at least one uplink or flexible symbol configured by high-layer signaling and satisfies the following conditions, the slot is the first slot: the time interval between the last symbol of the channel carrying the triggering signaling and the first symbols among the symbols of the first signal resource of all signal resources included in the set satisfies the first minimum timing requirement;

If a slot includes at least one uplink or flexible symbol configured by high-layer signaling and satisfies the following conditions, the slot is the first slot: the time interval between the transmission of the channel carrying the triggering signaling and the transmission of the signal corresponding to all signal resource sets or all signal resources triggered by the triggering signaling satisfies the first minimum timing requirement;

If a slot includes at least one uplink or flexible symbol configured by high-layer signaling and satisfies the following conditions, the slot is the first slot: the time interval between the last symbol of the channel carrying the triggering signaling and the first symbol among the symbols of all signal resource sets or signal resources triggered by the triggering signaling satisfies the first minimum timing requirement;

If the uplink and/or flexible symbols included in a slot include all time-domain symbols configured by the first signal resource in a slot and satisfy the first timing requirement, the slot is the first slot; the first timing requirement is: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;

If the uplink and/or flexible symbols included in a slot include all the time-domain symbols configured in the first signal resource in a slot, and the following conditions are satisfied, the slot is the first slot: the time interval between the symbol of the channel carrying the triggering signaling and the symbol of the signal corresponding to all signal resources included in the first signal resource set satisfies the first minimum timing requirement;

If the uplink and/or flexible symbols included in a slot include all the time-domain symbols configured in the first signal resource in a slot, and the following conditions are satisfied, the slot is the first slot: the time interval between the last symbol of the channel carrying the triggering signaling and the first symbol among symbols of all signal resources included in the first signal resource set satisfies the first minimum timing requirement;

If the uplink and/or flexible symbols included in a slot include all the time-domain symbols configured in the first signal resource in a slot, and the following conditions are satisfied, the slot is the first slot: the time interval between the transmission of the channel carrying the triggering signaling and the transmission of the signal corresponding to all signal resource sets or all signal resources triggered by the triggering signaling satisfies the first minimum timing requirement;

If the uplink and/or flexible symbols included in a slot include all the time-domain symbols configured in the first signal resource in a slot, and the following conditions are satisfied, the slot is the first slot: the time interval between the last symbol of the channel carrying the triggering signaling and the first symbol among symbols of all signal resource sets or signal resources triggered by the triggering signaling satisfies the first minimum timing requirement;

If the uplink and/or flexible symbols included in a slot include time-domain symbols configured for all signal resources in the first signal resource set and satisfy the first timing requirement, the slot is the first slot; the first timing requirement is: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;

the time interval between the symbol of the channel carrying the triggering signaling and the symbol of the first signal resource refers to the time interval between the last symbol of the channel carrying the triggering signaling and the first symbol of the signal;

If the uplink and/or flexible symbols included in a slot include time-domain symbols configured for all signal resources in the first signal resource set, and the following conditions are satisfied, the slot is the first slot: the time interval between the symbol of the channel carrying the triggering signaling and the symbol of the signal corresponding to all signal resources included in the first signal resource set satisfies the first minimum timing requirement;

If the uplink and/or flexible symbols included in a slot include time-domain symbols configured for all signal resources in the first signal resource set, and the following conditions are satisfied, the slot is the first slot: the time interval between the last symbol of the channel carrying the triggering signaling and the first symbol among symbols of all signal resources included in the first signal resource set satisfies the first minimum timing requirement;

If the uplink and/or flexible symbols included in a slot include time-domain symbols configured for all signal resources in the first signal resource set, and the following conditions are satisfied, the slot is the first slot: the time interval between the transmission of the channel carrying the trigger the signaling and the transmission of the signal corresponding to all signal resource sets/all signal resources triggered by the triggering signaling satisfies the first minimum timing requirement;

If the uplink and/or flexible symbols included in a slot include time-domain symbols configured for all signal resources in the first signal resource set, and the following conditions are satisfied, then the slot is the first slot: the time interval between the last symbol of the channel carrying the triggering signaling and the first symbol among symbols of all signal resource sets or signal resources triggered by the triggering signaling satisfies the first minimum timing requirement;

If the uplink and/or flexible symbols included in a slot include time-domain symbols configured for all signal resources in all resource sets triggered by the triggering signaling and satisfy the first timing requirement, then the slot is the first slot; the first timing requirement is: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;

- If the uplink and/or flexible symbols included in a slot include time-domain symbols configured for all signal resources in all resource sets triggered by the triggering signaling, and the following conditions are satisfied, then the slot is the first slot: the time interval between the symbol of the channel carrying the triggering signaling and the symbol of the signal corresponding to all the signal resources in the first signal resource set satisfies the first minimum timing requirement;
- If the uplink and/or flexible symbols included in a slot include time-domain symbols configured for all signal resources in all resource sets triggered by the triggering signaling, and the following conditions are satisfied, then the slot is the first slot: the time interval between the last symbol of the channel carrying the triggering signaling and the first symbol among symbols of all signal resources included in the first signal resource set satisfies the first minimum timing requirement;
- If the uplink and/or flexible symbols included in a slot include time-domain symbols configured for all signal resources in all resource sets triggered by the triggering signaling, and the following conditions are satisfied, then the slot is the first slot: the time interval between the symbol of the channel carrying the triggering signaling and the symbol of the signal corresponding to all signal resources in the first signal resource set satisfies the first minimum timing requirement;
- If the uplink and/or flexible symbols included in a slot include time-domain symbols configured for all signal resources in all resource sets triggered by the triggering signaling, and the following conditions are satisfied, then the slot is the first slot: the time interval between the last symbol of the channel carrying the triggering signaling and the first symbol among symbols of all signal resource sets or signal resources triggered by the triggering signaling satisfies the first minimum timing requirement.

The schemes described in the above-mentioned embodiments are explained and described below through several specific examples. In the following example, the triggering signaling is DCI and the signal is SRS for schematic illustration, but it is not limited to the case where the trigger command is DCI and the signal is SRS.

Example 1

The network device triggers the terminal to transmit SRS to the terminal through DCI (triggering signaling);

The terminal receives the DCI, and determines the transmission location of the signal in the following manner:

The terminal determines the slot at which the DCI is located (reference slot, assumed to be slot n), determines the t or t+1 based on the DCI, and the transmission location of the signal is the $(t+1)^{th}$ slot counting from slot n.

In one embodiment, the included uplink symbols and/or downlink symbols cover slots of symbols of all SRS resources included in all SRS resource sets triggered by the DCI.

Where the determining the t or t+1 based on the DCI includes: based on the indication information of the DCI, selecting a value from the multiple slot offset configured for the SRS resource set corresponding to the SRS by RRC signaling or MAC-CE and using that value as the t or t+1.

Example 2

The network device triggers the terminal to transmit SRS to the terminal through DCI (triggering signaling);

The terminal receives the DCI, and determines the transmission location of the signal in the following manner:

The terminal determines the slot at which the DCI is located (reference slot, assumed to be slot n), determines the t or t+1 based on the DCI, and the transmission location of the signal is the $(t+1)^{th}$ slot counting from slot n.

In one embodiment, the first slot is a slot in which uplink symbols and/or downlink symbols cover symbols of all SRS resources included in all SRS resource sets triggered by the DCI.

Where the determining the t or t+1 based on the DCI includes: the value of t or t+1 is the slot offset indicated by the DCI applicable to all SRS resource sets triggered by the DCI plus the slot offset configured for the SRS resource set corresponding to the SRS by RRC signaling or MAC-CE.

Example 3

The terminal receives configuration information about the SRS signal resource set from the network device, where the configuration information includes the configuration of the slot offset;

The network device triggers the terminal to transmit SRS to the terminal through DCI (triggering signaling);

The terminal receives the DCI, and determines the transmission location of the signal in the following manner:

The terminal determines the slot at which the DCI is located, and the slot at which the DCI is located is added by the slot offset configured by the network device in the configuration information about the SRS resource set corresponding to the SRS (the SRS resource set through which the DCI triggers the SRS) to obtain a reference slot, where the $(t+1)^{th}$ first slot counting from the slot (reference slot) is the transmission location of the signal, and the t or t+1 is determined based on the DCI.

In one embodiment, the first slot is a slot in which uplink symbols and/or downlink symbols cover symbols of all SRS resources included in all SRS resource sets triggered by the DCI.

In one embodiment, the first slot is a slot in which the included uplink symbols and/or downlink symbols cover symbols of all SRS resources included in the SRS resource set through which the DCI triggers the SRS resources.

Where the determining the t or t+1 based on the DCI includes: determining the t or t+1 based on a value of an information field in the DCI. In one embodiment, the information field is a different field from the SRS request field that triggers the SRS signal. In one embodiment, the information field is same field as the SRS request field that triggers the SRS signal.

Example 4

The terminal receives configuration information about the SRS signal resource set from the network device, where the configuration information includes the configuration of the slot offset;

The network device triggers the terminal to transmit SRS to the terminal through DCI (triggering signaling);

The terminal receives the DCI, and determines the transmission location of the signal in the following manner:

The terminal determines the slot at which the DCI is located, and the slot at which the DCI is located is added by the slot offset configured by the network device in the configuration information about the SRS resource set corresponding to the SRS (the SRS resource set through which the DCI triggers the SRS) to obtain a reference slot, where the $(t+1)^{th}$ slot counting from the slot (reference slot) is the transmission location of the signal, and the t or t+1 is determined based on the DCI.

Where the determining the t or t+1 based on the DCI includes: determining the t or t+1 based on a value of an information field in the DCI. In one embodiment, the information field is a different field from the SRS request field that triggers the SRS signal. In one embodiment, the information field is same field as the SRS request field that triggers the SRS signal.

Example 5

The terminal receives configuration information about the SRS signal resource set from the network device, where the configuration information includes the configuration of the slot offset;

The network device triggers the terminal to transmit SRS to the terminal through DCI (triggering signaling);

The terminal receives the DCI, and determines the transmission location of the signal in the following manner:

The terminal determines the slot at which the DCI is located, and the slot at which the DCI is located is added by a slot offset selected by the DCI from slot offset configured by the network device in the configuration information about the SRS resource set corresponding to the SRS (the SRS resource set through which the DCI triggers the SRS) to obtain a reference slot, where the $(t+1)^{th}$ slot counting from the slot (reference slot) is the transmission location of the signal, and the t or t+1 is determined based on the DCI.

Where the determining the t or t+1 based on the DCI includes: determining the t or t+1 based on a value of an information field in the DCI. In one embodiment, the information field is a different field from the SRS request field that triggers the SRS signal. In one embodiment, the information field is same field as the SRS request field that triggers the SRS signal.

Example 6

The terminal receives the slot offset configured by the network device for the signal resource set of the signal through RRC signaling and/or MAC-CE, and may set the slot offset as the first slot offset. In one embodiment, when there are multiple signal resource sets in the system, the network device may independently configure the slot offset for each signal resource set. Taking the triggering signaling that triggers the signal as DCI as an example, it is assumed that the triggering signaling triggers two SRS resource sets at the same time, and the two SRS resource sets are set 1 and set 2 respectively. The slot offset configured by the network device for set 1 is s1, and the slot offset configured for set 2 is s2.

The terminal receives the triggering signaling that triggers the signal transmitted by the network device. The triggering signaling indicates their corresponding slot offset for the signal resources set triggered by the triggering signaling. The slot offset indicated by the triggering signaling for the signal resource set may be expressed as a second slot offset. In one embodiment, the triggering signaling indicates the same slot offset for all signal resource sets triggered by the triggering signaling. For example, the information field used to indicate the second slot offset in the triggering signaling is indicated by 2 bits, which includes 4 states, and the second slot offset corresponding to these 4 states are 0, 1, 2, 3, as shown in Table 2 below:

TABLE 2

| a state of the information field used to indicate the second slot offset | the second slot offset |
|---|---|
| 0 | 0 |
| 1 | 1 |
| 2 | 2 |
| 3 | 3 |

The terminal determines the time-domain transmission location of the signal based on the slot offset configured for the signal resource set of the signal by RRC signaling and/or MAC-CE and the second slot offset indicated by the triggering signaling. In one embodiment, the terminal determines the time-domain transmission location of the signal based on the slot offset configured for the signal resource set of the signal by RRC signaling and/or MAC-CE and the second slot offset indicated by the triggering signaling, which includes: the terminal determines the slot at which the signal is located based on the first slot offset configured by the network device through RRC signaling and/or MAC-CE and the second slot offset indicated by the triggering signaling.

In one embodiment, for each set of signal resources triggered by the triggering signaling, the terminal determines the time-domain transmission location of the signal resource set (that is, the time-domain transmission location of the signal corresponding to the signal resource set) based on the first slot offset configured by the network device through RRC signaling and/or MAC-CE and the second slot offset indicated by the triggering signaling. In one embodiment, the terminal determining the time-domain transmission location of the signal resource set based on the first slot offset configured by the network device through RRC signaling and/or MAC-CE and the second slot offset indicated by the triggering signaling, includes: the terminal determining the slot at which the signal resource set is located based on the first slot offset configured by the network device through RRC signaling and/or MAC-CE and the second slot offset indicated by the triggering signaling.

In one embodiment, the terminal determining the slot at which the signal is located includes the terminal determining the slot at which the signal is located in the following manner:

The terminal determines that the slot offset of the signal relative to the reference slot is determined by a first function on the first slot offset and a second function on the second slot offset. The first function is expressed as RRC(•), the second function on the second slot offset is expressed as f(•). Assumed that the first slot offset and the second slot offset corresponding to the signal resource set corresponding to the signal are s and k respectively, then the slot offset of the signal relative to the reference slot is: RRC(s)+f(k). Where the first function on the offset value of the first slot may be a function including the concept of the first slot, or other functions. For example, RRC(s) represents the slot offset corresponding to the s first slots. The second function on the offset value of the second slot may be a configuration table, an association relationship, a function including the concept of the first slot, or other functions. In one embodiment, f(k)=k. In one embodiment, RRC(s)=s.

In one embodiment, the terminal determining the slot at which a signal resource set is located includes the terminal determining the slot at which the signal resource set is located in the following manner:

The terminal determines that a slot offset of a signal resource set relative to a reference slot is determined by a first function on the first slot offset and a second function on the second slot offset. The first function is expressed as RRC(•), the second function on the second slot offset is expressed as f(•). Assumed that the first slot offset and the second slot offset corresponding to a signal resource set are s and k respectively, then the slot offset of the signal relative to the reference slot is: RRC(s)+f(k). Where the first function on the offset value of the first slot may be a function including the concept of the first slot, or other functions. For example, RRC(s) represents the slot offset corresponding to the s first slots. The second function on the offset value of the second slot may be a configuration table, an association relationship, a function including the concept of the first slot, or other functions. In one embodiment, f(k)=k. In one embodiment, RRC(s)=s.

In one embodiment, the second slot offset corresponding to the multiple signal resource sets triggered by the triggering signaling are same.

In one embodiment, the first functions corresponding to the multiple signal resource sets triggered by the triggering signaling are same, but the second functions are different. For example, for set 1, the second function on the second slot offset is f1(•), for set 2, the second function on the second slot offset is f2(•), f1(•) is not equal to f2(•). For example, f1(•) and f2(•) are different configuration tables, both f1(•) and f2(•) are functions on the first slot, but the first slots for them are different. Then even if the second slot offset corresponding to set 1 and set 2 are both k, the slot offset of set 1 relative to the reference slot is: RRC(s1)+f1(k), and the slot offset of set 2 relative to the reference slot is: RRC(s2)+f2(k).

In one embodiment, the first functions corresponding to the multiple signal resource sets triggered by the triggering signaling are same, and the second functions are also same. For example, for set 1, the second function on the second slot offset is f1(•), for set 2, the second function on the second slot offset is f2(•), f1(•) is equal to f2(•). Then if the second slot offset corresponding to set 1 and set 2 are both k, the slot offset of set 1 relative to the reference slot is: RRC(s1)+f1(k), and the slot offset of set 2 relative to the reference slot is: RRC(s2)+f2(k), f1(k)=f2(k).

In one embodiment, the first function and the second function corresponding to the signal resource sets triggered by the triggering signaling are different.

In one embodiment, in this example, the reference slot is a slot for transmitting the triggering signaling.

In one embodiment, the first function is specified in the protocol.

In one embodiment, the second function is specified in the protocol. In one embodiment, the second function is indicated by the network device through signaling such as MAC-CE.

Example 7

The terminal receives the slot offset configured by the network device for the signal resource set of the signal through RRC signaling and/or MAC-CE, and may set the slot offset as the first slot offset. In one embodiment, when there are multiple signal resource sets in the system, the network device may independently configure the slot offset for each signal resource set. Taking the triggering signaling that triggers the signal as DCI as an example, it is assumed that the triggering signaling triggers two SRS resource sets at the same time, and the two SRS resource sets are set 1 and set 2 respectively.

In one embodiment, for a signal resource set, the network device configures one or more slots offset for it. For example, the slot offset configured by the network device for set 1 are s11, s12, s13, and s14, and the slot offset configured for set 2 are s21, s22, s23, and s24. Note that when there are multiple signal resource sets, the number of slot offset configured for different signal resource sets may be same or different.

The terminal receives the triggering signaling transmitted by the network device to trigger the signal, and the triggering signaling may select a slot offset from the slot offset configured by the network device for the signal resource set triggered by the triggering signaling. For example, the triggering signaling includes a slot offset information field, and each state of the information field represents a selection mode. For example, the triggering signaling includes a slot offset information field, which is indicated by 2 bits, and includes 4 states, and the slot offset corresponding to the two signal resource sets corresponding to these 4 states are shown in Table 3 below Show:

TABLE 3

| a state of the information field of slot offset | the selected slot offset |
|---|---|
| 0 | the first slot offset corresponding to respective signal resource set |
| 1 | the second slot offset corresponding to respective signal resource set |
| 2 | the third slot offset corresponding to respective signal resource set |
| 3 | the fourth slot offset corresponding to respective signal resource set |

The terminal determines the time-domain transmission location of the signal based on the slot offset configured for the signal resource set of the signal by RRC signaling and/or MAC-CE and the information field used to select the slot offset in the triggering signaling. In one embodiment, the terminal determines the time-domain transmission location of the signal based on the first slot offset configured by the network device through RRC signaling and/or MAC-CE and the second slot offset indicated by the triggering signaling, includes: the terminal determines the slot at which the signal is located based on the first slot offset configured by the network device through RRC signaling and/or MAC-CE and the second slot offset indicated by the triggering signaling.

In one embodiment, for each set of signal resources triggered by the triggering signaling, the terminal determines the time-domain transmission location of the signal resource set (that is, the time-domain transmission location of the signal corresponding to the signal resource set) based on the first slot offset configured by the network device through RRC signaling and/or MAC-CE and the information filed used to select the slot offset in triggering signaling. In one embodiment, the terminal determines the signal resource set based on the first slot offset configured by the network device through RRC signaling and/or MAC-CE and the information filed used to select the slot offset in triggering signaling, includes: the terminal determines the slot at which the signal resource set is located based on the first slot offset configured by the network device through RRC signaling and/or MAC-CE and the information field used to select the slot offset in the triggering signaling.

In one embodiment, the terminal determining the slot at which the signal is located includes the terminal determining the slot at which the signal is located in the following manner:

The terminal determines that the slot offset of the signal relative to the reference slot is a function of the first slot offset selected by the triggering signaling. This function is expressed as RRC(•). Assumed that the first slot offset selected by the triggering signaling for the signal resource set corresponding to the signal is s, then the slot offset of the signal relative to the reference slot is: RRC(s). Where the first function on the offset value of the first slot may be a function including the concept of the first slot, a mapping relationship, or other functions. For example, RRC(s) represents the slot offset corresponding to the s first slots. In one embodiment, RRC(s)=s.

In one embodiment, the terminal determining the slot at which a signal resource set is located includes the terminal determining the slot at which the signal resource set is located in the following manner:

The terminal determines that a slot offset of a signal resource set relative to a reference slot is a first function of the first slot offset selected for the signal resource set by the triggering signaling. The first function may be a function including the concept of the first slot, may be a mapping relationship, or other functions. For example, RRC(s) represents the slot offset corresponding to the s first slots. In one embodiment, RRC(s)=s.

In one embodiment, the first slot offset corresponding to the multiple signal resource sets triggered by the triggering signaling are in the same position of slot offset lists configured by the network device for these signal resource sets through RRC signaling or MAC-CE. For example, the first slot offset selected by state 0 of the triggering signaling for set 1 is $s_{11}$, and the first slot offset selected by state 0 of the triggering signaling for set 2 is $s_{21}$. Then the transmission slots of set 1 and set 2 are RRC($s_{11}$) and RRC($s_{21}$) respectively.

In one embodiment, the first functions corresponding to the multiple signal resource sets triggered by the triggering signaling are same or different.

In one embodiment, in this example, the reference slot is a slot for transmitting the triggering signaling.

In one embodiment, the first function is specified in the protocol.

In one embodiment, the second function is specified in the protocol. In one embodiment, the second function is indicated by the network device through signaling such as MAC-CE.

In the above embodiments, the signal resources set triggered by the triggering signaling refers to the signal resources set triggered by the triggering signaling with the same signal type as the signal, and the signal resources triggered by the triggering signaling refer to the signal resources set triggered by the triggering signaling with the same signal type as the signal. For example, if the signal is an SRS, the signal resources set triggered by the triggering signaling refers to the set of SRS signal resources triggered by the triggering signaling, and the signal resources triggered by the triggering signaling refer to the SRS signal resources triggered by the triggering signaling. For another example, if the signal is a CSI-RS, the signal resource set triggered by the triggering signaling refers to the CSI-RS signal resource sets triggered by the triggering signaling, and the signal resource triggered by the triggering signaling refers to the CSI-RS signal resources triggered by the triggering signaling.

In the foregoing embodiments, the symbols of the signal resource set may be understood as the symbols of all the signal resources included in the signal resources.

As shown in FIG. 3, it is a flowchart of the signal transmission method applied to the network device side according to an embodiment of the present application. The method includes the following steps:

Step 301: determining transmission location of a signal based on at least one of a priority of the signal, uplink-downlink pattern configuration, minimum time interval requirement between transmission of triggering signaling and the signal, or the time window requirement between transmission of the triggering signaling and the signal;

Step 302: transmitting triggering signaling, where the triggering signaling is a signaling that triggers to transmit or receive the signal, and the triggering signaling is associated with the transmission location of the signal.

It should be noted that this embodiment is applicable to aperiodic uplink signals (such as sounding reference signal (SRS)), aperiodic downlink signals (such as channel state information reference signal (CSI-RS)), channel state information interference measurement (CSI-IM) reference signal, etc.), semi-persistent uplink signal, semi-persistent downlink signal, etc.

In one embodiment, the signal is transmitted at the transmission location.

In one embodiment, the transmission location of the triggering signaling is associated with the transmission location of the signal.

In one embodiment, the content carried in the triggering signaling is associated with the transmission location of the signal.

In this embodiment, it can be understood that after determining the transmission location of the signal, the network device may receive the signal at the transmission location or transmit the signal at the transmission location. When the signal is an uplink signal, the network device receives the signal at the transmission location. When the signal is a downlink signal, the network device transmits the signal at the transmission location.

In one embodiment, the signal is an uplink signal, and a transmission location of a downlink symbol overlaps with a transmission location of the signal, and the network device does not receive the signal at the transmission location.

In one embodiment, the signal is an uplink signal, and a transmission location of the downlink symbol overlaps with that of the signal, and the network device discards the overlapping part of the signal and the downlink symbol, and receives the signal only on a symbol that is not the downlink symbols at the transmission location.

In one embodiment, the signal is an uplink signal, and there is a downlink symbol in a slot that overlaps with a transmission location of a signal resource included in the signal resource set of the signal, and the network device does not receive the signal corresponding to the signal resource set in the slot.

In one embodiment, the signal is an uplink signal, and a downlink symbol overlaps with a transmission location of a signal resource included in the signal resource set of the signal in a slot, and the network device discards the overlapping part of the signal resource set and the downlink symbol in the slot, and receives the signal corresponding to the signal resource set only on a symbol that is not the downlink symbols at the transmission location.

In one embodiment, the signal is an uplink signal, and there is a downlink symbol in a slot overlapping with a transmission location of a signal resource included in the uplink signal resource set triggered by the triggering signaling, and the network device does not receive the signal triggered by the triggering signaling in the slot.

In one embodiment, the signal is an uplink signal, and a downlink symbol overlaps with a transmission location of a signal resource included in the uplink signal resource set triggered by the triggering signaling in a slot. The network device discards receiving the overlapping part of the uplink signal resource set triggered by triggering signaling and the downlink symbol in the slot, and receives the signal triggered by the triggering signaling only on a symbol that is not the downlink symbols at the transmission location.

In one embodiment, the signal is a downlink signal, and when an uplink symbol overlaps with a transmission location of the signal, the network device transmits the signal at the transmission location.

In one embodiment, the signal is a downlink signal, and an uplink symbol overlaps with a transmission location of the signal, and the network device discards the overlapping part of the signal and the uplink symbol, and transmits the signal only on a symbol that is not the uplink symbols at the transmission location.

In one embodiment, the signal is a downlink signal, an uplink symbol overlaps with a transmission location of a signal resource included in the signal resource set of the signal in a slot, and the network device does not transmit the signal corresponding to the signal resource set in the slot.

In one embodiment, the signal is a downlink signal, and an uplink symbol overlaps with a transmission location of the signal resource included in the signal resource set of the signal in a slot. The network device discards the overlapping part of the signal resource set and the uplink symbol in the slot, and transmits the signal corresponding to the signal resources set only on a symbol that is not the uplink symbol at the transmission location.

In one embodiment, the signal is a downlink signal, and there is an uplink symbol in a slot overlapping with a transmission location of a signal resource included in the downlink signal resource set triggered by the triggering signaling. The network device does not transmit signal triggered by the triggering signaling in the slot.

In one embodiment, the signal is a downlink signal, and there is an uplink symbol in a slot overlapping with a transmission location of a signal resource included in the downlink signal resource set triggered by the triggering signaling. The network device discards transmitting the overlapping part of the downlink signal resource set triggered by triggering signaling and the uplink symbol in the slot, and transmits the signal triggered by the triggering signaling only on a symbol that is not the downlink symbols at the transmission location.

The signal transmission method according to an embodiment of the present application includes: determining transmission location of the signal based on at least one of a priority of the signal, uplink-downlink pattern configuration, minimum time interval requirement between transmission of triggering signaling and the signal, or the time window requirement between transmission of the triggering signaling and the signal; and transmitting the triggering signaling. The triggering signaling is a signaling that triggers to transmit or receive the signal, and the triggering signaling is associated with the transmission location of the signal. It can be seen that the embodiments of the present application increase the opportunity of signal transmission, to increase the flexibility of signal scheduling and transmission.

Based on contents of any of the above embodiments, in this embodiment, the determining transmission location of the signal based on at least one of the priority of the signal, uplink-downlink pattern configuration, minimum time interval requirement between transmission of the triggering signaling and the signal, or time window requirement between transmission of the triggering signaling and the signal, includes:

determining a first slot based on at least one of the priority of the signal, uplink-downlink pattern configuration, minimum time interval requirement between transmission of the triggering signaling and the signal, or time window requirement between transmission of the triggering signaling and the signal;

the transmission location of the signal is the $(t+1)^{th}$ first slot counting from a reference slot, and t is a non-negative integer.

In this embodiment, the uplink-downlink pattern configuration may be uplink-downlink pattern configuration that the network device configures for the terminal device through at least one of RRC signaling, MAC-CE, and DCI signaling. The uplink-downlink pattern configuration may also be uplink-downlink pattern configuration of a carrier or cell in which the signal is located that the network device configures for the terminal device.

In this embodiment, a first slot may be first determined based on at least one of a priority of the signal, uplink-downlink pattern configuration, minimum time interval requirement between transmission of the triggering signaling and the signal, or time window requirement between transmission of the triggering signaling and the signal. Then the $(t+1)^{th}$ first slot counting from the reference slot is determined as the transmission location of the signal, and t is a non-negative integer. It should be noted that when the first slot is determined based on at least one of a priority of the signal, uplink-downlink pattern configuration, minimum time interval requirement between transmission of the triggering signaling and the signal, or time window requirement between transmission of the triggering signaling and the signal, it may make determination based on one or more of the following: ① uplink-downlink pattern configuration; ② time interval between the transmission of triggering signaling and the transmission of the signal; ③ time window requirement between transmission of the triggering signaling and transmission of the signal; ④ the priority of the signal. In addition, it can be understood that each item of ①-④ has multiple implementations in subsequent embodiments, and the implementations under each item of ①-④ may be freely combined and used.

For example, the example of making determination based on ① uplink-downlink pattern configuration is as follows:

If a slot includes at least one uplink or flexible symbol configured by higher layer signaling, the slot is the first slot.

As another example, the example of making determination based on ① uplink-downlink pattern configuration and ② time interval between the transmission of triggering signaling and the transmission of the signal is as follows:

If a slot includes at least one uplink or flexible symbol configured by higher layer signaling and satisfies the first timing requirement, then the slot is the first slot, and the first timing requirement is as follows: the time interval between a symbol of the channel carrying the triggering signaling and a symbol of the first signal resource is not less than the first minimum timing requirement; or the time interval between a symbol of the channel carrying the triggering signaling and a symbol of the first signal resource is greater than the first minimum timing requirement.

The free combination and use of the implementations under the items ①-④ will be described in the subsequent embodiments, which are not described in detail here.

As can be seen, in this embodiment, the first slot is determined based on at least one of a priority of the signal, uplink-downlink pattern configuration, minimum time interval requirement between transmission of the triggering signaling and the signal, or time window requirement between transmission of the triggering signaling and the signal, and then the $(t+1)^{th}$ first slot counting from a reference slot is determined as the transmission location of the signal. It may increase the opportunity of signal transmission, to increase the flexibility of signal scheduling and transmission.

Based on contents of any of the above embodiments, in this embodiment, the determining the first slot based on the uplink-downlink pattern configuration includes:

determining that an uplink symbol and/or flexible symbol included in the first slot includes all symbols of the signal resource corresponding to the signal; or determining that a downlink symbols and/or flexible symbols included in the first slot includes all symbols of the signal resource corresponding to the signal.

In this embodiment, it can be understood that when the first slot is determined based on uplink-downlink pattern configuration, it has two situations of uplink and downlink: A, when the signal is an uplink signal, the uplink symbols and/or the flexible symbol included in the first slot satisfy condition A, and the condition A is: covering all symbols of the signal resource corresponding to the signal; when the signal is an uplink signal, the slot at which the transmission opportunity that satisfies the transmission condition is located includes the uplink symbols and/or flexible symbols included in the first slot at which the transmission opportunity satisfying the transmission condition is located cover all the symbols that are configured for the signal resource configuring the signal.

B, when the signal is a downlink signal, the downlink symbols and/or flexible symbols included in the first slot satisfy the condition A. In one embodiment, when the signal is a downlink signal, the downlink symbols and/or flexible symbols included in the slot at which the transmission opportunity that satisfies the transmission condition is located cover all the symbols configured by the signal resource configuring the signal.

In this embodiment, the triggering signaling may be downlink control information (DCI).

Based on contents of any of the above embodiments, in this embodiment, the uplink symbols and/or flexible symbols included in the first slot satisfy condition A, includes:

the uplink symbol and/or flexible symbol included in the first slot includes all symbols of all signal resources included in a signal resource set, where the triggering signaling triggers the signal through the signal resource set.

Based on contents of any of the above embodiments, in this embodiment, the uplink symbol and/or flexible symbol included in the first slot including all symbols of all signal resources included in the signal resource set through which the triggering signaling triggers the signal, includes:

the uplink symbol and/or flexible symbol included in the first slot includes all symbols of all signal resources included in the signal resource set through which the triggering signaling triggers the signal.

Based on contents of any of the above embodiments, in this embodiment, the downlink symbol and/or flexible symbol included in the first slot including all symbols of the signal resource corresponding to the signal, includes:

the downlink symbol and/or flexible symbol in the first slot includes all symbols of all signal resources included in a signal resource set, where the triggering signaling triggers the signal through the signal resource set.

Based on contents of any of the above embodiments, in this embodiment, the downlink symbol and/or flexible symbol included in the first slot including all symbols of all signal resources included in the signal resource set through which the triggering signaling triggers the signal, includes:

the downlink symbol and/or flexible symbol included in the first slot includes all symbols of all signal resources included in the signal resource set through which the triggering signaling triggers the signal.

Based on contents of any of the above embodiments, in this embodiment, the determining the first slot based on the uplink-downlink pattern configuration includes:

determining that the first slot includes at least one symbol indicated by the uplink-downlink pattern configuration as an uplink symbol or a flexible symbol.

Based on contents of any of the above embodiments, in this embodiment, the determining the first slot based on the uplink-downlink pattern configuration includes:

determining that the first slot includes at least one symbol indicated by the uplink-downlink pattern configuration as a downlink symbol or a flexible symbol.

For the above several embodiments, the determining the first slot based on uplink-downlink pattern configuration may have at least the following implementations:

A. If a slot includes at least one uplink or flexible symbol configured by higher layer signaling, the slot is the first slot. It should be noted that the transmission location of the signal in this implementation is no longer a fixed number of slots, but it is related to the configuration of uplink and downlink slots, and the flexibility of triggering and transmitting the signal and opportunities of transmitting the signal can be increased. For example, assumed that the time-domain symbols configured for the signal resources of the signal are the last two symbols in the slot, if the last two symbols included in a slot are both uplink symbols, this slot is a slot that satisfies the first condition. For another example, the time-domain symbols configured for the signal resources of the signal are the last two symbols in the slot, if one of the last two symbols included in a slot is an uplink symbol and the other one is a flexible symbol, this slot is a slot that satisfies the first condition. For another yet example, the time-domain symbols configured for the signal resources of the signal are the last two symbols in the slot, if the last two symbols included in a slot include a downlink symbol, this slot is not a slot that satisfies the first condition;

B. If the uplink and/or flexible symbols included in a slot include the time-domain symbols of all signal resources in the signal resource set through which the triggering signaling triggers the signal, the slot is the first slot. It should be noted that the transmission location of the signal in this implementation is no longer a fixed number of slots, but it is related to the configuration of the uplink and downlink slots and the uplink symbols and flexible symbols included in the slots. It may increase opportunity of the signal successfully transmitting at the $(t+1)^{th}$ (or $t^{th}$) first slot, to increase the flexibility of triggering and transmitting the signal. For example, assumed that the triggering signaling triggers the signal through signal resource set 1, this signal resource set includes the signal resource (which may be marked as signal resource 1) and another signal resource (which may be marked as signal resource 2) of the signal. Assumed that the time-domain symbols configured for signal resource 1 are the last two symbols in the slot, and the time-domain symbols configured for signal resource 2 are the last three symbols in the slot. If the last three symbols included in a slot are all uplink symbols, this slot is a slot that satisfies the first condition; but if the third from last symbol included in a slot is a downlink symbol and the last two symbols are uplink symbol, this slot is not a slot that satisfies the first condition;

C. If the uplink and/or flexible symbols included in a slot include the time-domain symbols configured for all SRS resources in the first SRS resource set, the slot is the first slot. It should be noted that in this implementation, the transmission location of the signal is no longer a fixed number of slots, but it is related to the configuration of the uplink and downlink slots and the uplink symbols and flexible symbols included in the slots. It may increase opportunity of the signal successfully transmitting at the $(t+1)^{th}$ (or $t^{th}$) first slot, to increase the flexibility of triggering and transmitting the signal. In addition, in this implementation, all signal resources in a signal resource set are determined in the same way for the first slot, which can ensure that all signal resources in a signal resource set are transmitted in the same slot, to reduce the complexity of base station scheduling.

D. If the uplink and/or flexible symbols included in a slot include the time-domain symbols configured for all SRS resources in all resource sets triggered by the DCI, the slot is the first slot. It should be noted that, in this implementation, the transmission location of the signal is no longer a fixed number of slots, but it is related to the configuration of the uplink and downlink slots and the uplink symbols and flexible symbols included in the slots. It may increase opportunity of the signal successfully transmitting at the $(t+1)^{th}$ (or $t^{th}$) first slot, to increase the flexibility of triggering and transmitting the signal. In addition, in this implementation, all signal resources of all signal resource sets in a CC (carrier) triggered by triggering signaling are determined in the same way for the first slot, which can ensure the relative relationship of transmission locations of the signal resource set triggered by triggering signaling, to reduce the complexity of base station scheduling.

Based on contents of any of the above-mentioned embodiments, in this embodiment, the minimum time interval requirement is the first minimum timing requirement, and the determining the first slot based on the minimum time interval requirement between the transmission of the triggering signaling and the signal includes at least one of the followings:

the first slot satisfies a first time interval condition; the first time interval condition includes: the time interval between the symbol of the channel carrying the triggering signaling and the symbol of the signal resource of the signal satisfies a first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

where the first signal resource set is a signal resource set through which the triggering signaling triggers the signal.

Based on contents of any of the above embodiments, in this embodiment, the time interval between the symbol of the channel carrying the triggering signaling and the symbol of the signal resource in the first signal resource set satisfies the first minimum timing requirement, includes:

a time interval between a symbol of the channel carrying the triggering signaling and a symbol of a signal resource set and/or a signal source triggered by the triggering signaling satisfies the first minimum timing requirement.

The determining the first slot based on the minimum time interval requirement between the transmission of the triggering signaling and the signal includes the first slot satisfying a first time interval condition, and the first time interval condition includes the time interval between the symbol of the channel carrying the triggering signaling and the symbol of the signal resource of the signal satisfying the first minimum timing requirement; the determining the first slot based on the minimum time interval requirement between the transmission of the triggering signaling and the signal includes:

for a slot, determining whether the time interval between the symbol of the channel carrying the triggering signaling and the symbol of the signal resource of the signal satisfies the first minimum timing requirement. If the first minimum timing requirement is not satisfied, the slot is not the first slot; if the first minimum timing requirement is satisfied, the slot is the first slot.

For example, assumed that the triggering signaling is DCI, the channel carrying the DCI is PDCCH, the signal is an SRS, and the symbol occupied by the corresponding SRS resource is the last symbol in the slot. Assumed that the PDCCH is transmitted in slot n, then for slot k, determining whether the time interval between the last symbol of slot k and the last symbol of the PDCCH satisfies the first minimum timing requirement, and if so, then slot k is the first slot, otherwise slot k is not the first slot.

The determining the first slot based on the minimum time interval requirement between the transmission of the triggering signaling and the signal includes the first slot satisfying a first time interval condition, and the first time interval condition includes the time interval between the symbol of the channel carrying the triggering signaling and the symbol of the signal resource of the signal satisfying the first minimum timing requirement; the determining the first slot based on the minimum time interval requirement between the transmission of the triggering signaling and the signal includes:

for a slot, determining whether the time interval between the symbol of the channel carrying the triggering signaling and the symbol of the signal resource of the signal satisfies the first minimum timing requirement. If the first minimum timing requirement is not satisfied, the slot is not the first slot; if the first minimum timing requirement is satisfied, and the slot also needs to satisfy other conditions that need to be satisfied, then the slot is the first slot.

For example, it is assumed that the first slot needs to satisfy the following conditions: the uplink symbols and/or flexible symbols included in the first slot cover all signal resources included in the signal resource set through which the triggering signaling triggers the signal; and the time interval between the symbol of the channel carrying the triggering signaling and the signal resource of the signal satisfies the first minimum timing requirement. It is then assumed that the triggering signaling is DCI, the channel carrying the DCI is PDCCH, the signal is an SRS, and the symbol occupied by the corresponding SRS resource is the last symbol in the slot. Assumed that the PDCCH is transmitted in slot n, then for slot k, it is determined whether the time interval between the last symbol of slot k and the last symbol of the PDCCH satisfies the first minimum timing requirement; and if so, it further needs that the slot k satisfies that the uplink symbol and/or flexible symbol included in the slot k includes all symbols of all SRS resources included in the SRS resource set (which may be regarded as SRS resource set 1) through which the SRS is triggered. It is assumed that uplink symbols and/or flexible symbols included in slot k are the 10$^{th}$ to 14$^{th}$ symbols. The SRS resource set 1 includes two SRS resources, one of the two SRS resources is the SRS resource of the signal, and the other one of the two SRS resources occupies a symbol that is the 9$^{th}$ symbol in the slot. Since the uplink symbols and/or flexible symbols included in the slot k cannot cover the symbols of all the SRS resources included in the SRS resource set 1, the slot k is not a first slot. For slot m, if the uplink symbols and/or flexible symbols included in slot m are the 9$^{th}$ to 14$^{th}$ symbols, the time interval between the last symbol of slot m (the symbol of the signal resource of the signal) and the PDCCH satisfies the first minimum timing requirement, and the slot m can cover symbols of all SRS resources included in the SRS resource set 1, then the slot m is a first slot.

The determining the first slot based on the minimum time interval requirement between the transmission of the triggering signaling and the signal includes the first slot satisfying a second time interval condition, and the second time interval condition includes the time intervals between a symbol of the channel carrying the triggering signaling and a symbol of all signal resources included in a first signal resource set satisfying the first minimum timing requirement; the determining the first slot based on the minimum time interval requirement between the transmission of the triggering signaling and the signal includes:

for a slot, determining whether the time interval between a symbol of the channel carrying the triggering signaling and a symbol of all signal resources in the first signal resource set satisfies the first minimum timing requirement. If there is a situation that does not satisfy the first minimum timing requirement, the slot is not the first slot; if the first minimum timing requirement is satisfied, then the slot is the first slot.

The determining the first slot based on the minimum time interval requirement between the transmission of the triggering signaling and the signal includes the first slot satisfying a second time interval condition, and the second time interval condition includes the time intervals between a symbol of the channel carrying the triggering signaling and a symbol of all signal resources included in a first signal resource set satisfying the first minimum timing requirement; the determining the first slot based on the minimum time interval requirement between the transmission of the triggering signaling and the signal includes:

for a slot, determining whether the time interval between a symbol of the channel carrying the triggering signaling and a symbol of all signal resources in the first signal resource set satisfies the first minimum timing requirement. If there is a situation that does not satisfy the first minimum timing requirement, the slot is not the first slot; if the first minimum timing requirement is satisfied, and the slot also needs to satisfy other conditions that need to be satisfied, then the slot is the first slot.

For example, it is assumed that the first slot needs to satisfy the following conditions: the uplink symbols and/or flexible symbols included in the first slot cover all signal resources included in the signal resource set through which the triggering signaling triggers the signal, and time intervals between symbols of the channel carrying the triggering signaling and all signal resources in the first signal resource set satisfy the first minimum timing requirement. It is then assumed that the triggering signaling is DCI, the channel carrying the DCI is PDCCH, the signal is an SRS, and the corresponding first signal resource set includes two SRS resources, and the symbols occupied by the two SRS resources are the last two symbols. Assumed that the PDCCH is transmitted in slot n, then for slot k, it is determined whether the time interval between the last two symbols of slot k and the last symbol of the PDCCH satisfies the first minimum timing requirement. If so, it is also required that the slot k satisfies that the uplink symbol and/or flexible symbol included in the slot k includes all symbols of the SRS resources included in the SRS resource set (which may be regarded as SRS resource set 1) through which the SRS is triggered. It is assumed that uplink symbols and/or flexible symbols included in slot k are the 10$^{th}$ to 14$^{th}$ symbols. Since the uplink symbols and/or flexible symbols included in the slot k can cover symbols of all SRS resources included in the first signal resource set, the slot k is a first slot. In this embodiment, it can be understood that the minimum time interval requirement can reduce the probability that the SRS cannot be transmitted, increase the flexibility of scheduling, and avoid waste of triggering signaling resources. In this embodiment, the determining the first slot based on the minimum time interval between the transmission of the triggering signaling and the signal can be achieved in at least the following ways:

If a slot satisfies the following requirements, the slot is the first slot: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;

If a slot satisfies the following conditions, the slot is the first slot: the time intervals between the symbol of the channel carrying the triggering signaling and the transmission symbol corresponding to all signal resources in the first signal resource set satisfy the first minimum timing requirement;

If a slot satisfies the following conditions, the slot is the first slot: the time interval between the last symbol of the channel carrying the triggering signaling and the first symbol among symbols of all signal resources included in the first signal resource set satisfies the first minimum timing requirement;

If a slot satisfies the following conditions, the time intervals between transmissions of the channel carrying the triggering signaling and transmissions of signals corresponding to all signal resource sets or all signal resources triggered by the triggering signaling satisfy the first minimum timing requirement;

If a slot satisfies the following conditions, the slot is the first slot: the time interval between the last symbol of the channel carrying the triggering signaling and the first symbols of the symbols of all signal resource sets or signal resources triggered by the triggering signaling satisfies the first minimum timing requirement.

Based on contents of any of the above embodiments, in this embodiment, the satisfying the first minimum timing requirement includes one of the following:

- the time interval being greater than or equal to a pre-agreed value;
- the time interval being greater than or equal to the maximum value among the minimum timing requirements corresponding to all signal resources triggered by the triggering signaling;
- the time interval being greater than or equal to the minimum timing requirement corresponding to the signal resource set through which the triggering signaling triggers the signal;
- the time interval being greater than or equal to the maximum value among the minimum timing requirements corresponding to all signal resource sets triggered by the triggering signaling;
- the time interval being the maximum value among the minimum timing requirements corresponding to the usage types of all signal resource sets triggered by the triggering signaling.

In this embodiment, for example, the first minimum timing requirement may be greater than the pre-agreed value between the base station and the UE;

In one embodiment, the first minimum timing requirements corresponding to different signal resources may be different; for example, the triggering signaling triggers N signal resources, respectively expressed as $S_1, \ldots, S_N$, and their corresponding minimum timing requirements are not less than $k_1, \ldots, k_N$, that is, the minimum timing requirement corresponding to the signal resource $S_m$ is not less than $k_m$, $m \in \{1, \ldots, N\}$, then the first minimum timing requirement corresponding to the signal resource $S_m$ is not less than $k_m$, $m \in \{1, \ldots, N\}$.

In one embodiment, the first minimum timing requirements corresponding to different signal resource sets are different; for example, triggering signaling triggers N signal resource sets, respectively expressed as $S_1, \ldots, S_N$, and their corresponding minimum timing requirements are not less than $k_1, \ldots, k_N$, that is, the minimum timing requirement corresponding to the signal resource set $S_m$ is not less than $k_m$, $m \in \{1, \ldots, N\}$. Then the first minimum timing requirement corresponding to the signal triggered by the signal configured in the signal resource set $S_m$ is not less than $k_m$, $m \in \{1, \ldots, N\}$. In one embodiment, the first minimum timing requirement is not less than the maximum value in the first time interval corresponding to all signal resources triggered by the triggering signaling.

For example, the triggering signaling triggers N signal resources, respectively expressed as $S_1, \ldots, S_N$, and their corresponding first time intervals are: $k_1, \ldots, k_N$, that is, the minimum time interval corresponding to $S_m$ is $k_m$, $m \in \{1, \ldots, N\}$. Then the first minimum timing requirement is not less than $\max\{k_1, \ldots, k_N\}$, that is, not less than the maximum value among $k_1, \ldots, k_N$. In one embodiment, the first time interval corresponding to a signal resource is the minimum time interval between the last symbol of the PDCCH carrying the triggering signaling that triggers the signal resource and the first symbol of the signal resource; a first time interval corresponding to the signal resource is pre-agreed by the base station and the terminal. In one embodiment, the first minimum timing requirement is not less than the maximum value in the first time interval corresponding to all signal resource sets triggered by the triggering signaling. For example, the triggering signaling triggers N signal resource sets, expressed as $S_1, \ldots, S_N$, and their corresponding minimum time intervals are $k_1, \ldots, k_N$, that is, the first time interval corresponding to $S_m$ is $k_m$, $m \in \{1, \ldots, N\}$. Then the first minimum timing requirement is not less than $\max\{k_1, \ldots, k_N\}$, that is, not less than the maximum value among $k_1, \ldots, k_N$. In one embodiment, the first time interval corresponding to a signal resource set is the minimum time interval between the last symbol of the channel carrying the triggering signaling that triggers the signal resource set and the first symbol of all signal resource symbols in the signal resource set. In one embodiment, the first time interval corresponding to a signal resource set is pre-agreed between the base station and the terminal. In one embodiment, the first minimum timing requirement is the maximum value in the first time interval corresponding to the usage type of all the first signal resource sets triggered by the triggering signaling. For example, the triggering signaling triggers N signal resource sets, respectively expressed as $S_1, \ldots, S_N$, there are U kinds of usage types corresponding to these signal resource sets, and the first time intervals corresponding to these U usage types are respectively $k_1, \ldots, k_U$, then the first minimum timing requirement is not less than $\max\{k_1, \ldots, k_U\}$, that is, not less than the maximum value among $k_1, \ldots, k_U$. In one embodiment, the first time interval corresponding to a type of signal resource set is pre-agreed between the base station and the terminal.

Based on contents of any of the above embodiments, in this embodiment, the determining the first slot based on the time window requirement between the transmission of the triggering signaling and the signal includes at least one of the followings:

- the time interval between the first slot and the slot at which the triggering signaling is located is less than or equal to a first preset value specified in the time window requirement between the transmission of the triggering signaling and the signal;
- the first slot satisfies that the time interval between the symbol of the channel carrying the triggering signaling and the symbol of the signal resource of the signal is less than or equal a second preset value specified in the time window requirement between the transmission of the triggering signaling and the signal. For example, the first slot satisfies that the time interval between the last symbol of the channel carrying the triggering signaling and the last symbol of the signal resource of the signal is less than or equal to a second preset value specified in the time window requirement between the transmission of the triggering signaling and the signal;
- the first slot satisfies that the time interval between the symbol of the channel carrying the triggering signaling and the symbol of the first signal resource is less than or equal to a third preset value specified in the time window requirement between the transmission of the triggering signaling and the signal; for example, the first slot satisfies that the time interval between the last symbol of the channel carrying the triggering signaling and the last symbol of the first signal resource is less than or equal to a third preset value specified in the transmission time window requirement between the transmission of the triggering signaling and the signal;
- where the first signal resource set is a signal resource set through which the triggering signaling triggers the signal.

The time window requirement may be agreed in a protocol, may also be indicated by the network device to the terminal device, or may be reported by the terminal device to the network device through signaling.

Specifically, the Time Window Requirement can be:

the time interval between the last symbol of the PDCCH carrying the triggering signaling and the last symbol of the first signal resource is not greater than a given value; or the time interval between the slot and the slot at which the triggering signaling is located is not greater than the given value. In one embodiment, the given value is a fixed value, for example, which may be agreed in a protocol or indicated by a base station. The given value may be a slot value, or a symbol value, etc. In one embodiment, the given value is a function of a slot offset/symbol offset value configured by the base station for the first signal resource set through signaling. The signaling may be RRC signaling, MAC-CE, triggering signaling or a slot offset/symbol offset value obtained based on their combination. In one embodiment, the given value is determined based on the uplink-downlink ratio configuration of the UE (for example, determined based on dl-UL-TransmissionPeriodicity in RRC signaling TDD-UL-DL-Pattern). In one embodiment, when the UE is configured with multiple TDD-UL-DL-Patterns on a carrier, it is determined based on the maximum value of dl-UL-TransmissionPeriodicity in multiple TDD-UL-DL-Patterns.

Based on contents of any of the above-mentioned embodiments, in this embodiment, the first preset value, the second preset value or the third preset value are associated with at least one of the following information O-Q:

① a value agreed in the protocol;

② a value indicated to the terminal device; transmitting indication information indicating at least one of the first preset value, the second preset value, and the third preset value to the terminal device;

③ the slot offset configured for the signal resources set through which the triggering signaling triggers the signal; the slot offset of all signal resources triggered by the triggering signaling; ④ uplink-downlink pattern configuration;

⑤ usage type of the signal resource set through which the triggering signaling triggers the signal; the first preset value, the second preset value or the third preset value are associated with the usage types of all signal resources triggered by the above-mentioned triggering signaling;

⑥ the numerology of the bandwidth part (BWP) at which the triggering signaling is located;

⑦ a value determined by the numerology of the bandwidth part (BWP) at which the signal resource set, through which the triggering signaling triggers the signal, is transmitted.

Based on contents of any of the above embodiments, in this embodiment, the determining the first slot based on the priority of the signal includes at least one of the following ①-③:

① The priority of the signal at least partially overlapping with the time-domain symbol of the signal in the first slot is equal to or less than that of the signal. In one embodiment, the overlapping includes partial overlapping and/or full overlapping. In one embodiment, if the time-domain symbols of the signal in a slot include a symbol on which a signal with a higher priority than that of the signal is located, the slot is not a first slot; where the signal that at least partially overlaps with the time-domain symbols of the signal is a signal different from the signal;

② A signal in the first slot that at least partially overlaps with a time-domain symbol of a signal corresponding to the first signal resource set has a priority being equal to or lower than that of a signal corresponding to the first signal resource set, where the first signal resource set is a signal resource set through which the triggering signaling triggers the signal;

③ The signal in the first slot has a priority being equal to or lower than that of the signal.

Based on contents of any of the above embodiments, in this embodiment, the priority of the signal may be determined through at least one of the following ①-⑤:

① determining the priority of the signal based on the usage type of the signal resource set triggered by the triggering signaling; for example, the triggering signaling is DCI, and the signal is SRS, for example, the priority of the signal of the SRS resource set whose usage type is the codebook is higher than that the SRS resource set whose usage type is beamManagement;

② determining the priority of the signal based on the slot offset configured by radio resource control (RRC) signaling for the signal resource set triggered by the triggering signaling; for example, the triggering signaling is DCI, and the signal is SRS, for example, the signal resource set with a smaller slot offset configured by RRC signaling has a higher priority. For another example, the signal resource set with a larger slot offset configured by RRC signaling has a higher priority;

③ determining the priority of the signal based on the priority indication information transmitted to the terminal device;

④ determining the priority of the signal based on the number of symbols of the signal resource triggered by the triggering signaling; the signal resource set with a small number of symbols has a higher priority. In one embodiment, a signal resource set with a larger number of symbols has a higher priority;

⑤ determining the priority of the signal based on the number of symbols of the signal resource set triggered by the triggering signaling.

Based on contents of any of the above embodiments, in this embodiment, the indication of the priority of the signal includes at least one of the following ①-⑤.

① indicating the priority of the signal through the usage type of the signal resource set triggered by the triggering signaling indicates; for example, the triggering signaling is DCI, and the signal is SRS, for example, the priority of the signal of the SRS resource set whose usage type is the codebook is higher than that the SRS resource set whose usage type is beamManagement;

② indicating the priority of the signal through the slot offset configured by radio resource control (RRC) signaling for the signal resource set triggered by the triggering signaling; for example, the triggering signaling is DCI, and the signal is SRS, for example, the signal resource set with a smaller slot offset configured by RRC signaling has a higher priority. For another example, the signal resource set with a larger slot offset configured by RRC signaling has a higher priority.

③ indicating the priority of the signal through the priority indication signaling transmitted to the terminal device;

④ indicating the priority of the signal through the number of symbols of the signal resources triggered by the triggering signaling; the signal resource set with a small number of symbols has a higher priority. In one embodiment, a signal resource set with a larger number of symbols has a higher priority;

⑤ indicating the priority of the signal through the number of symbols in the signal resource set triggered by the triggering signaling.

Based on contents of any of the above embodiments, in this embodiment, the signal resource is a signal resource in the carrier or cell in which the signal is located; and/or The signal resource set is a signal resource set in the carrier or cell in which the signal is located.

In one embodiment, the method in this embodiment is applicable to signal resources and/or signal resource sets in the same carrier or cell. As such, if the two SRS resource sets are signals of two cells, a partial of the method of this embodiment is not applicable.

In this embodiment, if the UE does not support simultaneous transmission of SRS and PUCCH/PUSCH under intra-band carrier aggregation or inter-band carrier aggregation, or the carrier aggregation is beyond the capability of the UE, in a case that a carrier is configured with PUSCH/UL DM-RS/UL PT-RS/PUCCH on a symbol in a slot, this slot is not a first slot of the aperiodic SRS resource set of the symbol of another carrier configured with this symbol.

Based on contents of any of the above embodiments, in this embodiment, the reference slot includes at least one of the following ① to ④:

① a slot at which the triggering signaling is located;

② a slot indicated through the slot at which the triggering signaling is located and a slot offset configured by the network device for the signal resource set triggered by the triggering signaling through radio resource control (RRC) signaling; a slot determined based on the slot at which the triggering signaling is located and a slot offset configured by the network device for the signal resource set through which the triggering signaling triggers the signal through radio resource control (RRC) signaling;

③ a slot indicated through the slot offset indicated by medium access control-control element (MAC-CE); the reference slot is a slot after the slot at which the trigger signaling is located being offset by the slot offset of slots, where the slot offset is configured by MAC-CE for the signal resource set through which the trigger signaling triggers the signal. In one embodiment, the reference slot is a slot after the slot at which the trigger signaling is located being offset by the slot offset of first slot, where the slot offset is configured by MAC-CE for the signal resource set through which the trigger signaling triggers the signal.

④ a slot indicated through the slot offset indicated by the triggering signaling; it may also be the slot offset indicated by other dynamic signaling (DCI, dynamic signaling other than the triggering signaling that transmits the signal).

In this embodiment, it should be noted that the reference slot may be a slot indicated through the slot offset indicated by a network device through the MAC-CE. The advantage of this manner is that the base station can more flexibly indicate the reference slot, to make the determination of the transmission slot of the signal much flexible, and the triggering of the signal much flexible. In addition, the reference slot can also be a slot indicated through the slot offset indicated by a network device through the triggering signaling. This triggering signaling can be the triggering signaling or other triggering signaling. The advantage of the manner is that the base station can indicate the reference slot much flexibly, and the determination of the signal transmission slot is much flexible, and the triggering of the signal is much flexible.

Based on contents of any of the above embodiments, in this embodiment, the way of indicating t or t+1 includes at least one of the following ①-③.

① indicating the t or t+1 through a dedicated information field in the triggering signaling. For example, the triggering signaling is DCI, and the DCI includes a dedicated information field (such as a slot offset field), and this information field is used to indicate the t or t+1. For another example, the triggering signaling is DCI, and the DCI includes a dedicated information field (such as a slot offset field), and this information field is associated with an information field (such as an SRS request field) used to trigger the signal in the DCI, the terminal indicates the t or t+1 through the association relationship and the value of the dedicated information field;

② indicating the t or t+1 through the information field of triggering an aperiodic signal in the triggering signaling. For example, when the signal is an SRS signal, t or t+1 is indicated through the value of the SRS request information field in the DCI that triggers the signal. For another example, when the signal is a CSI-RS signal, t is indicated through the value of the CSI request information field in the DCI that triggers the signal;

③ indicating the t or t+1 through a triggering state of the aperiodic signal indicated by the triggering signaling. For example, when the signal is an SRS signal, t or t+1 is indicated through a triggering state corresponding to the value of the SRS request information field in the DCI that triggers the signal. For another example, when the signal is a CSI-RS signal, t or t+1 is indicated through a triggering state corresponding to the value of the CSI request information field in the DCI that triggers the signal.

Based on contents of any of the above embodiments, in this embodiment, the method further includes: indicating the t or t+1 through indication information included in the triggering signaling, where the indication information is used to select one or more values from a group of candidate values indicated by MAC-CE and/or RRC signaling.

Based on contents of any of the above embodiments, in this embodiment, the method includes: indicating the t or t+1 through the information field of triggering an aperiodic signal in the triggering signaling, which includes:

indicating the t or t+1 through the value of the information field that triggers the signal in the triggering signaling and an association relationship between t or t+1 indicated by the MAC-CE and/or RRC signaling and the value of the information field that triggers the signal in the triggering signaling; or indicating the t or t+1 through an association relationship between t or t+1 indicated by the MAC-CE and/or RRC signaling and the triggering state indicated by the information field that triggers the signal in the triggering signaling and the triggering state.

Based on Contents of any of the Above Embodiments, in this Embodiment, the Signal Transmission Method Further Includes:

indicating the t or t+1 through an association relationship between a type of the signal resource set triggered by the triggering signaling and t or t+1; and/or indicating the t or t+1 through a slot offset selected by the triggering signaling from multiple slot offset indicated by the MAC-CE and/or RRC signaling and another slot offset indicated by the triggering signaling.

In one embodiment, jointly indicating t or t+1 through the RRC signaling and the triggering signaling includes: RRC signaling indicates a slot offset for the signal resource set corresponding to the signal, and the triggering signaling indicates another slot offset for the signal resource set corresponding to the signal, and the RRC signaling and triggering signaling together indicate t or t+1. For example, the RRC signaling indicates a slot offset of $t_1$ for the signal resource set corresponding to the signal, and the triggering signaling indicates a slot offset of $t_2$ for the signal resource set corresponding to the signal, then the t corresponding to the indicated signal is $t=t_1+t_2$.

In one embodiment, jointly indicating t or t+1 through the RRC signaling and the triggering signaling includes further includes: the RRC signaling indicates multiple slot offset for the signal resource set corresponding to the signal, and the triggering signaling selects a slot offset from the multiple slot offset indicated by RRC signaling for the signal resource set corresponding to the signal and indicate another slot offset, and the slot offset selected by the triggering signaling and another slot offset indicated by the triggering signaling jointly indicate t or t+1. For example, the triggering signaling selects a slot offset of $t_1$ from the slot offset indicated by the RRC signaling for the signal resource set corresponding to the signal, and the triggering signaling indicates another slot offset of $t_2$ for the signal resource set corresponding to the signal, the t corresponding to the indicated signal is $t=t_1+t_2$.

In one embodiment, the indicating t or t+1 through MAC-CE and triggering signaling includes: MAC-CE indicates a slot offset for the signal resource set corresponding to the signal, and the triggering signaling indicates another slot offset for the signal resource set corresponding to the signal, and the MAC-CE and triggering signaling together indicate t or t+1. For example, the slot offset indicated by the MAC-CE for the signal resource set corresponding to the signal is $t_1$, and the slot offset indicated by the triggering signaling for the signal resource set corresponding to the signal is $t_2$, then the t corresponding to the indicated signal is $t=t_1+t_2$.

In one embodiment, the indicating t or t+1 through MAC-CE and triggering signaling, further includes: MAC-CE indicates multiple slot offset for the signal resource set corresponding to the signal, and the triggering signaling selects a slot offset from multiple slot offset indicated by the MAC-CE for the signal resource set corresponding to the signal and indicate another slot offset, and the slot offset selected by the triggering signaling and another slot offset indicated by the triggering signaling jointly indicate t or t+1. For example, the triggering signaling selects a slot offset of $t_1$ from the slot offset indicated by the RRC signaling for the signal resource set corresponding to the signal, and the triggering signaling indicates another slot offset of $t_2$ for the signal resource set corresponding to the signal, and the t corresponding to the indicated signal is $t=t_1+t_2$.

In this Embodiment, Another Slot Offset Indicated by the Triggering Signaling May be Indicated in at Least One of the Following Ways:

- indicated through the dedicated information field in the triggering signaling;
- indicated through the information field of the trigger aperiodic signal in the triggering signaling;
- indicated through the triggering state of the aperiodic signal indicated by the triggering signaling.

In this embodiment, another slot offset indicated by the triggering signaling may be a value that is same for all signal resource sets triggered by the triggering signaling.

It can be seen that the above-mentioned embodiment provides a variety of different ways of indicating the t or t+1, which are now summarized as follows:

In this embodiment, it should be noted that indicating the t or t+1 based on a dedicated information field in the triggering signaling may include: adding a new information field to the triggering signaling for indicating the t or t+1. In one embodiment, the adding a new information field to the triggering signaling for indicating the t or t+1 has one or more of the following situations:

- the number of bits in the information field is fixed;
- the bit width of the information field is configured by the network device through signaling;
- when the triggering state corresponding to a triggering signaling is not to trigger an aperiodic signal (for example, the state of the SRS request field in DCI is "00"), the terminal device does not consider (that is, ignore) the content indicated by the new information field;
- when t or t+1 is indicated through the MAC-CE and the triggering signaling, the MAC-CE indicates a set of candidate values of t or t+1, and the new information field is used to select t therefrom;
- when t or t+1 is indicated jointly by RRC signaling and triggering signaling, the RRC signaling indicates a set of candidate values of t or t+1, and the new information field is used to select t therefrom.

In this embodiment, it should be noted that when t or t+1 is indicated through the information field of triggering an aperiodic signal in the triggering signaling, one or more of the following situations exist:

- different values of the information field correspond to the same or different t;
- the bit width of the information field that triggers the aperiodic signal in the triggering signaling is increased, for example, up to 3/4/5/6/7 bits.
- when t or t+1 is indicated through MAC-CE and triggering signaling, the MAC-CE indicates an association relationship between t or t+1 and the value of the information field that triggers the aperiodic signal in the triggering signaling, t is indicated through the association relationship and the value of the information field that triggers the aperiodic signal;
- when t or t+1 is indicated through RRC signaling and triggering signaling, the RRC signaling indicates an association relationship between t or t+1 and the value of the information field of triggering an aperiodic signal in the triggering signaling, t is indicated through the association relationship and the value indication t of the information field that triggers the aperiodic signal;
- the t or t+1 is indicated by using the parameter information of the channel carrying the triggering signaling;
- the association relationship between channel parameter information and t or t+1 is indicated through RRC signaling or MAC-CE.

In this embodiment, it should be noted that when indicating the t or t+1 through a triggering state of the aperiodic signal indicated by the triggering signaling, one or more of the following situations exist:

- when t or t+1 is indicated through the MAC-CE and the triggering signaling, the MAC-CE indicates an association relationship between t and the triggering state, and t is indicated through the association relationship and corresponding triggering state when the first signal is triggered;

when t or t+1 is indicated through RRC signaling and triggering signaling, the RRC signaling indicates an association relationship between t or t+1 and the triggering state, and t is indicated through the association relationship and the corresponding triggering state when the first signal is triggered.

In this embodiment, the t indicated by the configuration parameter of the first signal resource set includes any of the following: the association relationship between the type of the signal resource set indicated by RRC signaling or MAC-CE and t or t+1;

t corresponding to different usage types of signal resource sets is indicated in the triggering signaling.

In this embodiment, the triggering signaling directly indicates t or t+1 corresponding to different usage types of SRS resource sets. The following table 1 is an example: the SRS delay offset field in the triggering signaling is used to indicate the t corresponding to the different usage types of SRS resource sets.

TABLE 1

| SRS delay offset field | Delayed slots of SRS($1^{st}$ usage, $2^{nd}$ usage, $3^{rd}$ usage, $4^{th}$ usage) |
|---|---|
| 00 | 0, 0, 0, 0 |
| 01 | 0, 0, 1, 1 |
| 10 | 1, 1, 0, 0 |
| 11 | 1, 1, 1, 1 |

where the value "00" of the SRS delay offset field in the specific domain indicates that t corresponding to the SRS resource set whose usage type is $1^{st}$ usage is 0, t corresponding to the SRS resource set whose usage type is $2^{nd}$ usage is 0, and t corresponding to the SRS resource set whose usage type is $3^{rd}$ usage is 0, and t corresponding to the SRS resource set whose usage type is $4^{th}$ usage is 0;

"01" indicates that t corresponding to the SRS resource set whose usage type is $1^{st}$ usage is 0, t corresponding to the SRS resource set whose usage type is $2^{nd}$ usage is 0, t corresponding to the SRS resource set whose usage type is $3^{rd}$ usage is 1, and t corresponding to the SRS resource set whose usage type is $4^{th}$ usage is 1;

"10" indicates that t corresponding to the SRS resource set whose usage type is $1^{st}$ usage is 1, t corresponding to the SRS resource set whose usage type is $2^{nd}$ usage is 1, t corresponding to the SRS resource set whose usage type is $3^{rd}$ usage is 0, and t corresponding to the SRS resource set whose usage type is $4^{th}$ usage is 0;

"11" indicates that t corresponding to the SRS resource set whose usage type is $1^{st}$ usage is 1, t corresponding to the SRS resource set whose usage type is $2^{nd}$ usage is 1, and t corresponding to the SRS resource set whose usage type is $3^{rd}$ usage is 1, and t corresponding to the SRS resource set whose usage type is $4^{th}$ usage is 1.

In this embodiment, it should be noted that the above-mentioned association relationship is independently configured for each signal resource, or is independently configured for each signal resource set, or is a configuration mode that is independent of signal resources and signal resource sets.

Based on Contents of any of the Above Embodiments, in this Embodiment, the t or t+1 is Indicated Through at Least One of the Following Ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

In one embodiment, the triggering signaling is DCI, and the triggering signaling indicates t or t+1, and the t or t+1 is applicable to all signal resource sets triggered by the triggering signaling. For example, when SRS is triggered through DCI, there is also a slot offset information field in the DCI, which indicates a slot offset, and this slot offset is used in all SRS resource sets triggered by the DCI to indicate t or t+1 corresponding to themselves (t or t+1 corresponding to the SRS resource is t or t+1 corresponding to the SRS resource set in which it is located). For another example, when SRS is triggered through DCI, the SRS request information field used to trigger SRS in the DCI also indicates a slot offset, and all SRS resource sets triggered by the DCI use this slot offset to indicate t or t+1 corresponding to themselves. In one embodiment, the network device triggers a signal (for example, SRS) through a DCI, and transmits another DCI to indicate t or t+1 corresponding to the signal (or signal resource set) triggered by the DCI of the triggering signaling.

In this embodiment, it should be noted that, the network device independently indicates t or t+1 for each signal resource, and the UE independently determines the t or t+1 for each signal resource; that is, t corresponding to different signal resources or t+1 may be same or different. In one embodiment, t or t+1 of different signal resources are indicated independently; t or t+1 of different signal resources are jointly indicated. For example, the network device indicates a combination of t or t+1 of multiple signal resources. In one embodiment, the network device independently indicates t or t+1 for each signal resource set, and the UE independently determines the t or t+1 for each signal resource set; that is, t or t+1 corresponding to different signal resource sets may be same or different, t or t+1 corresponding to all signal resources in the same signal resource set are same. In one embodiment, t or t+1 of different signal resource sets are independently indicated; t or t+1 of different signal resource sets are jointly indicated. For example, the network device indicates a combination of t or t+1 of multiple signal resource sets. In one embodiment, the t or t+1 indicated by the network device is not directly related to the signal resource or the signal resource set, and the t or t+1 corresponding to all the signal resource sets/signal resources triggered by the same triggering signaling are same. In one embodiment, the triggering signaling indicates t or t+1 corresponding to the signal when triggering the signal, and the t or t+1 indicated by the triggering signaling is applicable to all signal resources sets triggered by the triggering signaling. For example, the signal is SRS, and the triggering signaling is DCI. When the DCI triggers the SRS, it indicates the t corresponding to the SRS, and the t or t+1 corresponding to all the SRS resource sets triggered by the DCI are same.

It can be understood that, as mentioned in the previous embodiments, when the first slot is determined based on at least one of the priority of the signal, uplink-downlink pattern configuration, the minimum time interval between the transmission of the triggering signaling and the signal, or the time window requirement between transmission of the triggering signaling and the signal, it may make determination based on one or more of the following items: ① uplink-downlink pattern configuration; ② time interval between the transmission of triggering signaling and the transmission of the signal; ③ time window requirement between the transmission of the triggering signaling and the signal; ④ priority of the signal. It can be understood that each item ①-④ has multiple implementations in subsequent embodiments, and the implementations under each item ①-④ can be freely combined and used. Some examples will be given below to illustrate individual or combination of the above items:

For Example, the First Slot May be any of the Following:

- If a slot includes at least one uplink or flexible symbol configured by high-layer signaling, the slot is the first slot;
- If the uplink and/or flexible symbols included in a slot include all time-domain symbols configured by the first signal resource in a slot, the slot is the first slot;
- If the uplink and/or flexible symbols included in a slot include time-domain symbols configured for all signal resources in the first signal resource set, the slot is the first slot;
- If the uplink and/or flexible symbols included in a slot include time-domain symbols configured for all signal resources in all resource sets triggered by the triggering signaling, the slot is the first slot;
- If a slot satisfies the first timing requirement, the slot is the first slot; the first timing requirement is: the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;
- If a slot satisfies the following conditions, the slot is the first slot: the time intervals between the symbol of the channel carrying the triggering signaling and the transmission symbol corresponding to all signal resources in the first signal resource set satisfy the first minimum timing requirement;
- If a slot satisfies the following conditions, the slot is the first slot: the time interval between the last symbol of the channel carrying the triggering signaling and the first symbol among symbols of all signal resources included in the first signal resource set satisfies the first minimum timing requirement;
- If a slot satisfies the following conditions, the time intervals between transmissions of the channel carrying the triggering signaling and transmissions of signals corresponding to all signal resource sets or all signal resources triggered by the triggering signaling satisfies the first minimum timing requirement;
- If a slot satisfies the following conditions, the slot is the first slot: the time interval between the last symbol of the channel carrying the triggering signaling and the first symbols among the symbols of all signal resource sets or signal resources triggered by the triggering signaling satisfies the first minimum timing requirement;
- If a slot includes at least one uplink or flexible symbol configured by high-layer signaling and satisfies the first timing requirement, the slot is the first slot; the first timing requirement is: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;
- If a slot includes at least one uplink or flexible symbol configured by high-layer signaling and satisfies the following conditions, the slot is the first slot: the time interval between the symbol of the channel carrying the triggering signaling and the symbol of the signal corresponding to all the signal resources of the first signal resource set satisfies the first minimum timing requirement;
- If a slot includes at least one uplink or flexible symbol configured by high-layer signaling and satisfies the following conditions, the slot is the first slot: the time interval between the last symbol of the channel carrying the triggering signaling and the first symbols among the symbols of the first signal resource of all signal resources included in the set satisfies the first minimum timing requirement;
- If a slot includes at least one uplink or flexible symbol configured by high-layer signaling and satisfies the following conditions, the slot is the first slot: the time interval between the transmission of the channel carrying the triggering signaling and the transmission of the signal corresponding to all signal resource sets or all signal resources triggered by the triggering signaling satisfies the first minimum timing requirement;
- If a slot includes at least one uplink or flexible symbol configured by high-layer signaling and satisfies the following conditions, the slot is the first slot: the time interval between the last symbol of the channel carrying the triggering signaling and the first symbol among the symbols of all signal resource sets or signal resources triggered by the triggering signaling satisfies the first minimum timing requirement;
- If the uplink and/or flexible symbols included in a slot include all time-domain symbols configured by the first signal resource in a slot and satisfy the first timing requirement, the slot is the first slot; the first timing requirement is: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;
- If the uplink and/or flexible symbols included in a slot include all the time-domain symbols configured in the first signal resource in a slot, and the following conditions are satisfied, the slot is the first slot: the time interval between the symbol of the channel carrying the triggering signaling and the symbol of the signal corresponding to all signal resources included in the first signal resource set satisfies the first minimum timing requirement;
- If the uplink and/or flexible symbols included in a slot include all the time-domain symbols configured in the first signal resource in a slot, and the following conditions are satisfied, the slot is the first slot: the time interval between the last symbol of the channel carrying the triggering signaling and the first symbol among symbols of all signal resources included in the first signal resource set satisfies the first minimum timing requirement;
- If the uplink and/or flexible symbols included in a slot include all the time-domain symbols configured in the first signal resource in a slot, and the following conditions are satisfied, the slot is the first slot: the time interval between the transmission of the channel carrying the triggering signaling and the transmission of the signal corresponding to all signal resource sets or all signal resources triggered by the triggering signaling satisfies the first minimum timing requirement;

If the uplink and/or flexible symbols included in a slot include all the time-domain symbols configured in the first signal resource in a slot, and the following conditions are satisfied, the slot is the first slot: the time interval between the last symbol of the channel carrying the triggering signaling and the first symbol among symbols of all signal resource sets or signal resources triggered by the triggering signaling satisfies the first minimum timing requirement;

If the uplink and/or flexible symbols included in a slot include time-domain symbols configured for all signal resources in the first signal resource set and satisfy the first timing requirement, the slot is the first slot; the first timing requirement is: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;

the time interval between the symbol of the channel carrying the triggering signaling and the symbol of the first signal resource refers to the time interval between the last symbol of the channel carrying the triggering signaling and the first symbol of the signal;

If the uplink and/or flexible symbols included in a slot include time-domain symbols configured for all signal resources in the first signal resource set, and the following conditions are satisfied, the slot is the first slot: the time interval between the symbol of the channel carrying the triggering signaling and the symbol of the signal corresponding to all signal resources included in the first signal resource set satisfies the first minimum timing requirement;

If the uplink and/or flexible symbols included in a slot include time-domain symbols configured for all signal resources in the first signal resource set, and the following conditions are satisfied, the slot is the first slot: the time interval between the last symbol of the channel carrying the triggering signaling and the first symbol among symbols of all signal resources included in the first signal resource set satisfies the first minimum timing requirement;

If the uplink and/or flexible symbols included in a slot include time-domain symbols configured for all signal resources in the first signal resource set, and the following conditions are satisfied, the slot is the first slot: the time interval between the transmission of the channel carrying the trigger the signaling and the transmission of the signal corresponding to all signal resource sets/all signal resources triggered by the triggering signaling satisfies the first minimum timing requirement;

If the uplink and/or flexible symbols included in a slot include time-domain symbols configured for all signal resources in the first signal resource set, and the following conditions are satisfied, then the slot is the first slot: the time interval between the last symbol of the channel carrying the triggering signaling and the first symbol among symbols of all signal resource sets or signal resources triggered by the triggering signaling satisfies the first minimum timing requirement;

If the uplink and/or flexible symbols included in a slot include time-domain symbols configured for all signal resources in all resource sets triggered by the triggering signaling and satisfy the first timing requirement, then the slot is the first slot; the first timing requirement is: the time interval between the symbol of the channel carrying the triggering signaling and the symbol of the first signal resource is not less than the first minimum timing requirement; or the time interval between the symbol of the channel carrying the triggering signaling and the symbol of the first signal resource is greater than the first minimum timing requirement;

If the uplink and/or flexible symbols included in a slot include time-domain symbols configured for all signal resources in all resource sets triggered by the triggering signaling, and the following conditions are satisfied, then the slot is the first slot: the time interval between the symbol of the channel carrying the triggering signaling and the symbol of the signal corresponding to all the signal resources in the first signal resource set satisfies the first minimum timing requirement;

If the uplink and/or flexible symbols included in a slot include time-domain symbols configured for all signal resources in all resource sets triggered by the triggering signaling, and the following conditions are satisfied, then the slot is the first slot: the time interval between the last symbol of the channel carrying the triggering signaling and the first symbol among symbols of all signal resources included in the first signal resource set satisfies the first minimum timing requirement;

If the uplink and/or flexible symbols included in a slot include time-domain symbols configured for all signal resources in all resource sets triggered by the triggering signaling, and the following conditions are satisfied, then the slot is the first slot: the time interval between the symbol of the channel carrying the triggering signaling and the symbol of the signal corresponding to all signal resources in the first signal resource set satisfies the first minimum timing requirement;

If the uplink and/or flexible symbols included in a slot include time-domain symbols configured for all signal resources in all resource sets triggered by the triggering signaling, and the following conditions are satisfied, then the slot is the first slot: the time interval between the last symbol of the channel carrying the triggering signaling and the first symbol among symbols of all signal resource sets or signal resources triggered by the triggering signaling satisfies the first minimum timing requirement.

The schemes described in the above-mentioned embodiments are explained and described below through several specific examples. In the following example, the triggering signaling is DCI and the signal is SRS for schematic illustration, but it is not limited to the case where the trigger command is DCI and the signal is SRS.

Example 1

The network device transmits DCI (triggering signaling) to the terminal to trigger the terminal to transmit SRS;

The network device indicates the transmission location of the signal in the following manner through the DCI:

The network device indicates the t or t+1 through the DCI, and the transmission location of the signal is the t+1 first slot counting from slot n.

In one embodiment, the included uplink symbols and/or downlink symbols cover slots of symbols of all SRS resources included in all SRS resource sets triggered by the DCI.

Where the indicating the t or t+1 through the DCI includes: through the indication information of the DCI, selecting a value from the multiple slot offset configured for the SRS resource set corresponding to the SRS by RRC signaling or MAC-CE and using that value as an indication value of the t or t+1.

Example 2

The network device transmits DCI (triggering signaling) to the terminal to trigger the terminal to transmit SRS;

The network device indicates the transmission location of the signal in the following manner through the DCI:

The t or t+1 is indicated by the DCI, and the transmission location of the signal is the t+1 first slot counting from slot n.

In one embodiment, the first slot is a slot in which uplink symbols and/or downlink symbols cover symbols of all SRS resources included in all SRS resource sets triggered by the DCI.

Where the indicating the t or t+1 through the DCI includes: the value of t is the slot offset indicated by the DCI applicable to all SRS resource sets triggered by the DCI plus the slot offset configured for the SRS resource set corresponding to the SRS by RRC signaling or MAC-CE.

Example 3

The network device transmits configuration information about the SRS signal resource set to the terminal, where the configuration information includes the configuration of the slot offset;

The network device transmits DCI (triggering signaling) to the terminal to trigger the terminal to transmit SRS;

The network device indicates the transmission location of the signal through the DCI in the following manner:

the slot at which the DCI is located, and the slot at which the DCI is located is added by the slot offset configured by the network device in the configuration information about the SRS resource set corresponding to the SRS (the SRS resource set through which the DCI triggers the SRS) to obtain a reference slot, where the $(t+1)^{th}$ first slot counting from the slot (reference slot) is the transmission location of the signal, and the t or t+1 is indicated through the DCI.

In one embodiment, the first slot is a slot in which uplink symbols and/or downlink symbols cover symbols of all SRS resources included in all SRS resource sets triggered by the DCI.

In one embodiment, the first slot is a slot in which the included uplink symbols and/or downlink symbols cover symbols of all SRS resources included in the SRS resource set through which the DCI triggers the SRS resources.

Where the indicating the t or t+1 through the DCI includes: indicating the t or t+1 through a value of an information field in the DCI. In one embodiment, the information field is a different field from the SRS request field that triggers the SRS signal. In one embodiment, the information field is same field as the SRS request field that triggers the SRS signal.

Example 4

The network device transmits configuration information about the SRS signal resource set to the terminal, where the configuration information includes the configuration of the slot offset;

The network device transmits DCI (triggering signaling) to the terminal to trigger the terminal to transmit SRS;

The Network Device Indicates the Transmission Location of the Signal Through the DCI in the Following Manner:

the slot at which the DCI is located, and the slot at which the DCI is located is added by the slot offset configured by the network device in the configuration information about the SRS resource set corresponding to the SRS (the SRS resource set through which the DCI triggers the SRS) to obtain a reference slot, where the $(t+1)^{th}$ slot counting from the slot (reference slot) is the transmission location of the signal, and the t or t+1 is indicated through the DCI.

Where the indicating the t or t+1 through the DCI includes: indicating the t or t+1 through a value of an information field in the DCI. In one embodiment, the information field is a different field from the SRS request field that triggers the SRS signal. In one embodiment, the information field is same field as the SRS request field that triggers the SRS signal.

Example 5

The network device transmits configuration information about the SRS signal resource set to the terminal, where the configuration information includes the configuration of the slot offset;

The network device transmits DCI (triggering signaling) to the terminal to trigger the terminal to transmit SRS;

The Network Device Indicates the Transmission Location of the Signal Through the DCI in the Following Manner:

the slot at which the DCI is located, and the slot at which the DCI is located is added by a slot offset selected by the DCI from slot offset configured by the network device in the configuration information about the SRS resource set corresponding to the SRS (the SRS resource set through which the DCI triggers the SRS) to obtain a reference slot, where the $(t+1)^{th}$ slot counting from the slot (reference slot) is the transmission location of the signal, and the t or t+1 is indicated through the DCI.

Where the indicating the t or t+1 through the DCI includes: indicating the t or t+1 through a value of an information field in the DCI. In one embodiment, the information field is a different field from the SRS request field that triggers the SRS signal. In one embodiment, the information field is same field as the SRS request field that triggers the SRS signal.

Example 6

The network device configures a slot offset for the signal resource set of the signal (the signal resource set through which the signal is triggered by the triggering signaling) through RRC signaling and/or MAC-CE, and may set the slot offset as the first slot offset. In one embodiment, when there are multiple signal resource sets in the system, the network device may independently configure the slot offset for each signal resource set. Taking the triggering signaling that triggers the signal as DCI as an example, it is assumed that the triggering signaling triggers two SRS resource sets at the same time, and the two SRS resource sets are set 1 and set 2 respectively. The slot offset configured by the network device for set 1 is s1, and the slot offset configured for set 2 is s2.

The triggering signaling that triggers the signal is transmitted to the terminal. The triggering signaling indicates their corresponding slot offset for the signal resources set triggered by the triggering signaling. The slot offset indicated by the triggering signaling for the signal resource set may be expressed as a second slot offset. In one embodiment, the triggering signaling indicates the same slot offset for all signal resource sets triggered by the triggering signaling. For example, the information field used to indicate the second slot offset in the triggering signaling is indicated by 2 bits, which includes 4 states, and the second slot offset corresponding to these 4 states are 0, 1, 2, 3, as shown in Table 2 below:

TABLE 2

| a state of the information field used to indicate the second slot offset | the second slot offset |
|---|---|
| 0 | 0 |
| 1 | 1 |
| 2 | 2 |
| 3 | 3 |

Before the triggering signaling is transmitted, the time-domain transmission location of the signal is indicated. In one embodiment, the time-domain transmission location of the signal resource set triggered by the triggering signaling is indicated.

The time-domain transmission location of the signal is indicated through the slot offset configured for the signal resource set of the signal by RRC signaling and/or MAC-CE and the second slot offset indicated by the triggering signaling. In one embodiment, the indicating the time-domain transmission location of the signal through the slot offset configured for the signal resource set of the signal by RRC signaling and/or MAC-CE and the second slot offset indicated by the triggering signaling, which includes: indicating the slot at which the signal is located through the first slot offset configured by RRC signaling and/or MAC-CE and the second slot offset indicated by the triggering signaling.

In one embodiment, for each set of signal resources triggered by the triggering signaling, the time-domain transmission location of the signal resource set (that is, the time-domain transmission location of the signal corresponding to the signal resource set) is indicated through the first slot offset configured by RRC signaling and/or MAC-CE and the second slot offset indicated by the triggering signaling. In one embodiment, the indicating the time-domain transmission location of the signal resource set through the first slot offset configured by RRC signaling and/or MAC-CE and the second slot offset indicated by the triggering signaling, includes: indicating the slot at which the signal resource set is located through the first slot offset configured by RRC signaling and/or MAC-CE and the second slot offset indicated by the triggering signaling.

In one embodiment, the indicating the slot at which the signal is located includes indicating the slot at which the signal is located in the following manner:

It is indicated that the slot offset of the signal relative to the reference slot is determined by a first function on the first slot offset and a second function on the second slot offset. The first function is expressed as RRC(•), the second function on the second slot offset is expressed as f(•). Assumed that the first slot offset and the second slot offset corresponding to the signal resource set corresponding to the signal are s and k respectively, then the slot offset of the signal relative to the reference slot is: RRC(s)+f(k). Where the first function on the offset value of the first slot may be a function including the concept of the first slot, or other functions. For example, RRC(s) represents the slot offset corresponding to the s first slots. The second function on the offset value of the second slot may be a configuration table, an association relationship, a function including the concept of the first slot, or other functions. In one embodiment, f(k)=k. In one embodiment, RRC(s)=s.

In one embodiment, the indicating the slot at which a signal resource set is located includes indicating the slot at which the signal resource set is located in the following manner:

It is indicated that a slot offset of a signal resource set relative to a reference slot is determined by a first function on the first slot offset and a second function on the second slot offset. The first function is expressed as RRC(•), the second function on the second slot offset is expressed as f(•). Assumed that the first slot offset and the second slot offset corresponding to a signal resource set are s and k respectively, then the slot offset of the signal relative to the reference slot is: RRC(s)+f(k). Where the first function on the offset value of the first slot may be a function including the concept of the first slot, or other functions. For example, RRC(s) represents the slot offset corresponding to the s first slots. The second function on the offset value of the second slot may be a configuration table, an association relationship, a function including the concept of the first slot, or other functions. In one embodiment, f(k)=k. In one embodiment, RRC(s)=s.

In one embodiment, the second slot offset corresponding to the multiple signal resource sets triggered by the triggering signaling are same.

In one embodiment, the first functions corresponding to the multiple signal resource sets triggered by the triggering signaling are same, but the second functions are different. For example, for set 1, the second function on the second slot offset is f1(•), for set 2, the second function on the second slot offset is f2(•), f1(•) is not equal to f2(•). For example, f1(•) and f2(•) are different configuration tables, both f1(•) and f2(•) are functions on the first slot, but the first slots for them are different. Then even if the second slot offset corresponding to set 1 and set 2 are both k, the slot offset of set 1 relative to the reference slot is: RRC(s1)+f1(k), and the slot offset of set 2 relative to the reference slot is: RRC(s2)+f2(k).

In one embodiment, the first functions corresponding to the multiple signal resource sets triggered by the triggering signaling are same, and the second functions are also same. For example, for set 1, the second function on the second slot offset is f1(•), for set 2, the second function on the second slot offset is f2(•), f1(•) is equal to f2(•). Then if the second slot offset corresponding to set 1 and set 2 are both k, the slot offset of set 1 relative to the reference slot is: RRC(s1)+f1(k), and the slot offset of set 2 relative to the reference slot is: RRC(s2)+f2(k), f1(k)=f2(k).

In one embodiment, the first function and the second function corresponding to the signal resource sets triggered by the triggering signaling are different.

In one embodiment, in this example, the reference slot is a slot for transmitting the triggering signaling.

In one embodiment, the first function is specified in the protocol.

In one embodiment, the second function is specified in the protocol. In one embodiment, the second function is indicated by the network device through signaling such as MAC-CE.

Example 7

The network device configures the slot offset for the signal resource set of the signal through RRC signaling and/or MAC-CE, and may set the slot offset as the first slot offset. In one embodiment, when there are multiple signal resource sets in the system, the network device may independently configure the slot offset for each signal resource set. Taking the triggering signaling that triggers the signal as DCI as an example, it is assumed that the triggering signaling triggers two SRS resource sets at the same time, and the two SRS resource sets are set 1 and set 2 respectively.

In one embodiment, for a signal resource set, the network device configures one or more slots offset for it. For example, the slot offset configured by the network device for set 1 are s11, s12, s13, and s14, and the slot offset configured for set 2 are s21, s22, s23, and s24. Note that when there are multiple signal resource sets, the number of slot offset configured for different signal resource sets may be same or different.

The network device transmits the triggering signaling to the terminal to trigger the transmission or reception of the signal, and the triggering signaling may select a slot offset from the slot offset configured by the network device for the signal resource set triggered by the triggering signaling. For example, the triggering signaling includes a slot offset information field, and each state of the information field represents a selection mode. For example, the triggering signaling includes a slot offset information field, which is indicated by 2 bits, and includes 4 states, and the slot offset corresponding to the two signal resource sets corresponding to these 4 states are shown in Table 3 below Show:

TABLE 3

| a state of the information field of slot offset | the selected slot offset |
| --- | --- |
| 0 | the first slot offset corresponding to respective signal resource set |
| 1 | the second slot offset corresponding to respective signal resource set |
| 2 | the third slot offset corresponding to respective signal resource set |
| 3 | the fourth slot offset corresponding to respective signal resource set |

The network device indicates the time-domain transmission location of the signal through the slot offset configured for the signal resource set of the signal by RRC signaling and/or MAC-CE and the information field used to select the slot offset in the triggering signaling. In one embodiment, the network device indicating the time-domain transmission location of the signal through the first slot offset configured by RRC signaling and/or MAC-CE and the second slot offset indicated by the triggering signaling, includes: the network device indicating the slot at which the signal is located through the first slot offset configured by RRC signaling and/or MAC-CE and the second slot offset indicated by the triggering signaling.

In one embodiment, for each set of signal resources triggered by the triggering signaling, the network device indicates the time-domain transmission location of the signal resource set (that is, the time-domain transmission location of the signal corresponding to the signal resource set) through the first slot offset configured by RRC signaling and/or MAC-CE and the information filed used to select the slot offset in triggering signaling. In one embodiment, the network device indicates the signal resource set through the first slot offset configured by RRC signaling and/or MAC-CE and the information filed used to select the slot offset in triggering signaling, includes: the network device indicates the slot at which the signal resource set is located through the first slot offset configured by RRC signaling and/or MAC-CE and the information field used to select the slot offset in the triggering signaling.

In one embodiment, the network device indicating the slot at which the signal is located includes the network device indicating the slot at which the signal is located in the following manner:

The network device indicates that the slot offset of the signal relative to the reference slot is a function of the first slot offset selected by the triggering signaling. This function is expressed as RRC(•). Assumed that the first slot offset selected by the triggering signaling for the signal resource set corresponding to the signal is s, then the slot offset of the signal relative to the reference slot is: RRC(s). Where the first function on the offset value of the first slot may be a function including the concept of the first slot, a mapping relationship, or other functions. For example, RRC(s) represents the slot offset corresponding to the s first slots. In one embodiment, RRC(s)=s.

In one embodiment, the network device indicating the slot at which a signal resource set is located includes the network device indicating the slot at which the signal resource set is located in the following manner:

The network device indicates that a slot offset of a signal resource set relative to a reference slot is a first function of the first slot offset selected for the signal resource set by the triggering signaling. The first function may be a function including the concept of the first slot, may be a mapping relationship, or other functions. For example, RRC(s) represents the slot offset corresponding to the s first slots. In one embodiment, RRC(s)=s.

In one embodiment, the first slot offset corresponding to the multiple signal resource sets triggered by the triggering signaling are in the same position of slot offset lists configured by the network device for these signal resource sets through RRC signaling or MAC-CE. For example, the first slot offset selected by state 0 of the triggering signaling for set 1 is $s_{11}$, and the first slot offset selected by state 0 of the triggering signaling for set 2 is $s_{21}$. Then the transmission slots of set 1 and set 2 are RRC($s_{11}$) and RRC($s_{21}$) respectively.

In one embodiment, the first functions corresponding to the multiple signal resource sets triggered by the triggering signaling are same or different.

In one embodiment, in this example, the reference slot is a slot for transmitting the triggering signaling.

In one embodiment, the first function is specified in the protocol.

In one embodiment, the second function is specified in the protocol. In one embodiment, the second function is indicated by the network device through signaling such as MAC-CE.

Since the method provided in this embodiment is similar in principle to the above signal transmission method on the terminal device side, the specific content will not be described in detail, and for specific description or distance, refer to the explanation of the above embodiment.

The present application will be described in detail below through specific examples.

The following uses Solution 1 as an example to describe the embodiment, and other schemes are similar.

Solution 1: the base station transmits configuration information of the SRS resource set to the UE, and the configuration information includes a slot offset corresponding to the SRS resource set.

The base station transmits DCI signaling to the UE in slot n to trigger the UE to transmit aperiodic SRS resources. The DCI signaling triggers the UE to transmit SRSs corresponding to M of SRS resource sets (M is an integer being greater than or equal to 1). In one embodiment, the DCI signaling may be DCI format 0_1, DCI format 0_2, DCI format 1_1, DCI format 1_2, or DCI format 2_3, etc. Assumed that the M of SRS resource sets triggered by the DCI are expressed as $S_k$, $k \in \{1, \ldots, M\}$.

After receiving the DCI signaling, the UE determines the reference slots of the M of SRS resource sets triggered by the DCI.

In one embodiment, the reference slot is a slot for transmitting the DCI, that is, slot n.

In one embodiment, the reference slot is a slot determined by the UE based on a slot offset in the configuration information of the SRS resource set. Assumed that the slot offset configured in the configuration information of the SRS resource set $S_k$ is $s_k$. In one embodiment, the UE determines that the reference slot of the SRS resource set $S_k$ is the $s_k^{th}$ slot counting from the slot n where the DCI is located, that is, $$\left\lfloor n\frac{2^{\mu}SRS}{2^{\mu}PDCCH}\right\rfloor + s_k,$$

$\mu_{SRS}$ and $\mu_{PDCCH}$ are respectively the SRS resource set and the numerology of the PDCCH carrying the DCI. As a special case, if there are no multiple numerologies in the system, the UE may use the reference slots corresponding to respective SRS resource sets calculated based on the formula $n+s_k$.

In one embodiment, the reference slot is a slot determined by the UE based on MAC-CE and/or DCI signaling.

The UE determines t corresponding to respective SRS resource sets triggered by DCI; or the UE determines t corresponding to respective SRS resource in respective SRS resource sets triggered by DCI. In one embodiment, t corresponding to all SRS resource sets are same. In one embodiment, t corresponding to the SRS resources in the same SRS resource set are same or different. In one embodiment, the t corresponding to different SRS resource sets are different, so the t corresponding to the SRS resource set $S_k$ may be expressed as $t_k$.

When the $t/t_k$ is available, it is confirmed explicitly or implicitly based on the DCI (various methods described above), and may also be determined through MAC-CE, RRC signaling, and the like.

The UE determines the transmission slot of the SRS resource set $S_k$.

In one embodiment, the UE determines that the transmission slot of the SRS resource set $S_k$ is the $(t+1)^{th}$ slot counting from the reference slot (t corresponding to different SRS resource sets triggered by DCI may be different). The UE determines whether $S_k$ may be transmitted in this slot, and if it may be transmitted, the SRS corresponding to $S_k$ is transmitted. An example is shown in FIG. 4. In FIG. 4, D represents a downlink slot, and U represents an uplink slot. The reference slots of $S_1$ and $S_2$ in FIG. 4 are both slot n, and their corresponding $t_1$ and $t_2$ are 1 and 2 respectively. Since the slot n+2 is an uplink slot, SRS transmission may be performed, and the UE transmits the SRS corresponding to $S_1$ in the slot n+2. Since slot n+3 is a downlink slot, SRS transmission cannot be performed, and the UE does not perform SRS transmission corresponding to the SRS resource set $S_2$.

In one embodiment, the UE determines that the transmission slot of the SRS resource set $S_k$ is the $(t+1)^{th}$ slot counting from the reference slot (t corresponding to different SRS resource sets triggered by DCI is same). The UE determines whether $S_k$ may be transmitted in this slot, and if it may be transmitted, the SRS corresponding to $S_k$ is transmitted. An example is shown in FIG. 5. The reference slots of $S_1$ and $S_2$ in FIG. 5 are slot n+2 and slot n+3 respectively, and t=3. Since slot n+7 is an uplink slot, SRS transmission may be performed, and the UE performs SRS transmission corresponding to $S_2$ in slot n+7. Since slot n+6 is a downlink slot, SRS transmission cannot be performed, and the UE does not perform SRS transmission corresponding to the SRS resource set $S_1$.

In one embodiment, the UE determines that the transmission slot of the SRS resource set $S_k$ is the $(t+1)^{th}$ first slot counting from the reference slot (t corresponding to different SRS resource sets triggered by DCI is same). The UE determines whether $S_k$ may be transmitted in this slot, and if it may be transmitted, the SRS corresponding to $S_k$ is transmitted.

Figure 6:
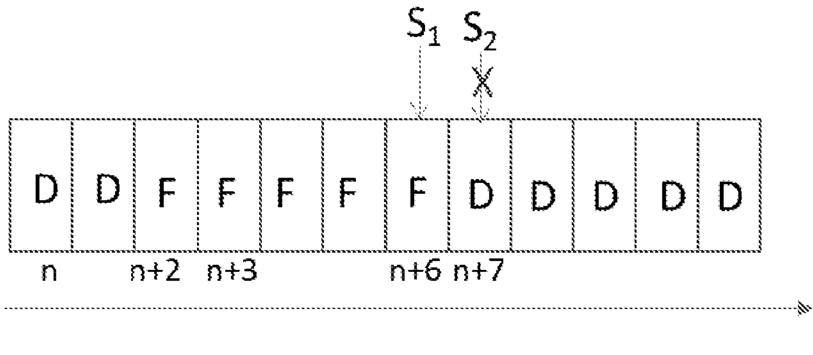
FIG. 6 is a third schematic diagram of the UE determining the transmission slot of the SRS resource set $S_k$ according to an embodiment of the present application.

In one embodiment, the first slot refers to a slot including at least one uplink symbol or flexible symbol configured by high-layer signaling. An example is shown in FIG. 6. In FIG. 6, D represents a downlink slot, U represents an uplink slot, and F represents a flexible slot. The reference slots of $S_1$ and $S_2$ in FIG. 6 are slot n+2 and slot n+3 respectively, and t=3. The slot n+6 is a flexible slot including uplink symbols, which is the first slot, and the UE transmits the SRS corresponding to $S_1$ in the slot n+6. Since slot n+7 is a downlink slot, SRS transmission cannot be performed, and the UE does not perform SRS transmission corresponding to the SRS resource set $S_2$. In this embodiment, it is possible that the uplink symbols included in slot n+6 cannot satisfy the requirements of $S_1$. For example, $S_1$ needs to be transmitted on the last two symbols of a slot, but only the last symbol of slot n+6 can perform uplink transmission, so $S_1$ can only transmit one symbol, or not.

Figure 7:
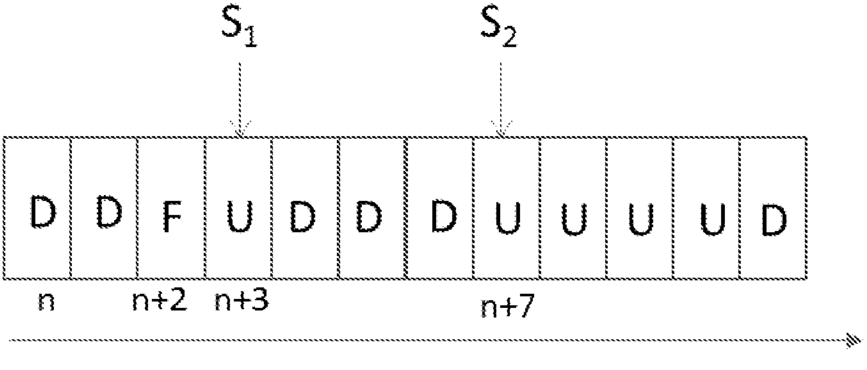
FIG. 7 is a fourth schematic diagram of the UE determining the transmission slot of the SRS resource set $S_k$ according to an embodiment of the present application.

The first slot refers to another example of a slot that includes at least one uplink symbol or flexible symbol configured by higher layer signaling, as shown in FIG. 7. In FIG. 7, D represents a downlink slot, U represents an uplink slot, and F represents a flexible slot. The reference slots of $S_1$ and $S_2$ in FIG. 7 are both slot n, and their corresponding $t_1$ and $t_2$ are 1 and 2 respectively. Since the $t_1+1=2$ first slot counting from slot n is slot n+3, and the $t_1+1=3$ first slot is slot n+7, the transmission slot corresponding to $S_1$ and $S_2$ are slot n+3 and slot n+7 respectively, and the UE respectively transmits the SRS corresponding to $S_1$ and $S_2$ in slot n+3 and slot n+7.

In this embodiment, it should be noted that examples of other definitions of the first slot will not be illustrated one by one.

It should be noted that the base station determines the actual transmission slot of the SRS of each SRS resource and/or SRS resource set in the same manner, and receives the SRS in the slot.

As can be seen, through the method of this solution, the UE can delay and transmit the SRS triggered by the DCI, to increase the opportunity of SRS transmission and increasing the flexibility of aperiodic SRS scheduling and transmission.

In the above embodiments, the signal resources set triggered by the triggering signaling refers to the signal resources set triggered by the triggering signaling with the same signal type as the signal, and the signal resources triggered by the triggering signaling refer to the signal resources set triggered by the triggering signaling with the same signal type as the signal. For example, if the signal is an SRS, the signal resources set triggered by the triggering signaling refers to the set of SRS signal resources triggered by the triggering signaling, and the signal resources triggered by the triggering signaling refer to the SRS signal resources triggered by the triggering signaling. For another example, if the signal is a CSI-RS, the signal resource set triggered by the triggering signaling refers to the CSI-RS signal resource sets triggered by the triggering signaling, and the signal resource triggered by the triggering signaling refers to the CSI-RS signal resources triggered by the triggering signaling.

In the foregoing embodiments, the symbols of the signal resource set may be understood as the symbols of all the signal resources included in the signal resources.

Figure 8:
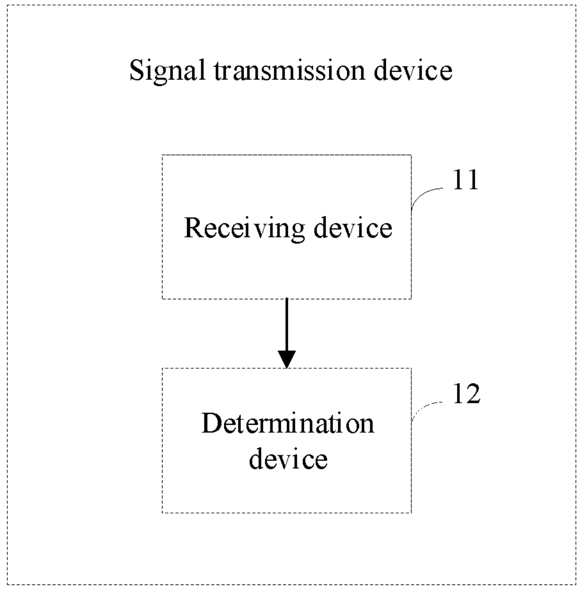
FIG. 8 is a block diagram of a signal transmission device applied to a terminal device according to an embodiment of the present application.

In addition, as shown in FIG. 8, it is a block diagram of a signal transmission device applied to a terminal device in the embodiment of the present application, and the device includes:

- a receiving device 11, which is configured to receive triggering signaling for triggering to transmit or receive a signal;
- a determination device 12, which is configured to determine the transmission location of the signal based on at least one of the priority of the signal, uplink-downlink pattern configuration, minimum time interval requirement between transmission of triggering signaling and the signal, or the time window requirement between transmission of the triggering signaling and the signal.

Based on the content of any of the foregoing embodiments, in this embodiment, the signal is transmitted at the transmission location.

Based on contents of any of the above embodiments, in this embodiment, the determining device is further configured to: determine the transmission location of the signal based on the priority of the signal, which includes:

- determining a first transmission location of the signal, where when the first transmission location overlaps with transmission locations of other signals having a higher priority than the signal in time domain, an actual transmission location of the signal is a transmission location where no overlapping occurs in time domain in the first transmission location.

Based on Contents of any of the Above Embodiments, in this Embodiment, the Determining Device is Further Configured to:

- determine the first slot based on at least one of the priority of the signal, uplink-downlink pattern configuration, minimum time interval requirement between transmission of the triggering signaling and the signal, or time window requirement between transmission of the triggering signaling and the signal;
- determine the $(t+1)^{th}$ first slot counting from a reference slot as the transmission location of the signal, where t is a non-negative integer.

Based on contents of any of the above embodiments, in this embodiment, determining the first slot based on the uplink-downlink pattern configuration includes:

- determining that an uplink symbol and/or flexible symbol included in the first slot includes all symbols of the signal resource corresponding to the signal; or
- determining that a downlink symbols and/or flexible symbols included in the first slot includes all symbols of the signal resource corresponding to the signal.

Based on contents of any of the above embodiments, in this embodiment, the uplink symbols and/or flexible symbols included in the first slot including all symbols of the signal resource corresponding to the signal, includes:

- the uplink symbol and/or flexible symbol included in the first slot includes all symbols of all signal resources included in a signal resource set, where the triggering signaling triggers the signal through the signal resource set.

Based on contents of any of the above embodiments, in this embodiment, the uplink symbol and/or flexible symbol included in the first slot including all symbols of all signal resources included in the signal resource set through which the triggering signaling triggers the signal, includes:

- the uplink symbol and/or flexible symbol included in the first slot includes all symbols of all signal resources included in the signal resource set, where the triggering signaling triggers the signal through the signal resource set.

Based on contents of any of the above embodiments, in this embodiment, the downlink symbol and/or flexible symbol included in the first slot including all symbols of the signal resource corresponding to the signal, includes:

- the downlink symbol and/or flexible symbol included in the first slot includes all symbols of all signal resources included in a signal resource set, where the triggering signaling triggers the signal through the signal resource set.

Based on contents of any of the above embodiments, in this embodiment, the downlink symbol and/or flexible symbol included in the first slot including all symbols of all signal resources included in the signal resource set through which the triggering signaling triggers the signal, includes:

- the downlink symbol and/or flexible symbol included in the first slot includes all symbols of all signal resources included in the signal resource set through which the triggering signaling triggers the signal.

Based on Contents of any of the Above Embodiments, in this Embodiment, the Reference Slot Includes at Least One of the Followings:

- the slot at which the triggering signaling is located;
- a slot determined based on the slot at which the triggering signaling is located and a slot offset configured by the network device for the signal resource set triggered by the triggering signaling through radio resource control (RRC) signaling;
- a slot determined based on the slot offset indicated by medium access control-control element (MAC-CE); or
- a slot determined based on the slot offset indicated by the triggering signaling.

Based on contents of any of the above embodiments, in this embodiment, the t or t+1 is determined through at least one of the following ways:

- determining the t or t+1 based on a dedicated information field in the triggering signaling;

determining the t or t+1 based on the information field of triggering an aperiodic signal in the triggering signaling; or determining the t or t+1 based on a triggering state of the aperiodic signal indicated by the triggering signaling.

The device is further configured to: determine the t or t+1 based on the indication information, when the triggering signaling includes indication information selected from a group of candidate values indicated by MAC-CE and/or RRC signaling.

Based on contents of any of the above embodiments, in this embodiment, the device is configured to: determine the t or t+1 based on the information field of triggering an aperiodic signal in the triggering signaling, which includes:

determine the t based on the value of the information field that triggers the signal in the triggering signaling and an association relationship between t indicated by the MAC-CE and/or RRC signaling and the value of the information field that triggers the signal in the triggering signaling; or determine the t+1 based on the value of the information field that triggers the signal in the triggering signaling and an association relationship between t+1 indicated by the MAC-CE and/or RRC signaling and the value of the information field that triggers the signal in the triggering signaling; or determine the t based on an association relationship between t indicated by the MAC-CE and/or RRC signaling and the triggering state indicated by the information field that triggers the signal in the triggering signaling and the triggering state; or determine the t+1 based on an association relationship between t+1 indicated by the MAC-CE and/or RRC signaling and the triggering state indicated by the information field that triggers the signal in the triggering signaling and the triggering state.

Based on Contents of any of the Above-Mentioned Embodiments, in this Embodiment, the Device is Configured to:

determine the t based on an association relationship between a type of the signal resource set triggered by the triggering signaling and t, or determine the t+1 based on an association relationship between a type of the signal resource set triggered by the triggering signaling and t+1; and/or determine the t or t+1 based on a slot offset selected by the triggering signaling from multiple slot offset indicated by the MAC-CE and/or RRC signaling and another slot offset indicated by the triggering signaling Based on contents of any of the above embodiments, in this embodiment, the t or t+1 is indicated through at least one of the following ways:

independently indicating t or t+1 of different signal resources triggered by the triggering signaling;

jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

It should be noted herein that this device may perform all the method of the embodiment of the signal transmission method applied to the terminal device and achieve the same effect, which will not be repeated here.

Figure 9:
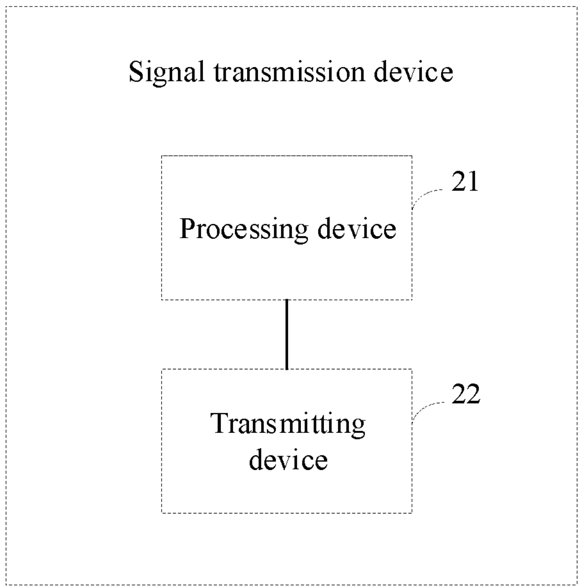
FIG. 9 is a block diagram of a signal transmission device applied to a network device according to an embodiment of the present application.

In addition, as shown in FIG. 9, it is a block diagram of a signal transmission device applied to a network device in the embodiment of the present application, and the device includes:

a processing device 21, which is configured to determine transmission location of a signal based on at least one of a priority of the signal, uplink-downlink pattern configuration, minimum time interval requirement between transmission of triggering signaling and the signal, or the time window requirement between transmission of the triggering signaling and the signal;

a transmitting device 22, which is configured to transmit triggering signaling, and the triggering signaling is a signaling that triggers to transmit or receive the signal, and the triggering signaling is associated with the transmission location of the signal.

Based on the content of any of the foregoing embodiments, in this embodiment, the signal is transmitted at the transmission location.

Based on the contents of any of the above embodiments, in this embodiment, the transmission location of the triggering signaling has an association relationship with the transmission location of the signal; the content carried in the triggering signaling has an association relationship with the transmission location of the signal.

Based on contents of any of the above embodiments, in this embodiment, the processing device is further configured to: determine the transmission location of the signal based on the priority of the signal, which includes:

determining a first transmission location of the signal, and when the first transmission location overlaps with transmission locations of other signals having a higher priority than the signal in time domain, an actual transmission location of the signal is a transmission location where no overlapping occurs in time domain in the first transmission location.

Based on Contents of any of the Above Embodiments, in this Embodiment, the Processing Device is Further Configured to:

determine a first slot based on at least one of the priority of the signal, uplink-downlink pattern configuration, minimum time interval requirement between transmission of the triggering signaling and the signal, or time window requirement between transmission of the triggering signaling and the signal;

where the transmission location of the signal is the $(t+1)^{th}$ first slot counting from a reference slot, and t is a non-negative integer.

Based on contents of any of the above embodiments, in this embodiment, the determining the first slot based on the uplink-downlink pattern configuration includes:

determining that the uplink symbol and/or flexible symbol included in the first slot includes all symbols of the signal resource corresponding to the signal; or determining that a downlink symbol and/or flexible symbol included in the first slot includes all symbols of the signal resource corresponding to the signal.

Based on contents of any of the above embodiments, in this embodiment, the uplink symbols and/or flexible symbols included in the first slot cover all symbols of the signal resource corresponding to the signal, includes:

the uplink symbol and/or flexible symbol included in the first slot includes all symbols of all signal resources included in a signal resource set, where the triggering signaling triggers the signal through the signal resource set.

Based on contents of any of the above embodiments, in this embodiment, when the uplink symbol and/or flexible symbol included in the first slot including all the signal resources included in the signal resources set through which the triggering signaling triggers the signal, includes:

the uplink symbol and/or flexible symbol included in the first slot includes all symbols of all signal resources included in all signal resource sets triggered by the triggering signaling triggers.

Based on contents of any of the above embodiments, in this embodiment, the downlink symbol and/or flexible symbol included in the first slot including all symbols of the signal resource corresponding to the signal, includes:

the downlink symbol and/or flexible symbol included in the first slot includes all symbols of all signal resources included in a signal resource set, where the triggering signaling triggers the signal through the signal resource set.

Based on contents of any of the above embodiments, in this embodiment, the downlink symbol and/or flexible symbol included in the first slot including all symbols of all signal resources included in the signal resource set through which the triggering signaling triggers the signal, includes:

the downlink symbol and/or flexible symbol included in the first slot includes all symbols of all signal resources included in all signal resource sets triggered by the triggering signaling.

Based on contents of any of the above embodiments, in this embodiment, the determining the first slot based on the uplink-downlink pattern configuration includes:

determining that the first slot includes at least one symbol indicated by the uplink-downlink pattern configuration as an uplink symbol or a flexible symbol.

Based on contents of any of the above embodiments, in this embodiment, the determining the first slot based on the uplink-downlink pattern configuration includes:

determining that the first slot includes at least one symbol indicated by the uplink-downlink pattern configuration as a downlink symbol or a flexible symbol.

Based on contents of any of the above-mentioned embodiments, in this embodiment, the minimum time interval requirement is the first minimum timing requirement, and the determining the first slot based on the minimum time interval requirement between the transmission of the triggering signaling and the signal includes at least one of the followings:

the first slot satisfies a first time interval condition, and the first time interval condition includes the time interval between a symbol of the channel carrying the triggering signaling and a symbol of the signal resource of the signal satisfies the first minimum timing requirement; or the first slot satisfies a second time interval condition, and the second time interval condition includes the time interval between a symbol of the channel carrying the triggering signaling and a symbol of the signal resource in a first signal resource set satisfies the first minimum timing requirement, where the first signal resource set is a signal resource set through which the triggering signaling triggers the signal.

Based on contents of any of the above embodiments, in this embodiment, the time interval between the symbol of the channel carrying the triggering signaling and the symbol of the signal resource in the first signal resource set satisfies the first minimum timing requirement, includes:

a time interval between a symbol of the channel carrying the triggering signaling and a symbol of a signal resource set and/or a signal source triggered by the triggering signaling satisfy the first minimum timing requirement.

Based on contents of any of the above embodiments, in this embodiment, the satisfying the first minimum timing requirement includes one of the following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

Based on contents of any of the above embodiments, in this embodiment, the determining the first slot based on the time window requirement between the transmission of the triggering signaling and the signal includes at least one of the followings:

a time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

where the first signal resource set is a signal resource set through which the triggering signaling triggers the signal.

Based on contents of any of the above embodiments, in this embodiment, the first preset value, the second preset value or the third preset value is associated with at least one of the following information:

a value specified in the protocol;

a value indicated to a terminal device;

a slot offset configured for the signal resource set through which the triggering signaling triggers the signal;

uplink-downlink pattern configuration;

usage type of the signal resource set through which the triggering signaling triggers the signal;

the numerology of the bandwidth part (BWP) at which the triggering signaling is located; or a value determined by the numerology of the bandwidth part (BWP) at which the signal resource set, through which the triggering signaling triggers the signal, is transmitted.

Based on contents of any of the above embodiments, in this embodiment, determining the first slot based on the priority of the signal includes at least one of the followings:

a signal in the first slot that at least partially overlaps with a time-domain symbol of the signal has a priority being equal to or lower than that of the signal;

a signal in the first slot that at least partially overlaps with a time-domain symbol of a signal corresponding to the first signal resource set has a priority being equal to or lower than that of a signal corresponding to the first signal resource set, and the first signal resource set is a signal resource set through which the triggering signaling triggers the signal; or a signal in the first slot has a priority being equal to or lower than that of the signal.

Based on contents of any of the above embodiments, in this embodiment, the way of determining the priority of a signal includes at least one of the followings:

determining the priority of the signal based on the usage type of the signal resource set triggered by the triggering signaling;

determining the priority of the signal based on the slot offset configured by radio resource control (RRC) signaling for the signal resource set triggered by the triggering signaling;

determining the priority of the signal based on the priority indication signaling transmitted to a terminal device;

determining the priority of the signal based on the number of symbols of the signal resource triggered by the triggering signaling; or determining the priority of the signal based on the number of symbols of the signal resource set triggered by the triggering signaling.

Based on contents of any of the above embodiments, in this embodiment, the signal resource is a signal resource in the carrier or cell in which the signal is located; and/or the signal resource set is a signal resource set in the carrier or cell in which the signal is located.

Based on contents of any of the above embodiments, in this embodiment, the reference slot includes at least one of the followings:

a slot at which the triggering signaling is located;

a slot indicated by the slot at which the triggering signaling is located and a slot offset configured for the signal resource set triggered by the triggering signaling through radio resource control (RRC) signaling;

a slot indicated by the slot offset indicated by medium access control-control element (MAC-CE); or a slot indicated by the slot offset indicated by the triggering signaling.

Based on contents of any of the above embodiments, in this embodiment, the t or t+1 is indicated through at least one of the following ways:

indicating the t or t+1 through a dedicated information field in the triggering signaling;

indicating the t or t+1 through the information field of triggering an aperiodic signal in the triggering signaling; or indicating the t or t+1 through a triggering state of the aperiodic signal indicated by the triggering signaling.

Based on contents of any of the above embodiments, in this embodiment, the device is further configured to: indicate the t or t+1 through indication information included in the triggering signaling, where the indication information is used to select one more values from a group of candidate values indicated by MAC-CE and/or RRC signaling.

Based on contents of any of the above embodiments, in this embodiment, the device is further configured to: indicate the t or t+1 through the information field of triggering the aperiodic signal in the triggering signaling, which includes:

indicating the t or t+1 through the value of the information field that triggers the signal in the triggering signaling and an association relationship between t or t+1 indicated by the MAC-CE and/or RRC signaling and the value of the information field that triggers the signal in the triggering signaling; or indicating the t or t+1 through an association relationship between t or t+1 indicated by the MAC-CE and/or RRC signaling and the triggering state indicated by the information field that triggers the signal in the triggering signaling and the triggering state Based on Contents of any of the Above-Mentioned Embodiments, in this Embodiment, the Device is Further Configured to:

indicate the t or t+1 through an association relationship between a type of the signal resource set triggered by the triggering signaling and t or t+1; and/or indicate the t or t+1 through a slot offset selected by the triggering signaling from multiple slot offset indicated by the MAC-CE and/or RRC signaling and another slot offset indicated by the triggering signaling.

Based on contents of any of the above embodiments, in this embodiment, the t or t+1 is indicated through at least one of the following ways:

independently indicating t or t+1 of different signal resources triggered by the triggering signaling;

jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

It should be noted here that this device may perform all methods applied to the embodiment of the signal transmission method of the network device and achieve the same effect, and details will not be repeated here.

Figure 10:
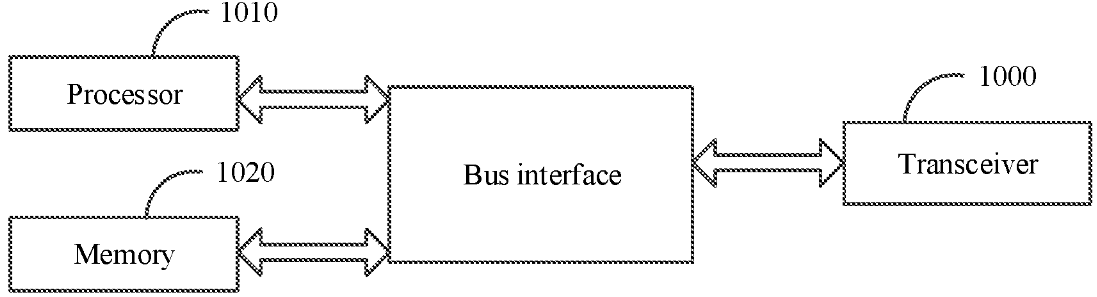
FIG. 10 is a schematic structural diagram of a terminal device according to an embodiment of the present application.

FIG. 10 is one of the schematic structural diagrams of a terminal device according to an embodiment of the present application, which includes a memory 1020, a transceiver 1000, and a processor 1010. In FIG. 10, the bus architecture may include any number of interconnected buses and bridges, which links various circuits of one or more processors represented by the processor 1010 and memories represented by the memory 1020. The bus architecture can also link together various other circuits such as peripherals, voltage regulators, and power management circuits, etc., which are well known in the art and therefore will not be further described herein. The bus interface provides an interface. The transceiver 1000 may be multiple elements, including a transmitter and a receiver, which provides a device for communicating with various other devices over transmission media, including wireless channels, wired channels, optical cables, and other transmission media. The processor 1010 is responsible for managing the bus architecture and general processing, and the memory 1020 can store data used by the processor 1010 when performing operations.

The processor 1010 may be a central processor (CPU), an application specific integrated circuit (ASIC), a field programmable gate array (FPGA) or a complex programmable logic device (CPLD), the processor can also adopt a multi-core architecture.

The memory 1020 is configured to store computer programs. The transceiver 1000 is configured to transmit and receive data under the control of the processor. The processor 1010 is configured to read the computer programs in the memory and perform the following operations: receiving triggering signaling for triggering to transmit or receive a signal; and determining transmission location of the signal based on at least one of a priority of the signal, uplink-downlink pattern configuration, minimum time interval requirement between transmission of the triggering signaling and the signal, or time window requirement between transmission of the triggering signaling and the signal.

Based on the content of any of the foregoing embodiments, in this embodiment, the signal is transmitted at the transmission location.

Based on contents of any of the above embodiments, in this embodiment, the determining the transmission location of the signal based on the priority of the signal includes:

determining a first transmission location of the signal, and when the first transmission location overlaps with transmission locations of other signals having a higher priority than the signal in time domain, an actual transmission location of the signal is a transmission location where no overlapping occurs in time domain in the first transmission location.

Based on contents of any of the above embodiments, in this embodiment, the determining transmission location of the signal based on at least one of the priority of the signal, uplink-downlink pattern configuration, minimum time interval requirement between transmission of the triggering signaling and the signal, or time window requirement between transmission of the triggering signaling and the signal, includes:

determining a first slot based on at least one of the priority of the signal, uplink-downlink pattern configuration, minimum time interval requirement between transmission of the triggering signaling and the signal, or time window requirement between transmission of the triggering signaling and the signal;

determining the $(t+1)^{th}$ first slot counting from a reference slot as the transmission location of the signal, where t is a non-negative integer.

Based on contents of any of the above embodiments, in this embodiment, the determining the first slot based on the uplink-downlink pattern configuration includes:

determining that an uplink symbol and/or flexible symbol included in the first slot includes all symbols of the signal resource corresponding to the signal; or determining that a downlink symbol and/or flexible symbol included in the first slot includes all symbols of the signal resource corresponding to the signal.

Based on contents of any of the above embodiments, in this embodiment, the uplink symbol and/or flexible symbol included in the first slot including all symbols of the signal resource corresponding to the signal, includes:

the uplink symbol and/or flexible symbol included in the first slot includes all symbols of all signal resources included in a signal resource set, where the triggering signaling triggers the signal through the signal resource set.

Based on contents of any of the above embodiments, in this embodiment, the uplink symbols and/or flexible symbols included in the first slot including all symbols of all signal resources included in the signal resource set through which the triggering signaling triggers the signal, includes:

the uplink symbols and/or flexible symbols included in the first slot include all symbols of all signal resources included in all signal resource sets triggered by the triggering signaling.

Based on contents of any of the above embodiments, in this embodiment, the downlink symbols and/or flexible symbols included in the first slot including all symbols of the signal resource corresponding to the signal, includes:

the downlink symbols and/or flexible symbols included in the first slot includes all symbols of all signal resources included in a signal resource set, where the triggering signaling triggers the signal through the signal resource set.

Based on contents of any of the above embodiments, in this embodiment, the downlink symbols and/or flexible symbols included in the first slot including all symbols of all signal resources included in the signal resource set through which the triggering signaling triggers the signal, includes:

the downlink symbols and/or flexible symbols included in the first slot includes all symbols of all signal resources included in all signal resource sets triggered by the triggering signaling.

Based on contents of any of the above embodiments, in this embodiment, the determining the first slot based on the uplink-downlink pattern configuration includes:

determining that the first slot includes at least one symbol indicated by the uplink-downlink pattern configuration as an uplink symbol or a flexible symbol.

Based on contents of any of the above embodiments, in this embodiment, the determining the first slot based on the uplink-downlink pattern configuration includes:

determining that the first slot includes at least one symbol indicated by the uplink-downlink pattern configuration as a downlink symbol or a flexible symbol.

Based on contents of any of the above-mentioned embodiments, in this embodiment, the minimum time interval requirement is the first minimum timing requirement, and determining the first slot based on the minimum time interval requirement between the transmission of the triggering signaling and the signal includes at least one of the followings:

the first slot satisfies a first time interval condition; the first time interval condition includes: the time interval between the symbol of the channel carrying the triggering signaling and the symbol of the signal resource of the signal satisfies a first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

Where the first signal resource set is a signal resource set through which the triggering signaling triggers the signal.

Based on contents of any of the above embodiments, in this embodiment, the time interval between the symbol of the channel carrying the triggering signaling and the symbol of the signal resource in the first signal resource set satisfies the first minimum timing requirement, includes:

time intervals between a symbol of the channel carrying the triggering signaling and a symbol of a signal resource set and/or a signal source triggered by the triggering signaling satisfy the first minimum timing requirement.

Based on contents of any of the above embodiments, in this embodiment, the satisfying the first minimum timing requirement includes one of the following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

Based on contents of any of the above embodiments, in this embodiment, determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

Where the first signal resource set is a signal resource set through which the triggering signaling triggers the signal.

Based on contents of any of the above embodiments, in this embodiment, the first preset value, the second preset value or the third preset value is determined based on at least one of the followings:

a value specified in the protocol;

a value indicated by a network device;

a slot offset configured by signaling for the signal resource set through which the triggering signaling triggers the signal;

uplink-downlink pattern configuration;

a value determined by the usage type of the signal resource set through which the triggering signaling triggers the signal;

the numerology of the bandwidth part (BWP) at which the triggering signaling is located;

a value determined by the numerology of the bandwidth part (BWP) at which the signal resource set, through which the triggering signaling triggers the signal, is transmitted.

Based on contents of any of the above embodiments, in this embodiment, the determining the first slot based on the priority of the signal includes at least one of the followings:

a signal in the first slot that at least partially overlaps with a time-domain symbol of the signal has a priority being equal to or lower than that of the signal;

a signal in the first slot that at least partially overlaps with a time-domain symbol of a signal corresponding to the first signal resource set has a priority being equal to or lower than that of a signal corresponding to the first signal resource set; where the first signal resource set is a signal resource set through which the triggering signaling triggers the signal; or a signal in the first slot has a priority being equal to or lower than that of the signal.

Based on contents of any of the above embodiments, in this embodiment, the way of determining the priority of a signal includes at least one of the followings:

determining the priority of the signal based on the usage type of the signal resource set triggered by the triggering signaling;

determining the priority of the signal based on the slot offset configured by radio resource control (RRC) signaling for the signal resource set triggered by the triggering signaling;

determining the priority of the signal based on the priority indication signaling of a network device;

determining the priority of the signal based on the number of symbols of the signal resource triggered by the triggering signaling;

determining the priority of the signal based on the number of symbols of the signal resource set triggered by the triggering signaling.

Based on contents of any of the above embodiments, in this embodiment, the signal resource is a signal resource in the carrier or cell in which the signal is located; and/or the signal resource set is a signal resource set in the carrier or cell in which the signal is located.

Based on contents of any of the above embodiments, in this embodiment, the reference slot includes at least one of the followings:

a slot at which the triggering signaling is located;

a slot determined based on the slot at which the triggering signaling is located and a slot offset configured by the network device for the signal resource set triggered by the triggering signaling through radio resource control (RRC) signaling;

a slot determined based on the slot offset indicated by medium access control-control element (MAC-CE); or a slot determined based on the slot offset indicated by the triggering signaling.

Based on contents of any of the above embodiments, in this embodiment, the t or t+1 is determined through at least one of the following ways:

determining the t or t+1 based on a dedicated information field in the triggering signaling;

determining the t or t+1 based on the information field of triggering an aperiodic signal in the triggering signaling; or determining the t or t+1 based on a triggering state of the aperiodic signal indicated by the triggering signaling.

Based on contents of any of the above embodiments, in this embodiment, the method further includes: determining the t based on the indication information when the triggering signaling includes indication information selected from a group of candidate values indicated by MAC-CE and/or RRC signaling.

Based on contents of any of the above embodiments, in this embodiment, the method includes: determining the t or t+1 based on the information field of triggering an aperiodic signal in the triggering signaling includes:

determining the t based on the value of the information field that triggers the signal in the triggering signaling and an association relationship between t indicated by the MAC-CE and/or RRC signaling and the value of the information field that triggers the signal in the triggering signaling; or determining the t+1 based on the value of the information field that triggers the signal in the triggering signaling and an association relationship between t+1 indicated by the MAC-CE and/or RRC signaling and the value of the information field that triggers the signal in the triggering signaling; or determining the t based on an association relationship between t indicated by the MAC-CE and/or RRC signaling and the triggering state indicated by the information field that triggers the signal in the triggering signaling and the triggering state; or determining the t+1 based on an association relationship between t+1 indicated by the MAC-CE and/or RRC signaling and the triggering state indicated by the information field that triggers the signal in the triggering signaling and the triggering state.

Based on Contents of any of the Above Embodiments, in this Embodiment, the Signal Transmission Method Further Includes:

determining t or t+1 based on an association relationship between the type of the signal resource set triggered by the triggering signaling and t or t+1; and/or determining t or t+1 based on a slot offset selected by the triggering signaling from multiple slot offset indicated by the MAC-CE and/or RRC signaling and another slot offset indicated by the triggering signaling.

Based on contents of any of the above embodiments, in this embodiment, the t or t+1 is indicated through at least one of the following ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

It should be noted here that the terminal device according to an embodiment of the present application can implement all methods applied to the signal transmission method embodiment of the terminal device and can achieve the same effect, and details are not repeated here.

Figure 11:
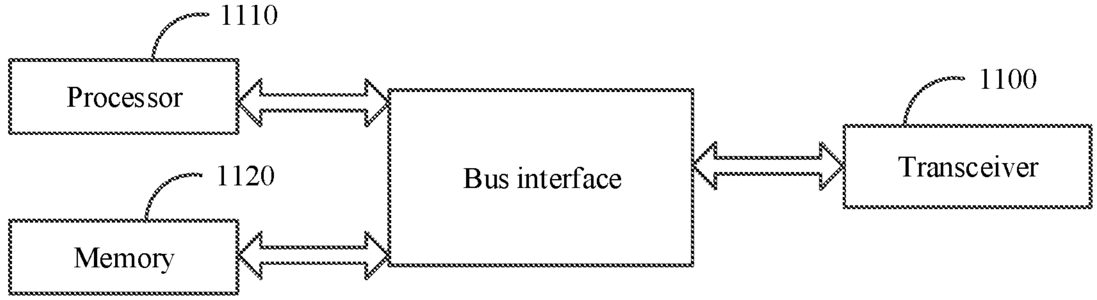
FIG. 11 is a schematic structural diagram of a network device according to an embodiment of the present application.

FIG. 11 is one of the schematic structural diagrams of network devices according to an embodiment of the present application, which includes a memory 1120, a transceiver 1100, and a processor 1110. In FIG. 11, the bus architecture may include any number of interconnected buses and bridges, which links various circuits of one or more processors represented by the processor 1110 and memories represented by the memory 1120. The bus architecture can also link together various other circuits such as peripherals, voltage regulators, and power management circuits, etc., which are well known in the art and therefore will not be further described herein. The bus interface provides an interface. The transceiver 1100 may be multiple elements, including a transmitter and a receiver, which provides a device for communicating with various other devices over transmission media, including wireless channels, wired channels, optical cables, and other transmission media. The processor 1110 is responsible for managing the bus architecture and general processing, and the memory 1120 can store data used by the processor 1110 when performing operations.

The processor 1110 may be a central processor (CPU), an application specific integrated circuit (ASIC), a field programmable gate array (FPGA) or a complex programmable logic device (CPLD), the processor can also adopt a multicore architecture.

The memory 1120 is configured to store computer programs. The transceiver 1100 is configured to transmit and receive data under the control of the processor. The processor 1110 is configured to read the computer programs in the memory and perform the following operations: determining transmission location of a signal based on at least one of a priority of the signal, uplink-downlink pattern configuration, minimum time interval requirement between transmission of triggering signaling and the signal, or the time window requirement between transmission of the triggering signaling and the signal; and transmitting triggering signaling, and the triggering signaling is a signaling that triggers to transmit or receive the signal, and the triggering signaling is associated with the transmission location of the signal.

Based on the content of any of the foregoing embodiments, in this embodiment, the signal is transmitted at the transmission location.

Based on contents of any of the above embodiments, in this embodiment, the determining the transmission location of the signal based on the priority of the signal includes:

determining a first transmission location of the signal, where when the first transmission location overlaps with transmission locations of other signals having a higher priority than the signal in time domain, an actual transmission location of the signal is a transmission location where no overlapping occurs in time domain in the first transmission location.

Based on contents of any of the above embodiments, in this embodiment, the determining transmission location of the signal based on at least one of the priority of the signal, uplink-downlink pattern configuration, minimum time interval requirement between transmission of the triggering signaling and the signal, or time window requirement between transmission of the triggering signaling and the signal, includes:

determining a first slot based on at least one of the priority of the signal, uplink-downlink pattern configuration, minimum time interval requirement between transmission of the triggering signaling and the signal, or time window requirement between transmission of the triggering signaling and the signal;

where the transmission location of the signal is the $(t+1)^{th}$ first slot counting from a reference slot, and t is a non-negative integer.

Based on contents of any of the above embodiments, in this embodiment, the determining the first slot based on the uplink-downlink pattern configuration includes:

determining that uplink symbols and/or flexible symbols included in the first slot includes all symbols of the signal resource corresponding to the signal; or determining that downlink symbols and/or flexible symbols included in the first slot includes all symbols of the signal resource corresponding to the signal.

Based on contents of any of the above embodiments, in this embodiment, the uplink symbols and/or flexible symbols included in the first slot including all symbols A of the signal resource corresponding to the signal, includes:

the uplink symbols and/or flexible symbols included in the first slot includes all symbols of all signal resources included in a signal resource set, where the triggering signaling triggers the signal through the signal resource set.

Based on contents of any of the above embodiments, in this embodiment, the uplink symbols and/or flexible symbols included in the first slot including all symbols of all signal resources included in the signal resource set through which the triggering signaling triggers the signal, includes:

The uplink symbols and/or flexible symbols included in the first slot includes all symbols of all signal resources included in all signal resource sets triggered by the triggering signaling.

Based on contents of any of the above embodiments, in this embodiment, the downlink symbols and/or flexible symbols included in the first slot including all symbols of the signal resource corresponding to the signal, includes:

the downlink symbols and/or flexible symbols included in the first slot includes all symbols of all signal resources included in a signal resource set, where the triggering signaling triggers the signal through the signal resource set.

Based on contents of any of the above embodiments, in this embodiment, the downlink symbols and/or flexible symbols included in the first slot including all symbols of all signal resources included in the signal resource set through which the triggering signaling triggers the signal, includes:

the downlink symbols and/or flexible symbols included in the first slot includes all symbols of all signal resources included in all signal resource sets triggered by the triggering signaling.

Based on contents of any of the above embodiments, in this embodiment, the determining the first slot based on the uplink-downlink pattern configuration includes:

determining that the first slot includes at least one symbol indicated by the uplink-downlink pattern configuration as an uplink symbol or a flexible symbol.

Based on contents of any of the above embodiments, in this embodiment, the determining the first slot based on the uplink-downlink pattern configuration includes:

determining that the first slot includes at least one symbol indicated by the uplink-downlink pattern configuration as a downlink symbol or a flexible symbol.

Based on contents of any of the above-mentioned embodiments, in this embodiment, the minimum time interval requirement is the first minimum timing requirement, and determining the first slot based on the minimum time interval requirement between the transmission of the triggering signaling and the signal includes at least one of the followings:

the first slot satisfies a first time interval condition; the first time interval condition includes: the time interval between the symbol of the channel carrying the triggering signaling and the symbol of the signal resource of the signal satisfies the first minimum timing requirement; or the first slot satisfies the second time interval condition; the second time interval condition includes: the time interval between a symbol of the channel carrying the triggering signaling and a symbol of the signal resource in a first signal resource set satisfies the first minimum timing requirement;

Where the first signal resource set is a signal resource set through which the triggering signaling triggers the signal.

Based on contents of any of the above embodiments, in this embodiment, the time interval between the symbol of the channel carrying the triggering signaling and the symbol of the signal resource in the first signal resource set satisfies the first minimum timing requirement, includes:

a time interval between a symbol of the channel carrying the triggering signaling and a symbol of a signal resource set and/or a signal source triggered by the triggering signaling satisfies the first minimum timing requirement.

Based on contents of any of the above embodiments, in this embodiment, the satisfying the first minimum timing requirement includes one of the following:

the time interval being greater than or equal to a pre-agreed value;

the time interval being greater than or equal to the maximum value among the minimum timing requirements corresponding to all signal resources triggered by the triggering signaling;

the time interval being greater than or equal to the minimum timing requirement corresponding to the signal resource set through which the triggering signaling triggers the signal;

the time interval being greater than or equal to the maximum value among the minimum timing requirements corresponding to all signal resource sets triggered by the triggering signaling;

the time interval being the maximum value among the minimum timing requirements corresponding to the usage types of all signal resource sets triggered by the triggering signaling.

Based on contents of any of the above embodiments, in this embodiment, determining the first slot based on the time window requirement between the transmission of the triggering signaling and the signal includes at least one of the followings:

the time interval between the first slot and the slot at which the triggering signaling is located is less than or equal to a first preset value specified in the time window requirement between the transmission of the triggering signaling and the signal;

the first slot satisfies that the time interval between the symbol of the channel carrying the triggering signaling and the symbol of the signal resource of the signal is less than or equal to a second preset value specified in the time window requirement between the transmission of the triggering signaling and the signal; or the first slot satisfies that the time interval between the symbol of the channel carrying the triggering signaling and the symbol of the first signal resource is less than or equal to a third preset value specified in the time window requirement between the transmission of the triggering signaling and the signal;

Where the first signal resource set is a signal resource set through which the triggering signaling triggers the signal.

Based on contents of any of the above embodiments, in this embodiment, the first preset value, the second preset value or the third preset value is associated with at least one of the following information:

a value specified in the protocol;

a value indicated to the terminal device;

a slot offset configured for the signal resource set through which the triggering signaling triggers the signal;

uplink-downlink pattern configuration;

usage type of the signal resource set through which the triggering signaling triggers the signal;

the numerology of the bandwidth part (BWP) at which the triggering signaling is located;

a value determined by the numerology of the bandwidth part (BWP) at which the signal resource set, through which the triggering signaling triggers the signal, is transmitted.

Based on contents of any of the above embodiments, in this embodiment, the determining the first slot based on the priority of the signal includes at least one of the followings:

a signal in the first slot that at least partially overlaps with a time-domain symbol of the signal has a priority being equal to or lower than that of the signal;

a signal in the first slot that at least partially overlaps with a time-domain symbol of a signal corresponding to the first signal resource set has a priority being equal to or lower than that of a signal corresponding to the first signal resource set; where the first signal resource set is a signal resource set through which the triggering signaling triggers the signal; or a signal in the first slot has a priority being equal to or lower than that of the signal.

Based on contents of any of the above embodiments, in this embodiment, the way of determining the priority of the signal includes at least one of the followings:

determining the priority of the signal based on the usage type of the signal resource set triggered by the triggering signaling;

determining the priority of the signal based on the slot offset configured by radio resource control (RRC) signaling for the signal resource set triggered by the triggering signaling;

determining the priority of the signal based on the priority indication signaling transmitted to the terminal device;

determining the priority of the signal based on the number of symbols of the signal resource triggered by the triggering signaling;

determining the priority of the signal based on the number of symbols of the signal resource set triggered by the triggering signaling.

Based on contents of any of the above embodiments, in this embodiment, the signal resource is a signal resource in the carrier or cell in which the signal is located; and/or the signal resource set is a signal resource set in the carrier or cell in which the signal is located.

Based on contents of any of the above embodiments, in this embodiment, the reference slot includes at least one of the followings:

a slot at which the triggering signaling is located;

a slot at which the triggering signaling is located and the slot indicated by the slot offset configured for the signal resource set triggered by the triggering signaling through the radio resource control (RRC) signaling;

a slot indicated by the slot offset indicated by the medium access control-control element (MAC-CE); or a slot indicated by the slot offset indicated by the triggering signaling.

Based on contents of any of the above embodiments, in this embodiment, the t or t+1 is indicated through at least one of the following ways:

indicating the t or t+1 through a dedicated information field in the triggering signaling;

indicating the t or t+1 through the information field of the trigger aperiodic signal in the triggering signaling; or indicating the t or t+1 through a triggering state of the aperiodic signal indicated by the triggering signaling.

Based on contents of any of the above embodiments, in this embodiment, the method further includes: indicating the t through the indication information when the triggering signaling includes indication information selected from a group of candidate values indicated by MAC-CE and/or RRC signaling.

Based on contents of any of the above embodiments, in this embodiment, the method includes: indicating the t or t+1 through the information field of triggering an aperiodic signal in the triggering signaling, which includes:

indicating the t or t+1 through the value of the information field that triggers the signal in the triggering signaling and an association relationship between t or t+1 indicated by the MAC-CE and/or RRC signaling and the value of the information field that triggers the signal in the triggering signaling; or indicating the t or t+1 through an association relationship between t or t+1 indicated by the MAC-CE and/or RRC signaling and the triggering state indicated by the information field that triggers the signal in the triggering signaling and the triggering state.

Based on Contents of any of the Above Embodiments, in this Embodiment, the Signal Transmission Method Further Includes:

indicating the t or t+1 through an association relationship between a type of the signal resource set triggered by the triggering signaling and t or t+1; and/or indicating the t or t+1 through a slot offset selected by the triggering signaling from multiple slot offset indicated by the MAC-CE and/or RRC signaling and another slot offset indicated by the triggering signaling.

Based on contents of any of the above embodiments, in this embodiment, the t or t+1 is indicated through at least one of the following ways:

independently indicating t or t+1 of different signal resources triggered by the triggering signaling jointly indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

It should be noted here that the network device according to an embodiment of the present application can implement all methods applied to the signal transmission method embodiment of the network device and can achieve the same effect, and details are not repeated here.

It should be noted that the division of units in the embodiment of the present application is illustrative, and is only a logical function division, and there may be another division manner in actual implementation. In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on this understanding, all the embodiments of the present application or the part of making contributions to the prior art can be embodied in the form of a software product, and the computer software product is stored in a storage medium, which includes several instructions for causing a computer device (which may be a personal computer, a server, or a network device, etc.) or a processor to perform all or part of the methods described in the various embodiments of the present application. The aforementioned storage medium includes: U disk, mobile hard disk, read-only memory (ROM), random access memory (RAM), magnetic disk or optical disk and other various media that can store program codes.

It should be noted that the above-mentioned device according to an embodiment of the present application can realize all methods realized by the above-mentioned method embodiment, and achieve the same effect. The part and the beneficial effect are not repeatedly described in detail.

On the other hand, the embodiments of the present application further provide a processor-readable storage medium, the processor-readable storage medium stores a computer program, and the computer program is used to enable the processor to perform the methods.

The processor-readable storage medium can be any available medium or data storage device that can be accessed by a processor, including but not limited to magnetic storage (e.g., floppy disk, hard disk, magnetic tape, magneto-optical disk (MO), etc.), optical storage (e.g., CD, DVD, BD, HVD, etc.), and semiconductor memory (such as ROM, EPROM, EEPROM, non-volatile memory (NAND FLASH), solid state disk (SSD)), etc.

It can be seen from the foregoing embodiments that a processor-readable storage medium stores a computer program, and the computer program is configured to cause the processor to perform the foregoing signal transmission method.

The embodiments of the present application may be provided as methods, systems, or computer program products.

Accordingly, the present application may take the form of an entirely hardware embodiment, an entirely software embodiment, or an embodiment combining software and hardware aspects.

Furthermore, the present application may take the form of a computer program product embodied on one or more computer-usable storage media (including but not limited to disk storage, optical storage, etc.) having computer-usable program code embodied therein.

The present application is described with reference to flowcharts and/or block diagrams of methods, apparatus (systems), and computer program products according to embodiments of the present application.

It should be understood that each procedure and/or block in the flowchart and/or block diagrams, and combinations of procedures and/or blocks in the flowchart and/or block diagrams can be implemented by computer-executable instructions.

These computer-executable instructions can be provided to a general purpose computer, special purpose computer, embedded processor, or processor of other programmable data processing equipment to produce a machine, and instructions executed by the processor of the computer or other programmable data processing equipment produce Means for realizing the functions specified in one or more procedures of the flowchart and/or one or more blocks of the block diagram.

These processor-executable instructions may also be stored in a processor-readable memory capable of directing a computer or other programmable data processing device to operate in a specific manner, and the instructions stored in the processor-readable memory produce a manufacturing product, the instruction device realizes the functions specified in one or more procedures of the flowchart and/or one or more blocks of the block diagram.

These processor-executable instructions can also be loaded onto a computer or other programmable data processing device, causing a series of operational steps to be performed on the computer or other programmable device to produce a computer-implemented process, to provide steps for implementing the functions specified in the procedure or procedures of the flowchart and/or the block or blocks of the block diagrams.

What is claimed is:

1. A signal transmission method, comprising:

receiving triggering signaling for triggering to transmit or receive a signal; and determining transmission location of the signal based on at least one of a priority of the signal, uplink-downlink pattern configuration, minimum time interval requirement between transmission of the triggering signaling and the signal, or time window requirement between transmission of the triggering signaling and the signal, wherein the determining transmission location of the signal based on at least one of the priority of the signal, uplink-downlink pattern configuration, minimum time interval requirement between transmission of the triggering signaling and the signal, or time window requirement between transmission of the triggering signaling and the signal, comprises:

determining a first slot based on at least one of the priority of the signal, uplink-downlink pattern configuration, minimum time interval requirement between transmission of the triggering signaling and the signal, or time window requirement between transmission of the triggering signaling and the signal; and determining the $(t+1)^{th}$ first slot counting from a reference slot as the transmission location of the signal, wherein t is a non-negative integer, wherein the t or t+1 is indicated through at least one of the following ways:

independently indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

2. The signal transmission method of claim 1, wherein the determining the transmission location of the signal based on the priority of the signal comprises:

determining a first transmission location of the signal, wherein when the first transmission location overlaps with transmission locations of other signals having a higher priority than the signal in time domain, an actual transmission location of the signal is a transmission location where no overlapping occurs in time domain in the first transmission location.

3. The signal transmission method of claim 1, wherein the determining the first slot based on the uplink-downlink pattern configuration comprises:

determining, as the first slot, a slot including an uplink symbols and/or flexible symbol which includes all symbols of all signal resources included in a signal resource set, wherein the triggering signaling triggers the signal through the signal resource set; or determining, as the first slot, a slot including a downlink symbol and/or flexible symbol which includes all symbols of all signal resources included in a signal resource set, wherein the triggering signaling triggers the signal through the signal resource set.

4. The signal transmission method of claim 1, wherein the determining the first slot based on the minimum time interval requirement between the transmission of the triggering signaling and the signal comprises at least one of the following:

the first slot satisfies a first time interval condition, and the first time interval condition comprises the time interval between a symbol of a channel carrying the triggering signaling and a symbol of the signal resource of the signal satisfies the minimum time interval requirement; or the first slot satisfies a second time interval condition, and the second time interval condition comprises the time interval between a symbol of the channel carrying the triggering signaling and a symbol of the signal resource in a first signal resource set satisfies the minimum time interval requirement, wherein the first signal resource set is a signal resource set through which the triggering signaling triggers the signal.

5. The signal transmission method of claim 1, wherein the reference slot comprises at least one of the following:

a slot at which the triggering signaling is located;

a slot determined based on the slot at which the triggering signaling is located and a slot offset configured by a network device for the signal resource set triggered by the triggering signaling through radio resource control (RRC) signaling;

a slot determined based on the slot offset indicated by medium access control-control element (MAC-CE); or a slot determined based on the slot offset indicated by the triggering signaling.

6. The signal transmission method of claim 1, wherein the t or t+1 is determined through at least one of the following ways:

determining the t or t+1 based on an information field in the triggering signaling;

determining the t or t+1 based on the information field of triggering an aperiodic signal in the triggering signaling; or determining the t or t+1 based on a triggering state of the aperiodic signal indicated by the triggering signaling.

7. The signal transmission method of claim 1, further comprising:

determining the t or t+1 based on indication information included in the triggering signaling, wherein the indication information is used to select one or more values from a group of candidate values indicated by MAC-CE and/or RRC signaling.

8. The signal transmission method of claim 1, wherein the t or t+1 is further indicated through the following ways:

jointly indicating t or t+1 of different signal resources triggered by the triggering signaling.

9. A signal transmission method, comprising:

determining transmission location of a signal based on at least one of a priority of the signal, uplink-downlink pattern configuration, minimum time interval requirement between transmission of triggering signaling and the signal, or the time window requirement between transmission of the triggering signaling and the signal; and transmitting triggering signaling, wherein the triggering signaling is a signaling that triggers to transmit or receive the signal, and the triggering signaling is associated with the transmission location of the signal, wherein the determining transmission location of the signal based on at least one of the priority of the signal, uplink-downlink pattern configuration, minimum time interval requirement between transmission of the triggering signaling and the signal, or time window requirement between transmission of the triggering signaling and the signal, comprises:

determining a first slot based on at least one of the priority of the signal, uplink-downlink pattern configuration, minimum time interval requirement between transmission of the triggering signaling and the signal, or time window requirement between transmission of the triggering signaling and the signal; and determining the $(t+1)^{th}$ first slot counting from a reference slot as the transmission location of the signal, wherein t is a non-negative integer, wherein the t or t+1 is indicated through at least one of the following ways:

independently indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

10. The signal transmission method of claim 9, wherein the determining the transmission location of the signal based on the priority of the signal comprises:

determining a first transmission location of the signal, wherein when the first transmission location overlaps with transmission locations of other signals having a higher priority than the signal in time domain, an actual transmission location of the signal is a transmission location where no overlapping occurs in time domain in the first transmission location.

11. The signal transmission method of claim 9, wherein the determining the first slot based on the uplink-downlink pattern configuration comprises:

determining, as the first slot, a slot including an uplink symbol and/or flexible symbol which includes all symbols of all signal resources included in a signal resource set, wherein the triggering signaling triggers the signal through the signal resource set; or determining, as the first slot, a slot including a downlink symbol and/or flexible symbol which includes all symbols of all signal resources included in a signal resource set, wherein the triggering signaling triggers the signal through the signal resource set.

12. The signal transmission method of claim 9, wherein the determining the first slot based on the minimum time interval requirement between the transmission of the triggering signaling and the signal comprises at least one of the following:

the first slot satisfies a first time interval condition, and the first time interval condition comprises the time interval between a symbol of a channel carrying the triggering signaling and a symbol of the signal resource of the signal satisfies the minimum time interval requirement; or the first slot satisfies a second time interval condition, and the second time interval condition comprises the time interval between a symbol of the channel carrying the triggering signaling and a symbol of the signal resource in a first signal resource set satisfies the first minimum time interval requirement, wherein the first signal resource set is a signal resource set through which the triggering signaling triggers the signal.

13. The signal transmission method of claim 9, wherein the reference slot comprises at least one of the following:

a slot at which the triggering signaling is located;

a slot indicated by the slot at which the triggering signaling is located and a slot offset configured for the signal resource set triggered by the triggering signaling through radio resource control (RRC) signaling;

a slot indicated by the slot offset indicated by medium access control-control element (MAC-CE); or a slot indicated by the slot offset indicated by the triggering signaling.

14. The signal transmission method of claim 9, wherein the t or t+1 is indicated through at least one of the following ways:

indicating the t or t+1 through a dedicated information field in the triggering signaling;

indicating the t or t+1 through the information field of triggering an aperiodic signal in the triggering signaling; or indicating the t or t+1 through a triggering state of the aperiodic signal indicated by the triggering signaling.

15. The signal transmission method of claim 9, further comprising:

indicating the t or t+1 through indication information included in the triggering signaling, wherein the indication information is used to select one or more values from a group of candidate values indicated by MAC-CE and/or RRC signaling.

16. The signal transmission method of claim 9, wherein the t or t+1 is further indicated through the following ways:

jointly indicating t or t+1 of different signal resources triggered by the triggering signaling.

17. A network device, comprising:

a memory, configured to store a computer program; and a processor, wherein the computer program, when executed by the processor, causes the network device to perform the method of claim 9.

18. A terminal device, comprising:

a memory, configured to store a computer program; and a processor, wherein the computer program, when executed by the processor, causes the terminal device to perform the following steps:

receiving triggering signaling for triggering to transmit or receive a signal; and determining transmission location of the signal based on at least one of a priority of the signal, uplink-downlink pattern configuration, minimum time interval requirement between transmission of the triggering signaling and the signal, or time window requirement between transmission of the triggering signaling and the signal, wherein the determining transmission location of the signal based on at least one of the priority of the signal, uplink-downlink pattern configuration, minimum time interval requirement between transmission of the triggering signaling and the signal, or time window requirement between transmission of the triggering signaling and the signal, comprises:

determining a first slot based on at least one of the priority of the signal, uplink-downlink pattern configuration, minimum time interval requirement between transmission of the triggering signaling and the signal, or time window requirement between transmission of the triggering signaling and the signal; and determining the $(t+1)^{th}$ first slot counting from a reference slot as the transmission location of the signal, wherein t is a non-negative integer, wherein the t or t+1 is indicated through at least one of the following ways:

independently indicating t or t+1 of different signal resources triggered by the triggering signaling;

t or t+1 corresponding to respective signal resources in the same signal resource set triggered by the triggering signaling being the same; or t or t+1 corresponding to respective signal resource sets or signal resources triggered by the same triggering signaling being the same.

* * * * *